Jan. 1, 1952        A. H. DICKINSON        2,580,740
ACCOUNTING APPARATUS
Filed Jan. 20, 1940        32 Sheets-Sheet 1
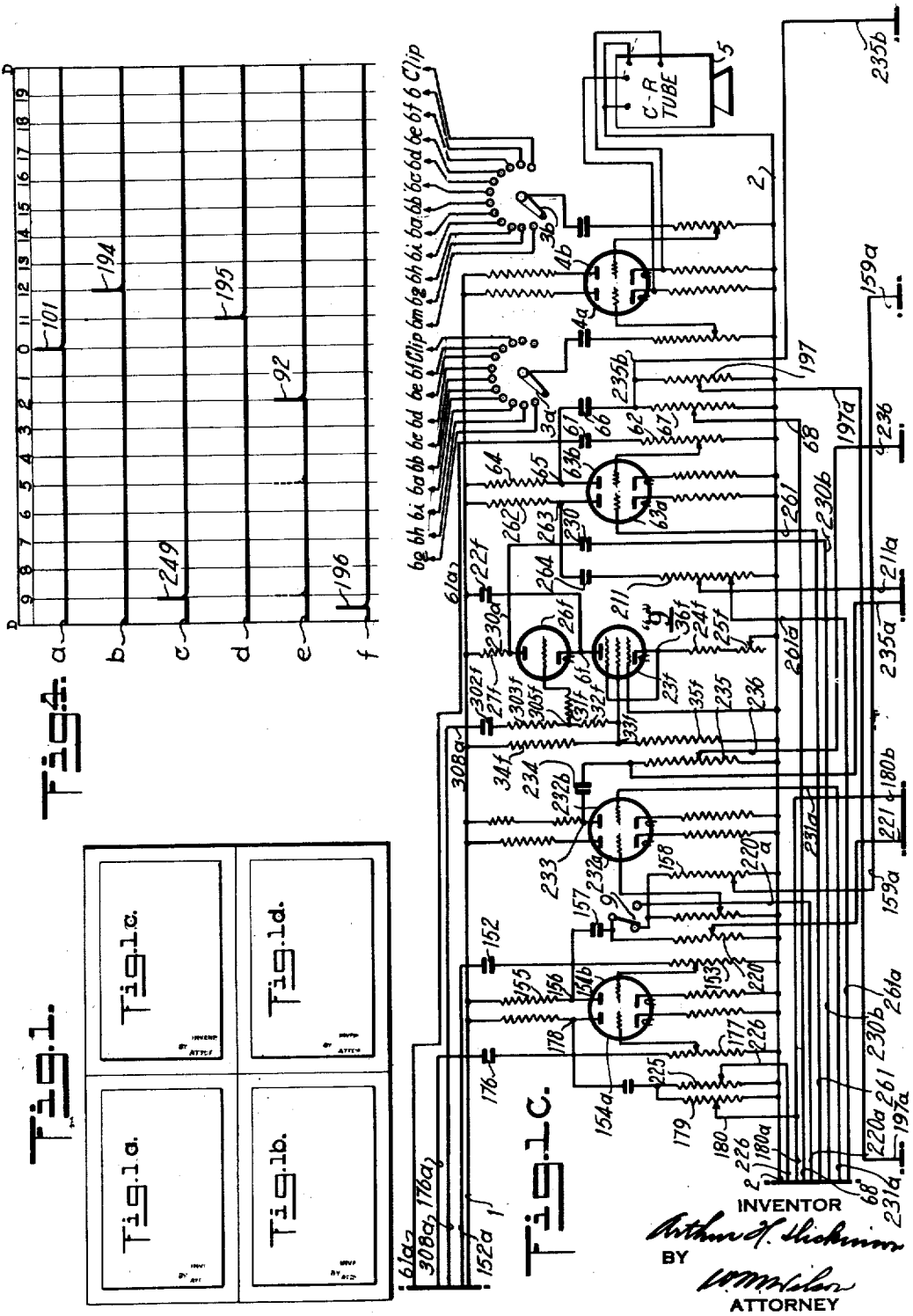

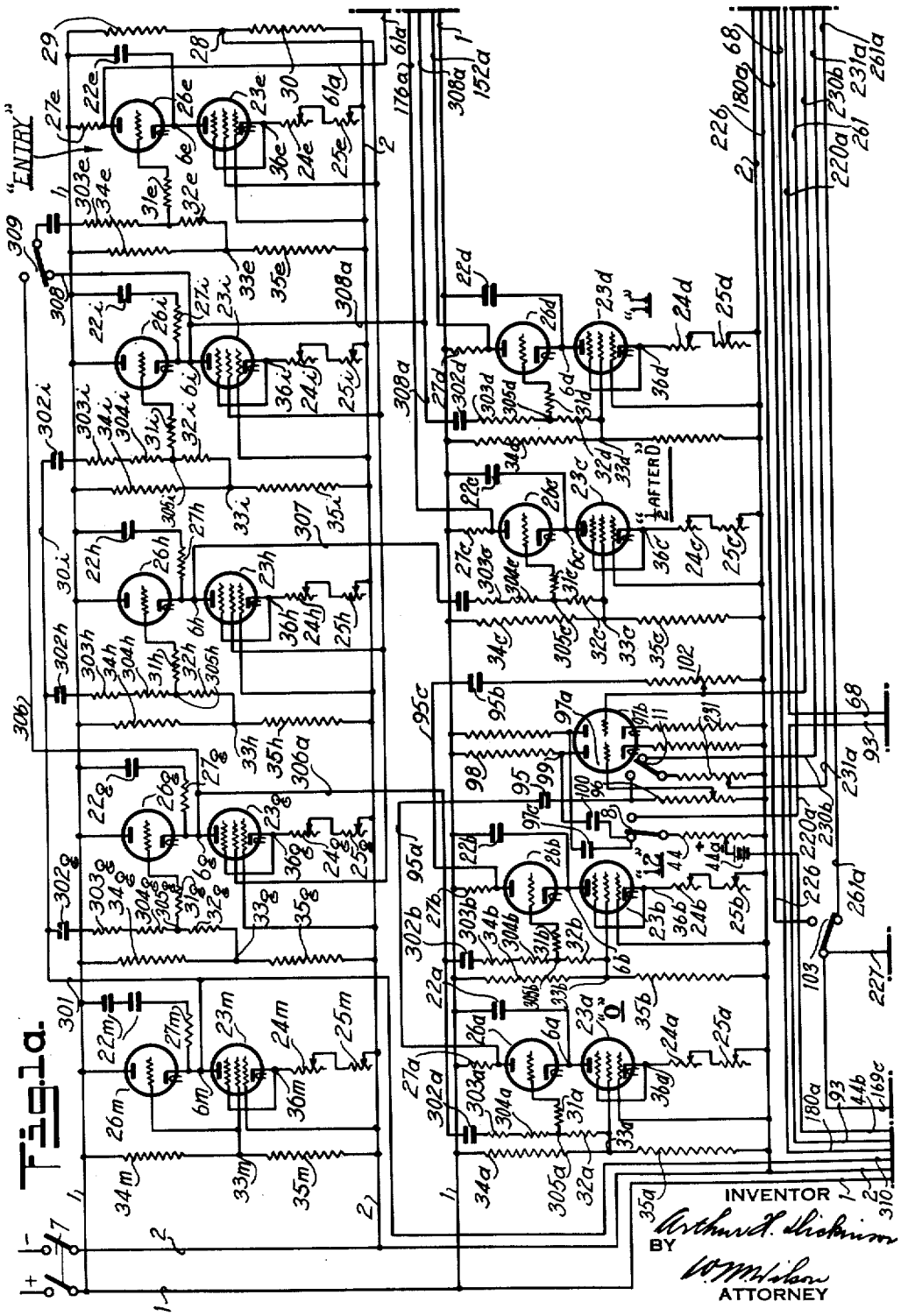

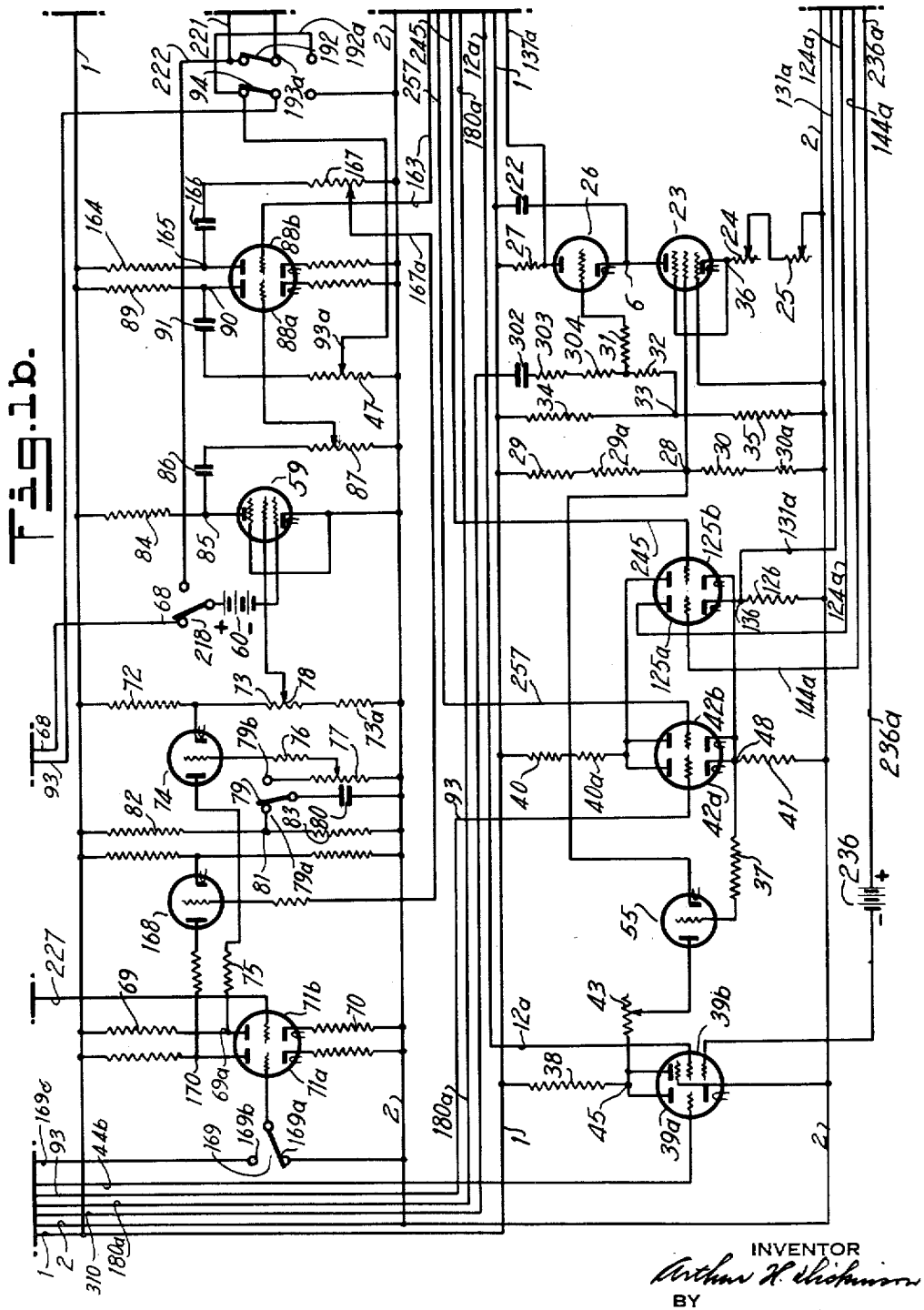

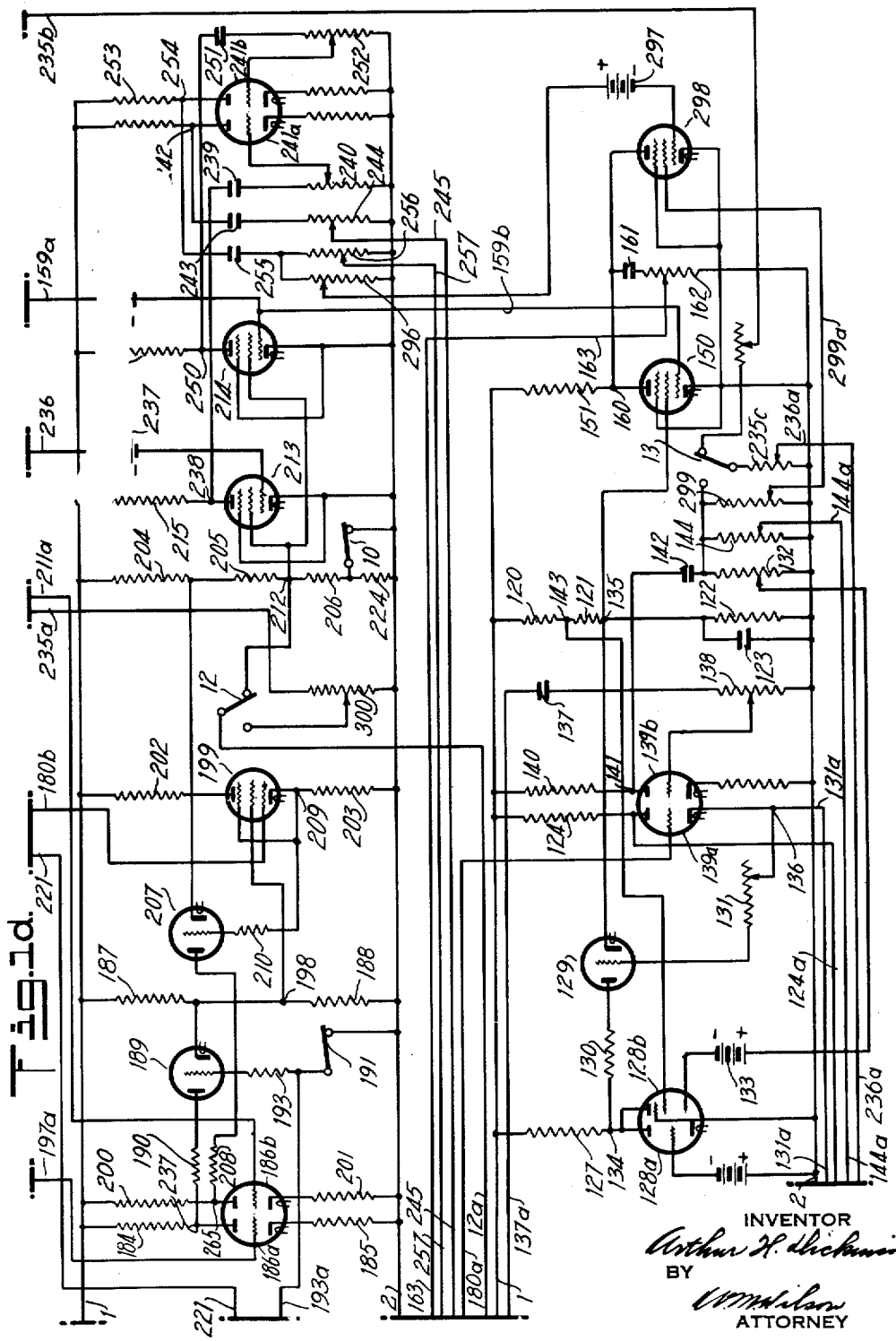

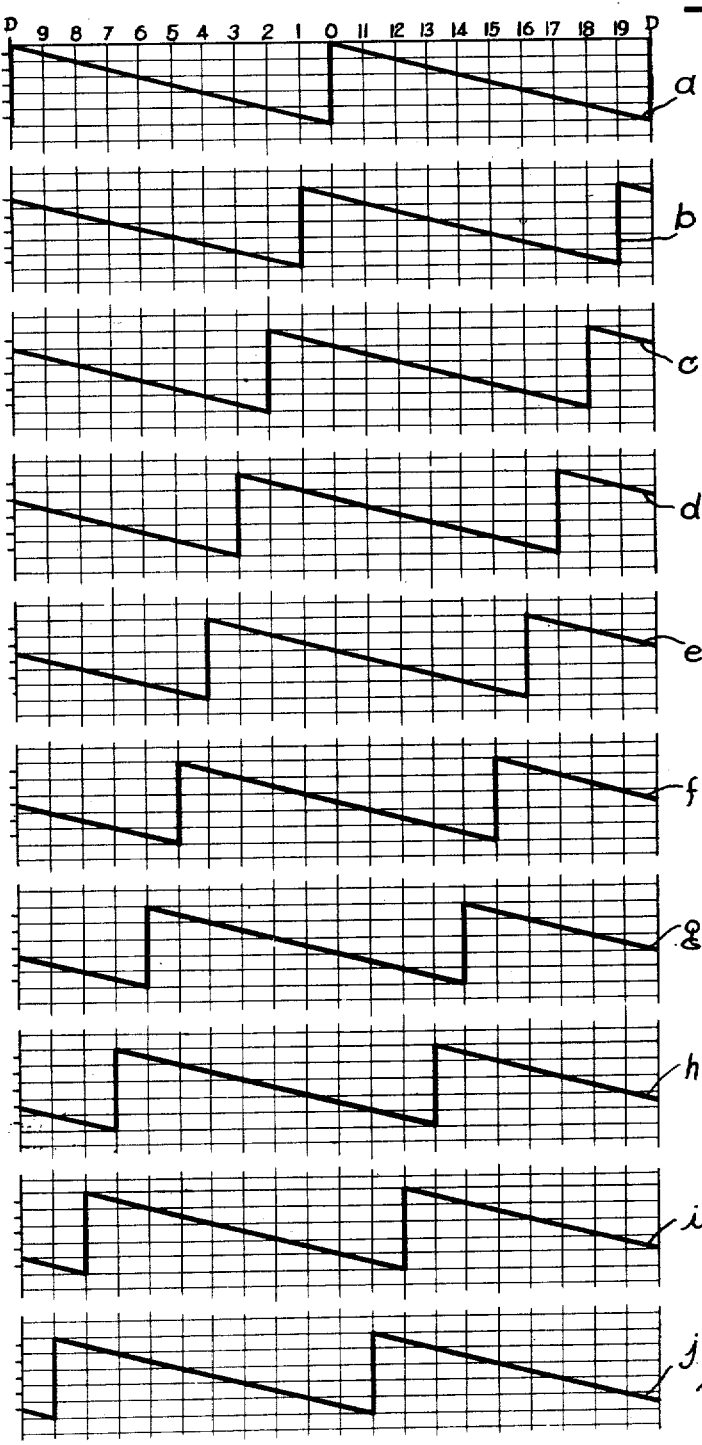

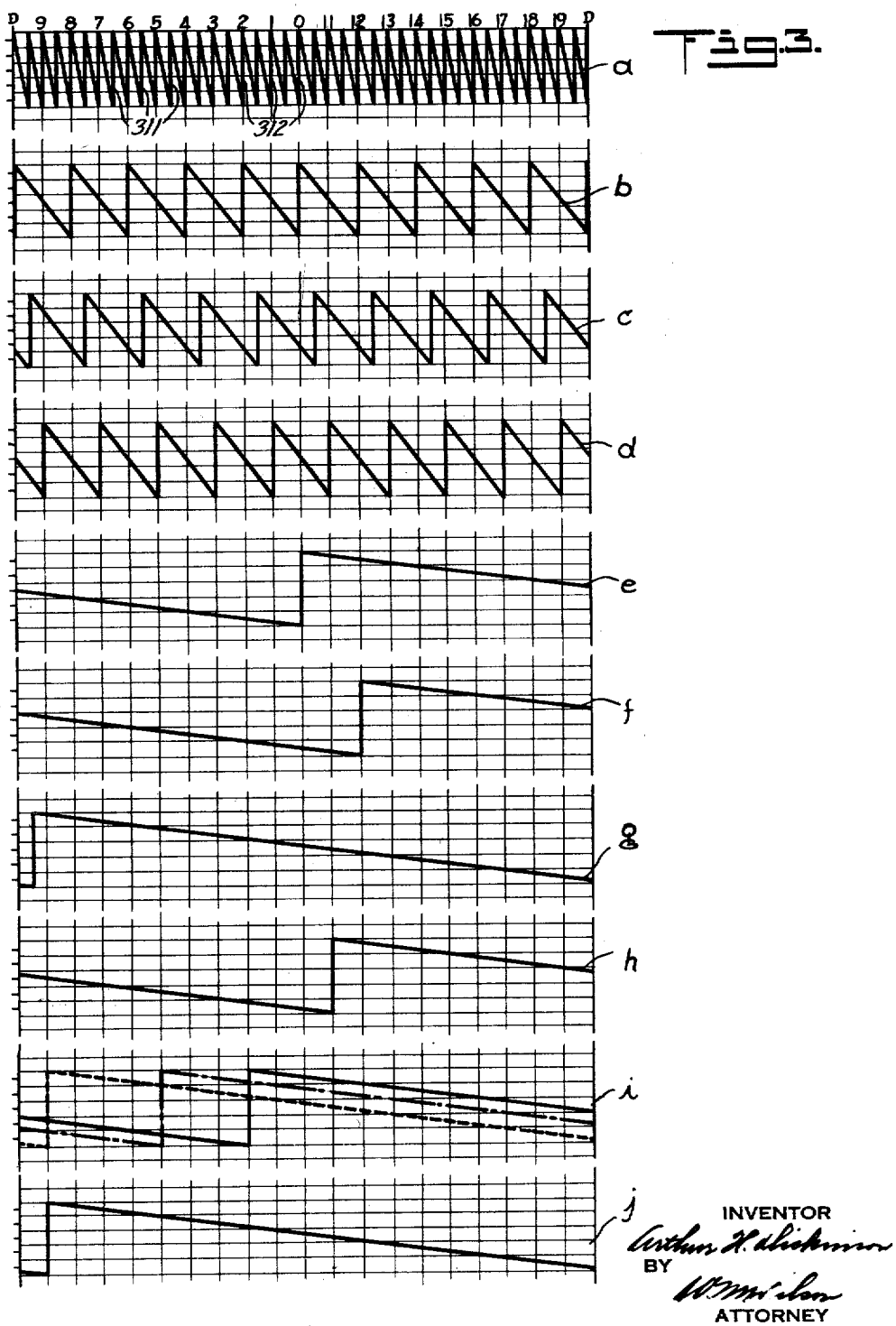

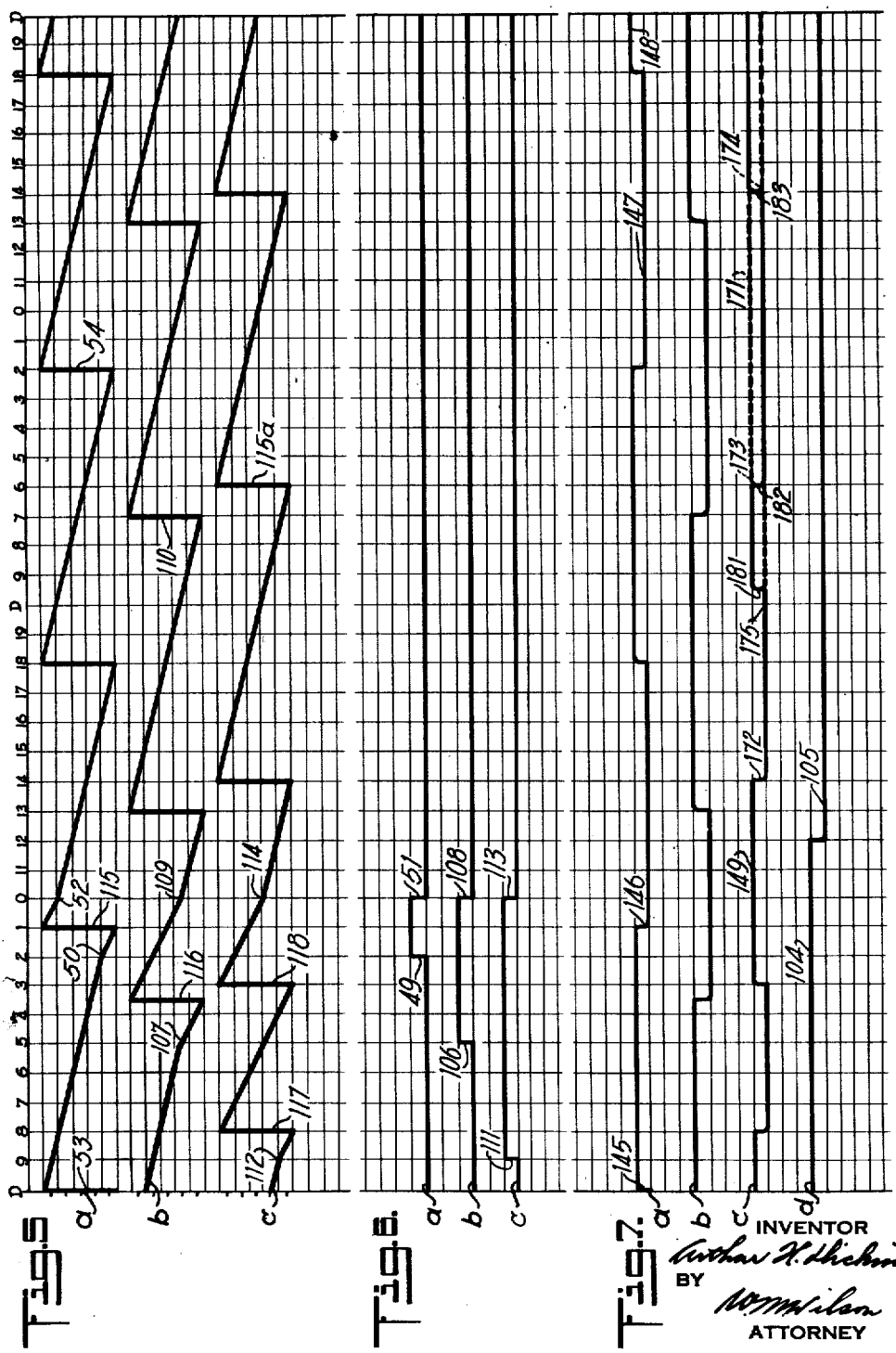

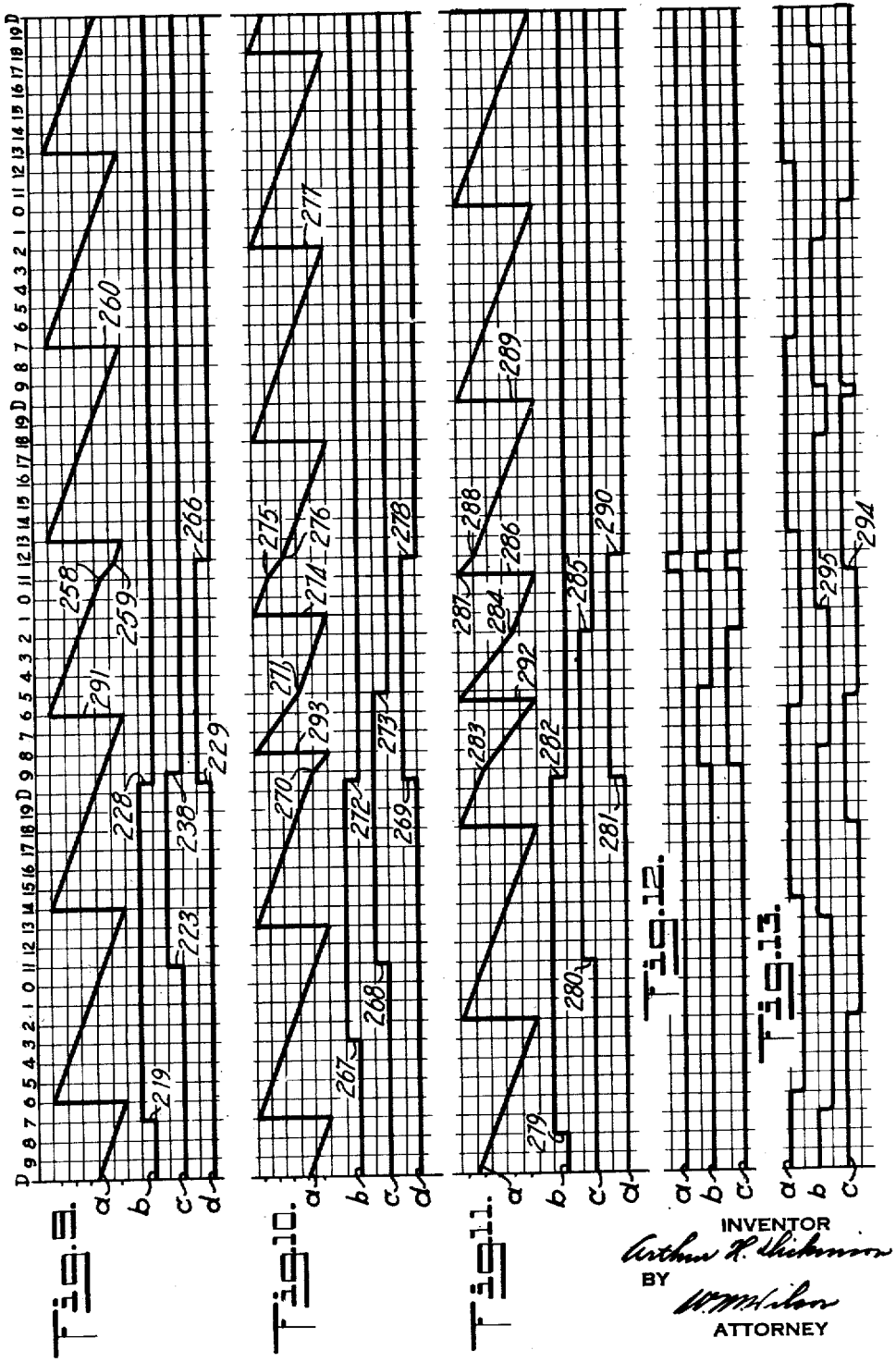

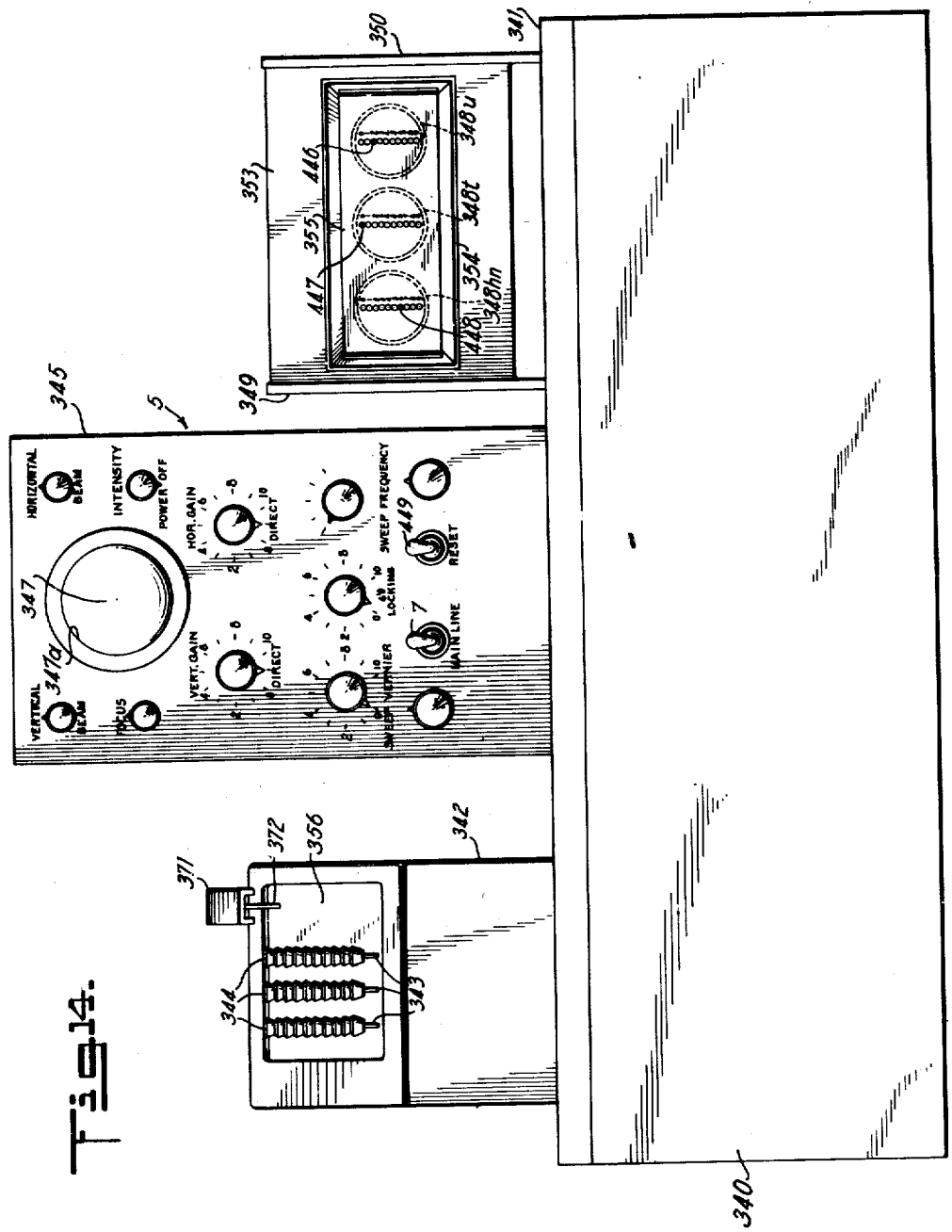

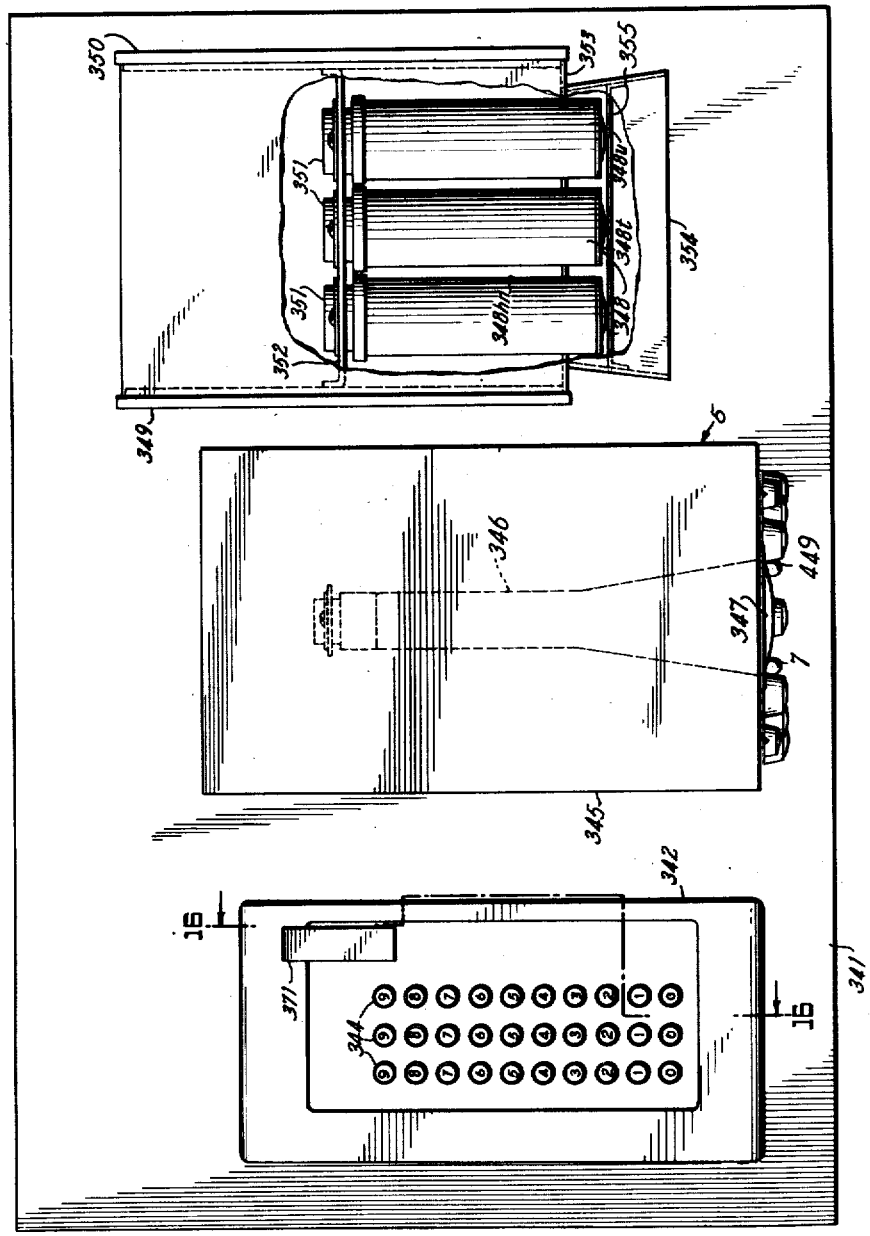

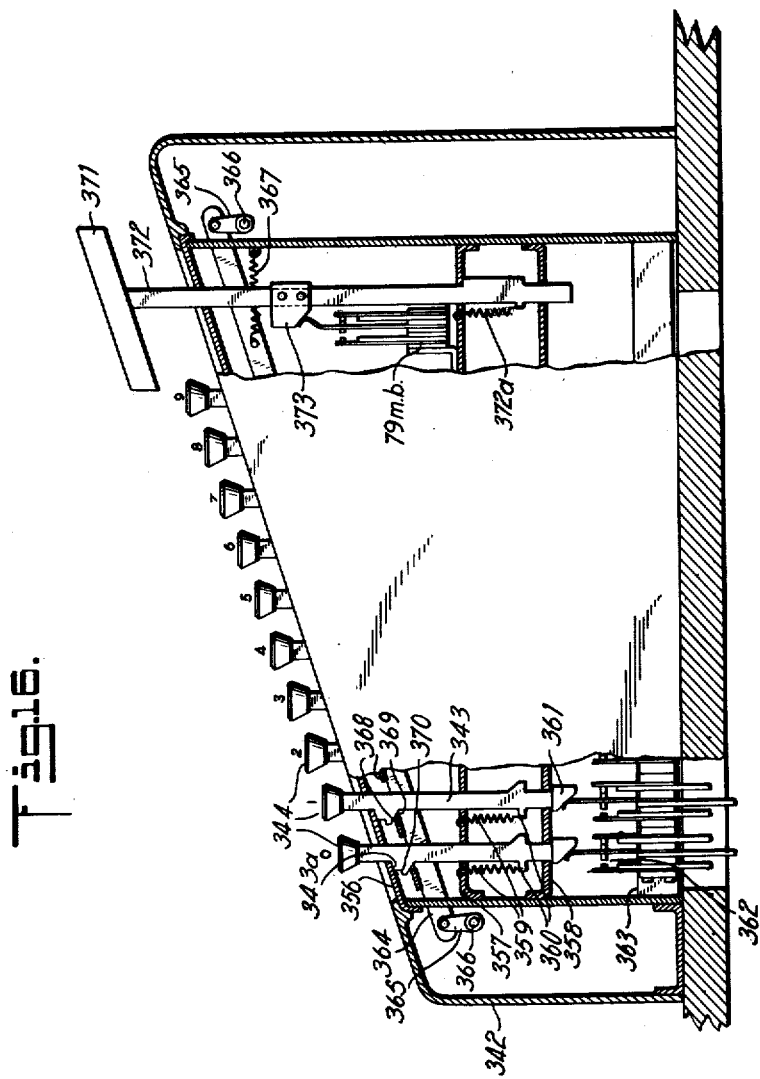

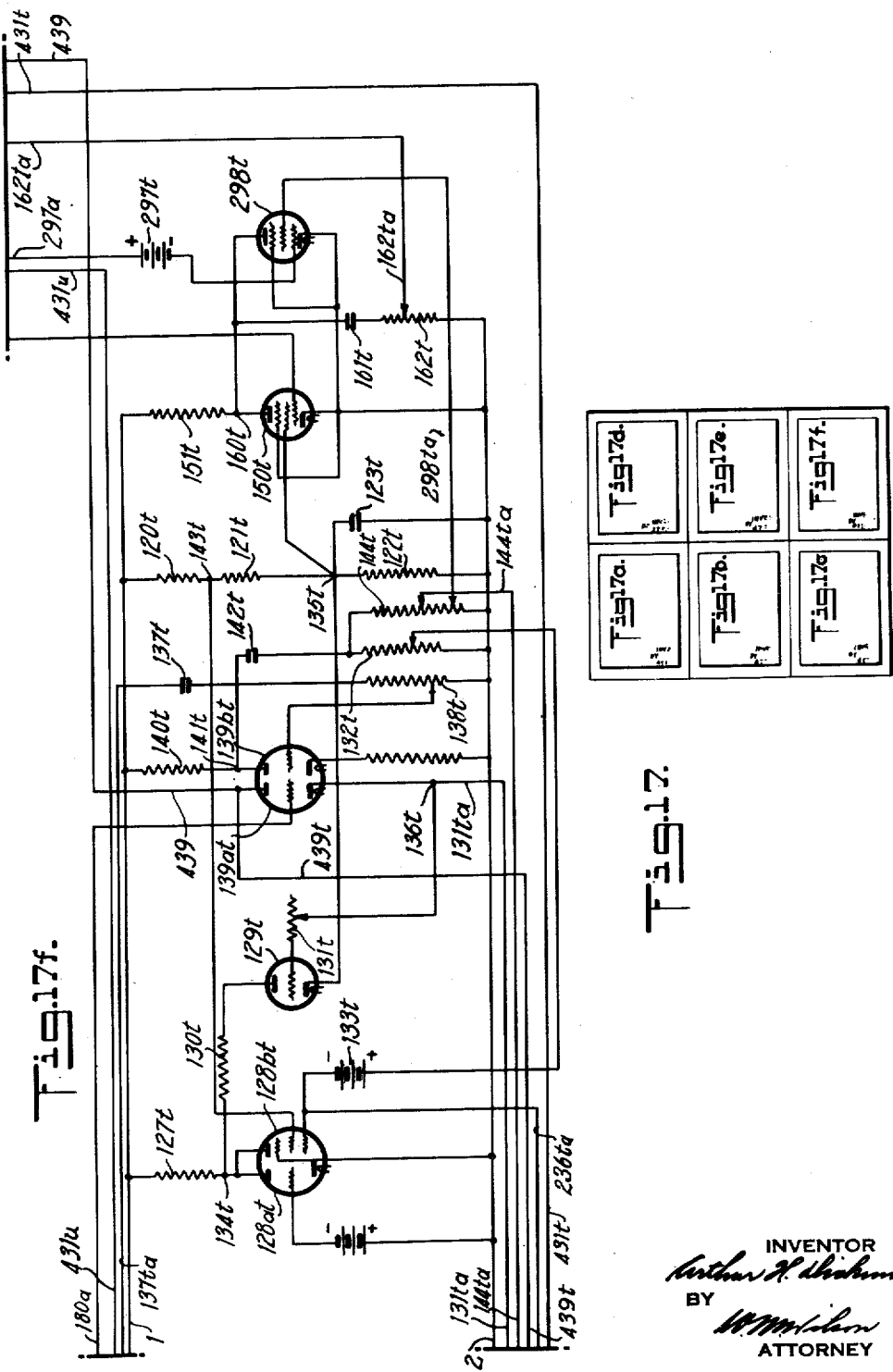

Jan. 1, 1952     A. H. DICKINSON     2,580,740
ACCOUNTING APPARATUS
Filed Jan. 20, 1940     32 Sheets-Sheet 16
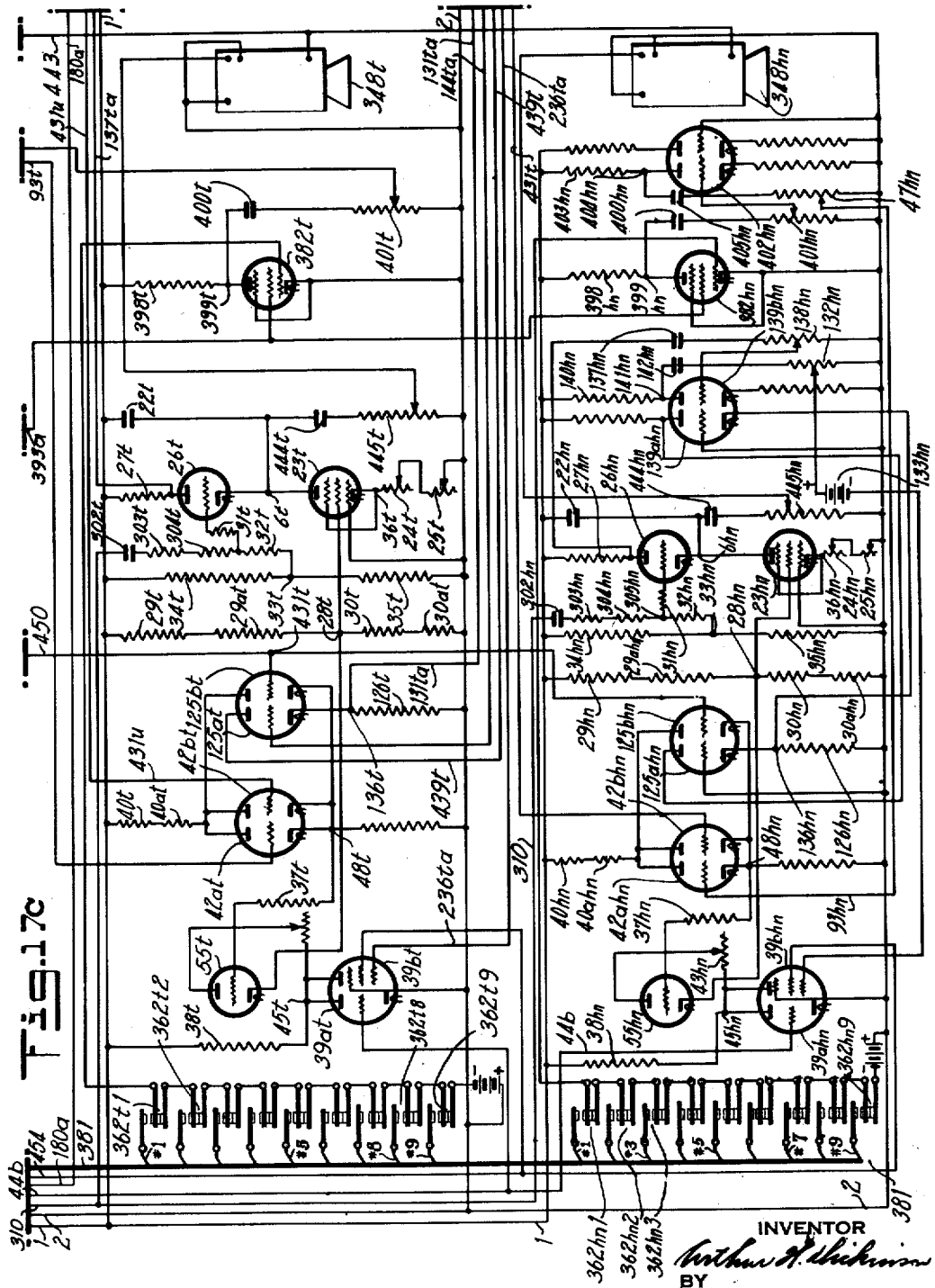
INVENTOR
Arthur H. Dickinson
BY
ATTORNEY

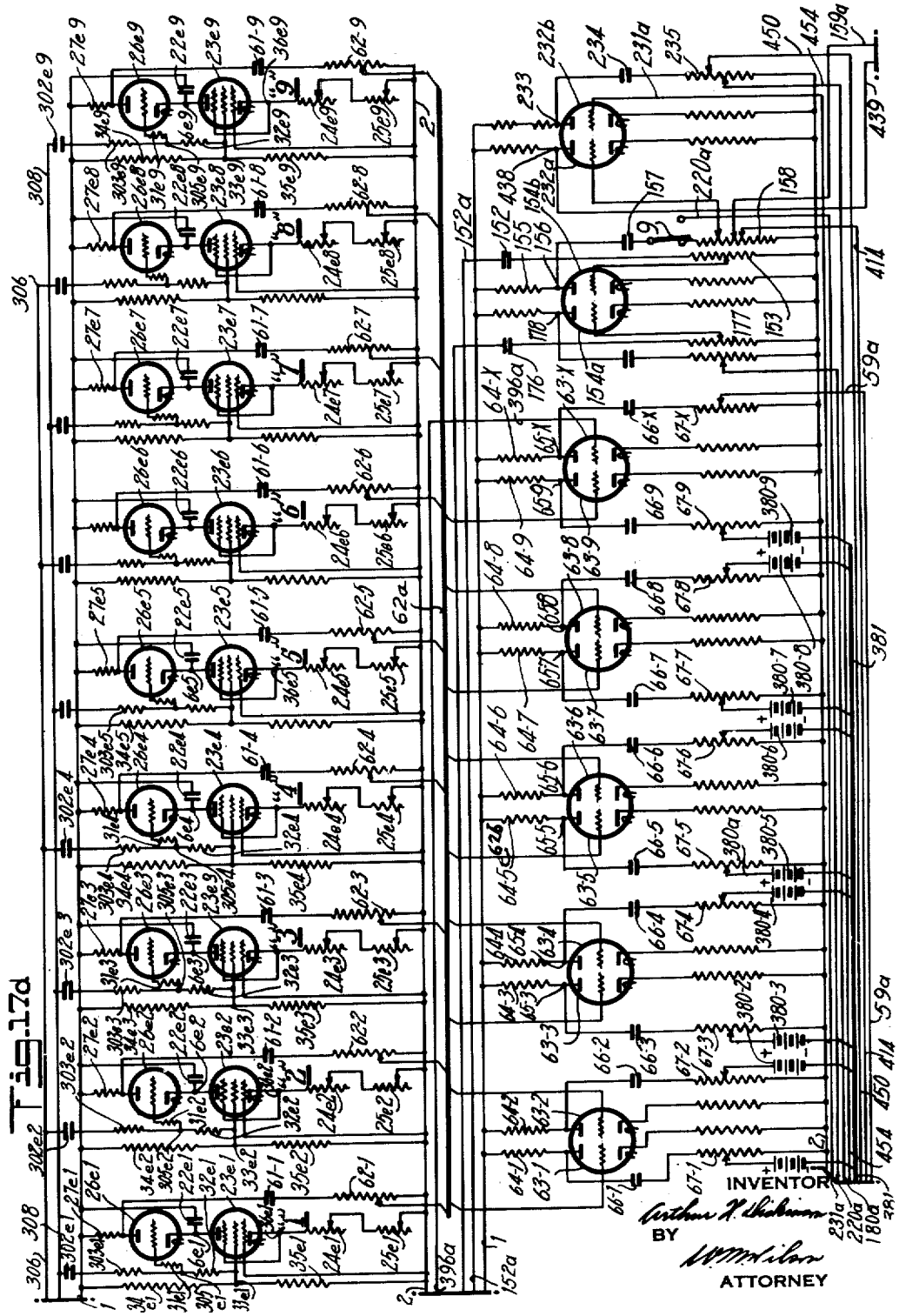

Fig. 17e.

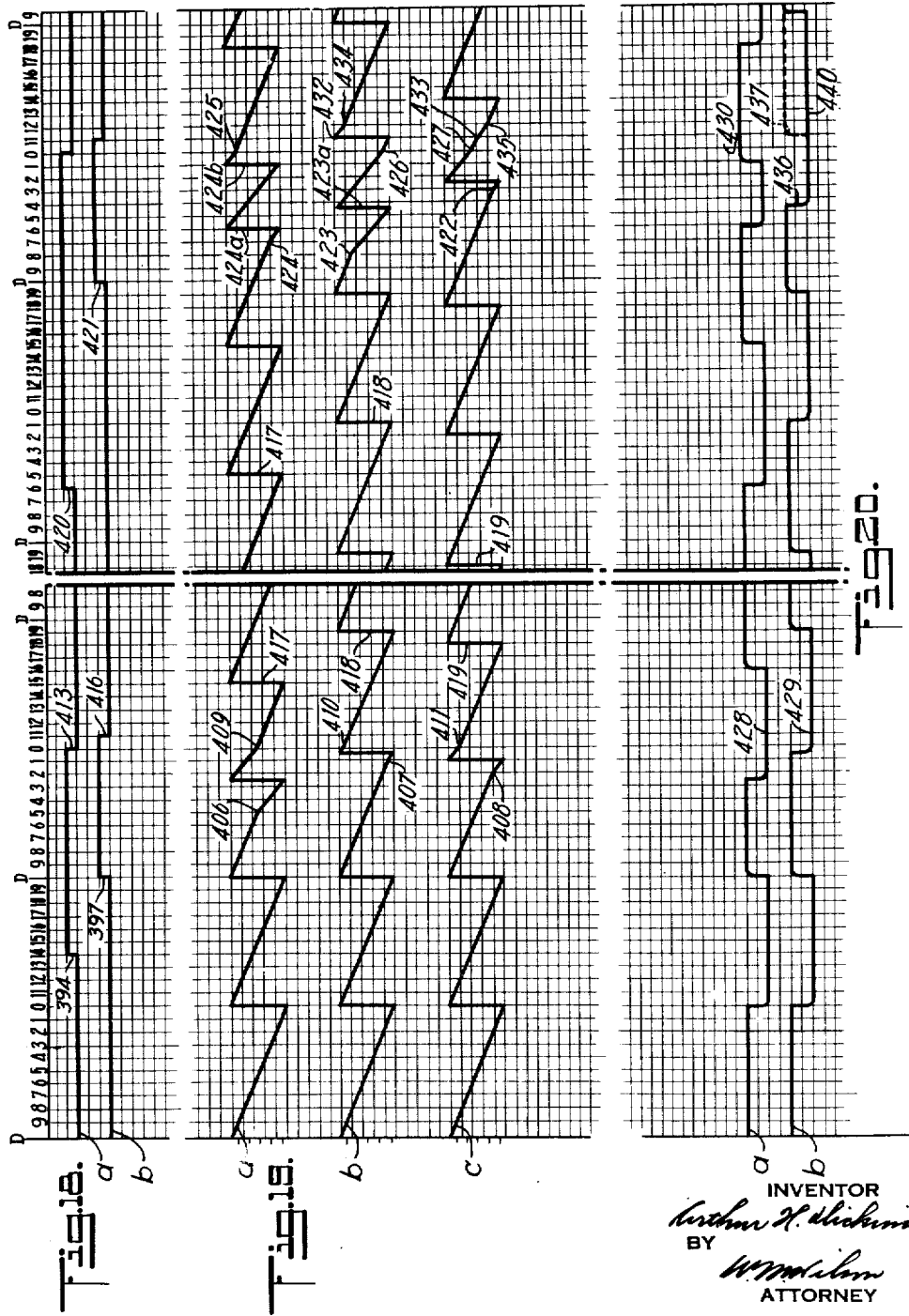

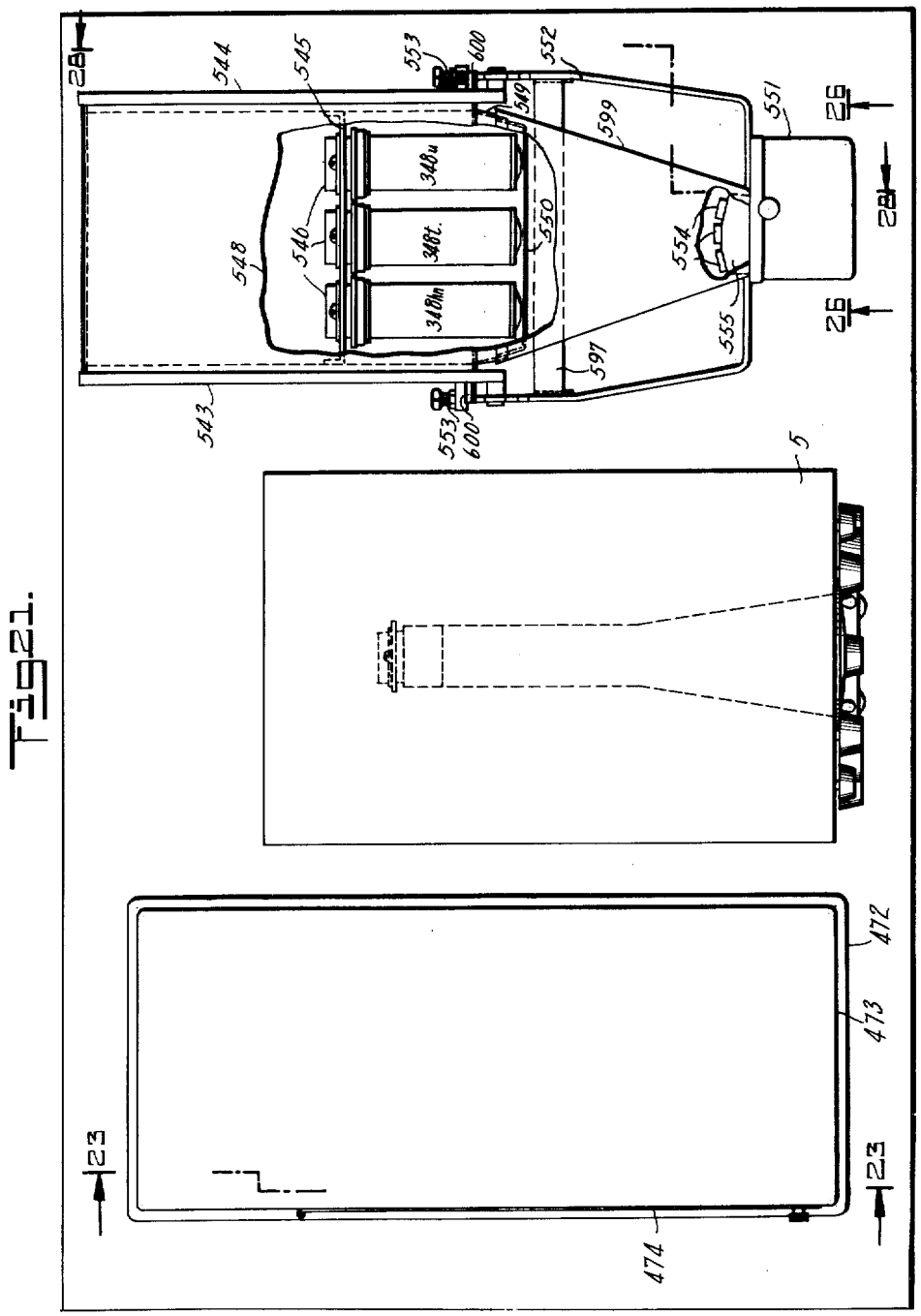

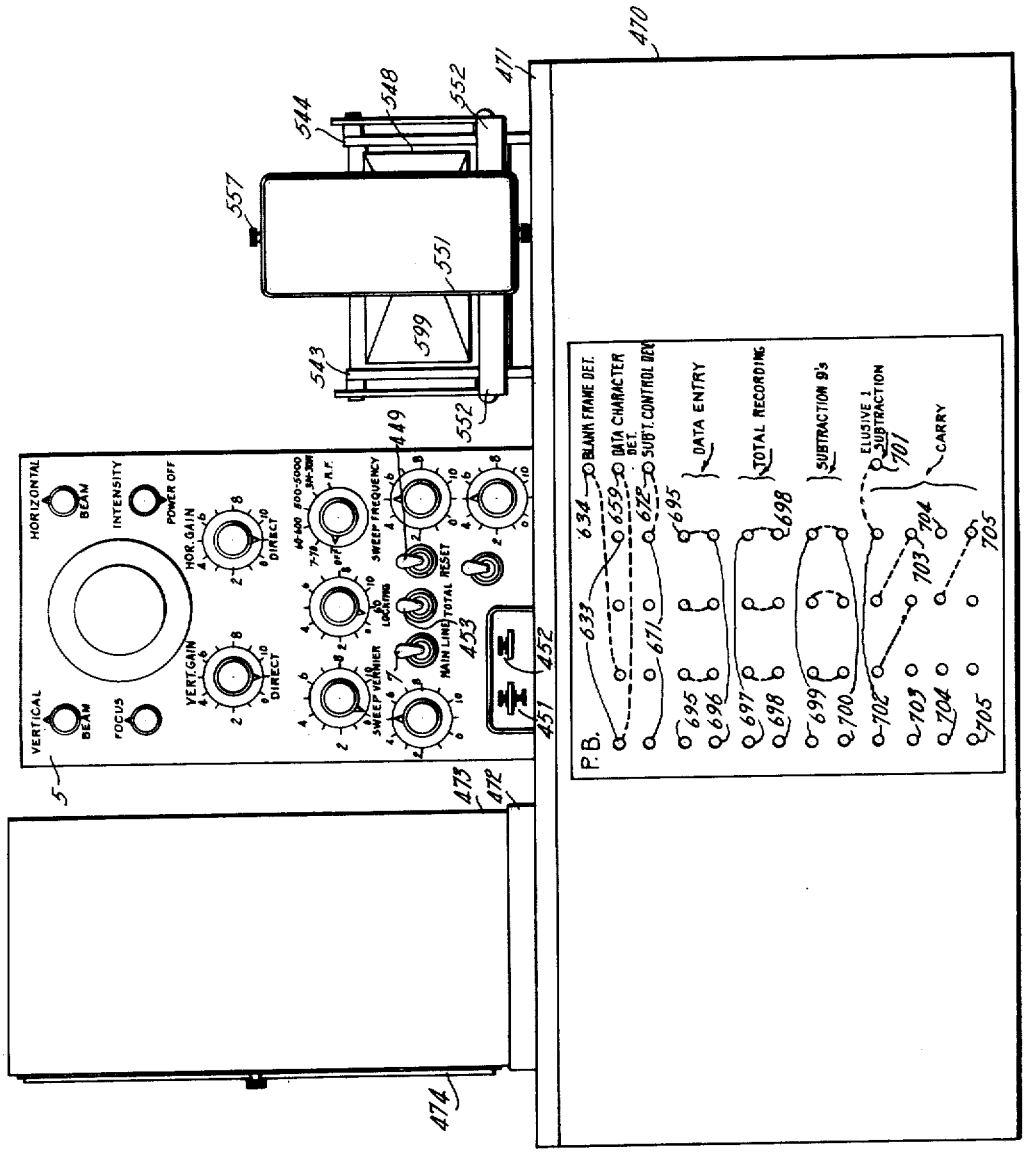

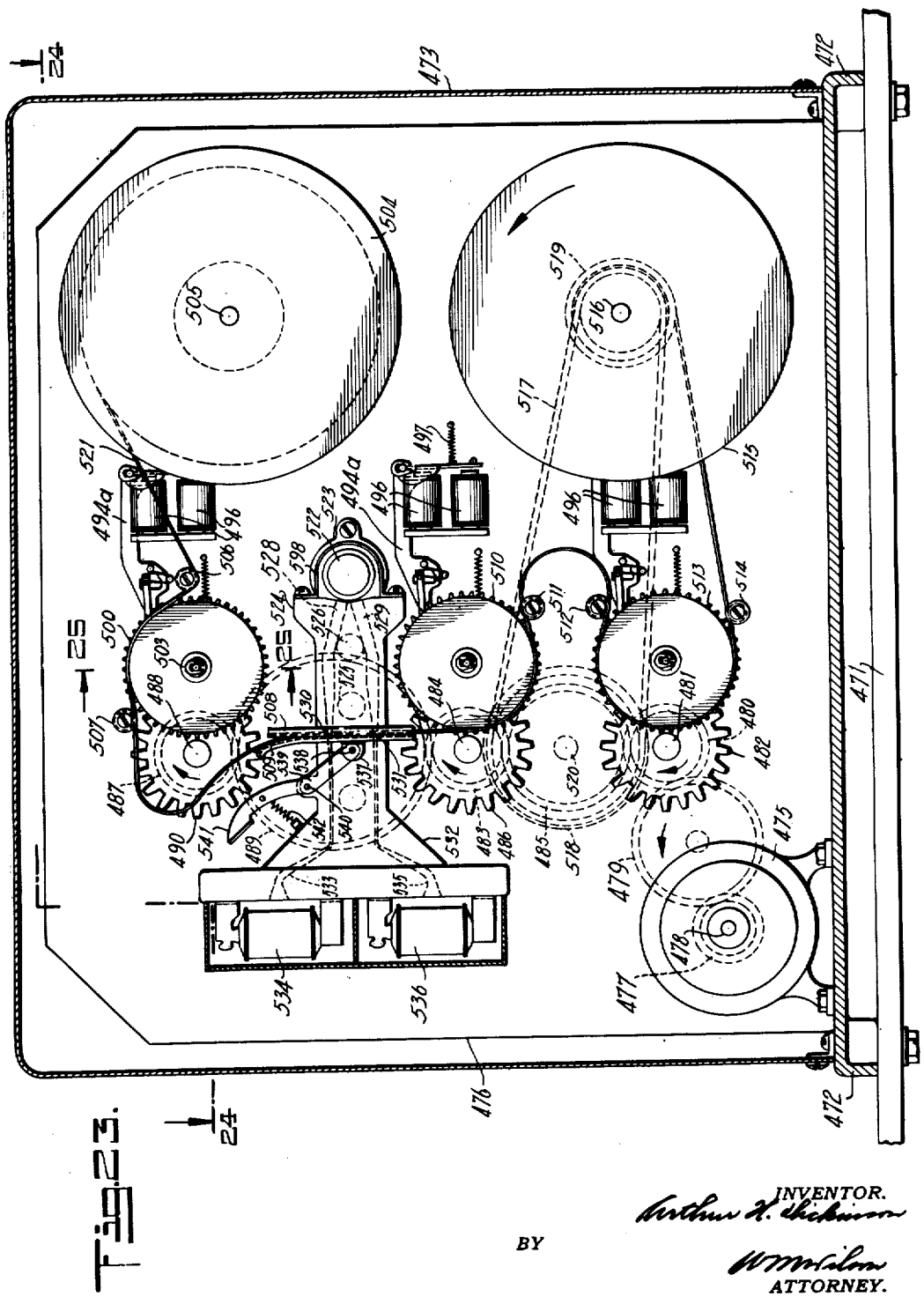

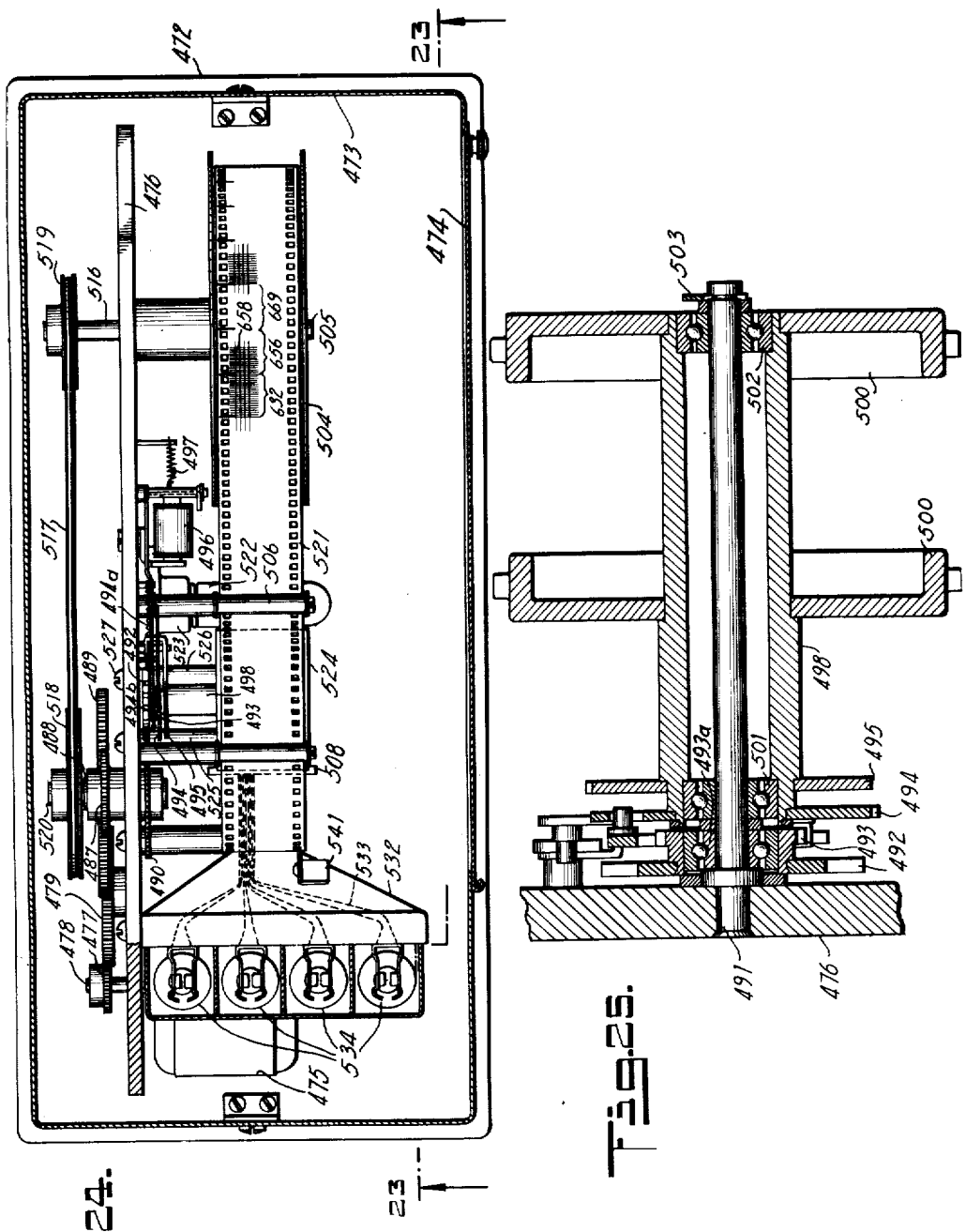

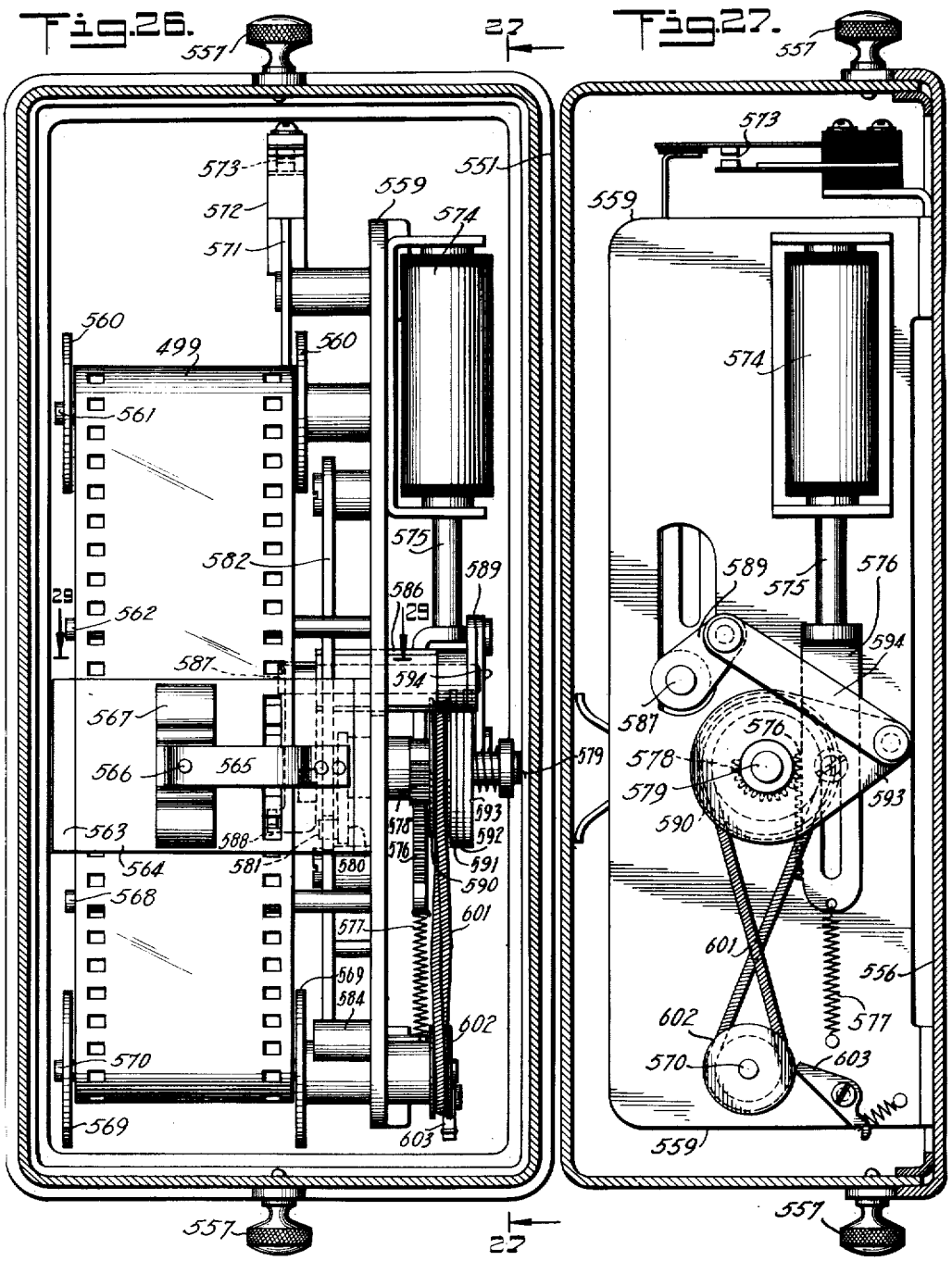

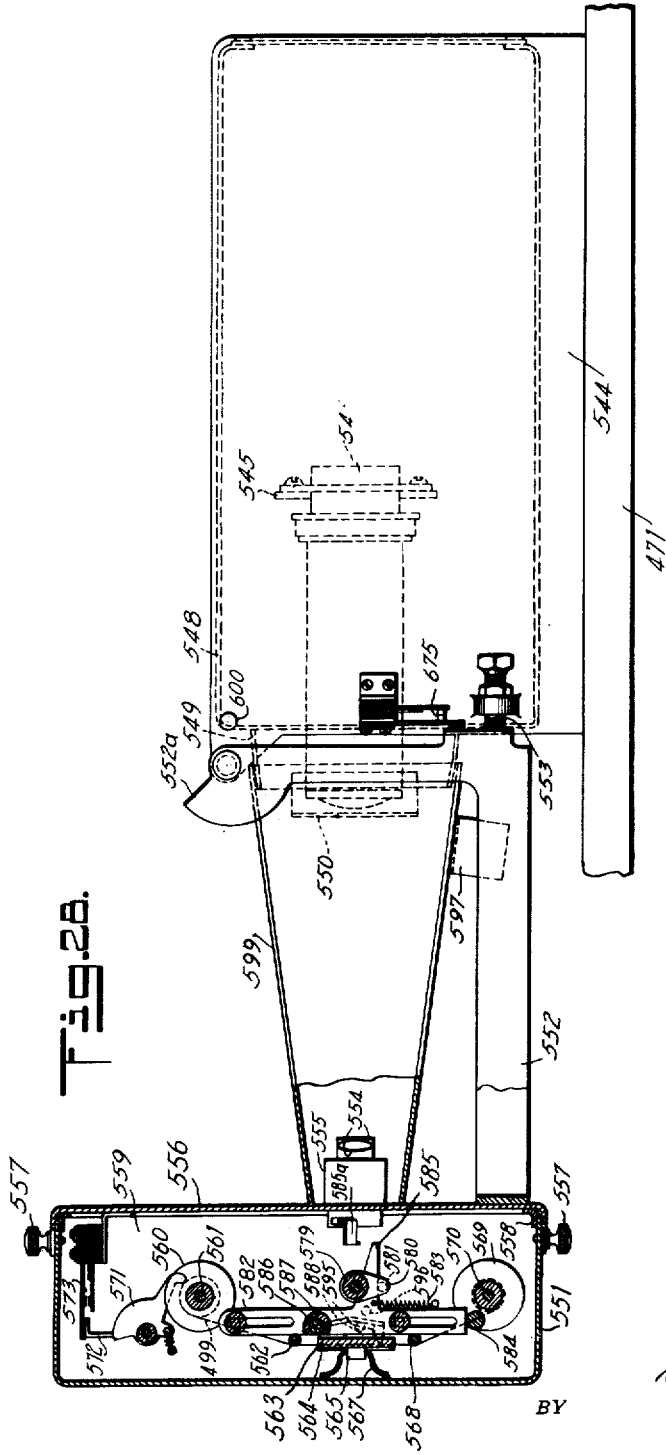

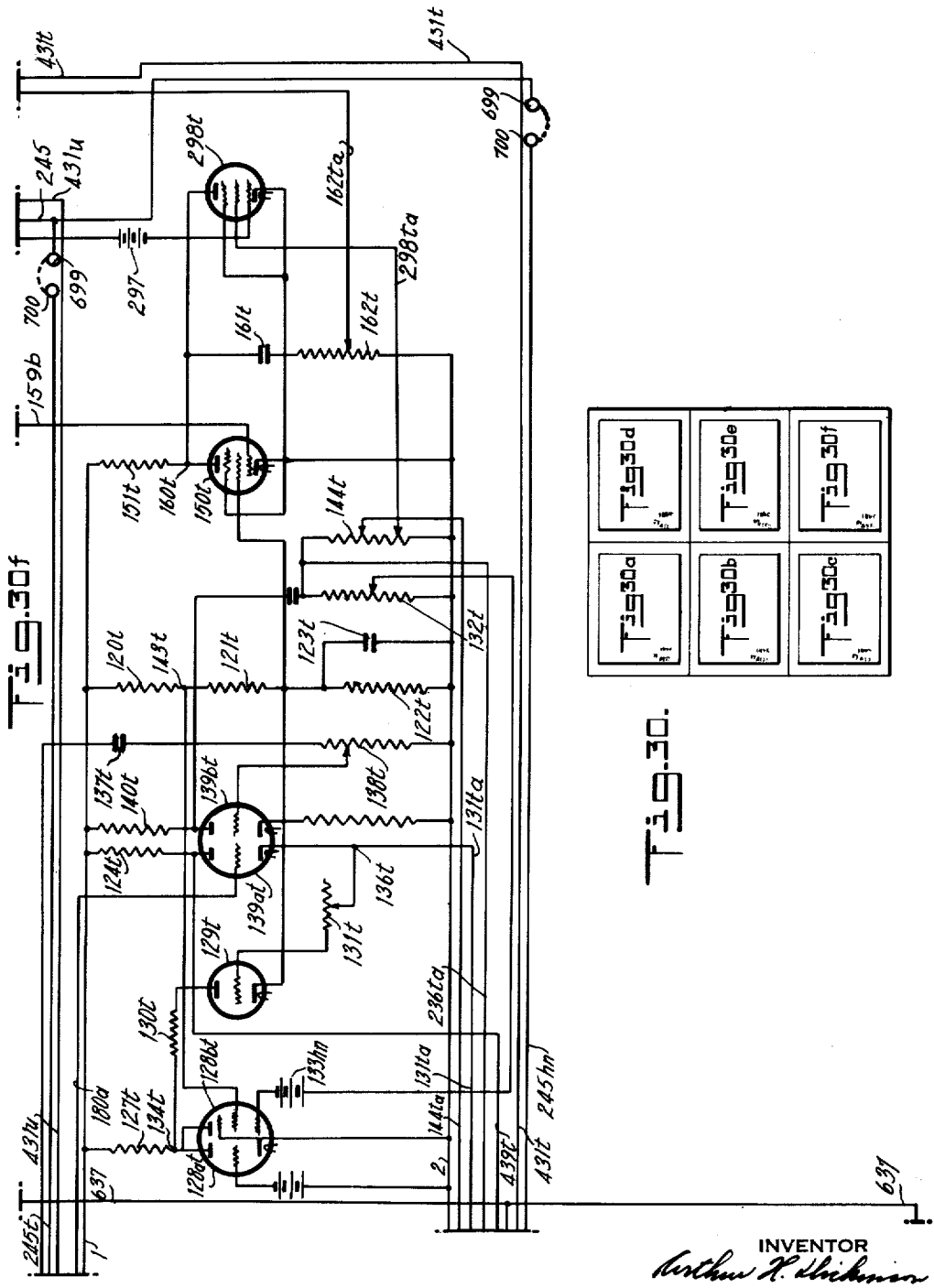

Jan. 1, 1952     A. H. DICKINSON     2,580,740
ACCOUNTING APPARATUS
Filed Jan. 20, 1940     32 Sheets-Sheet 27
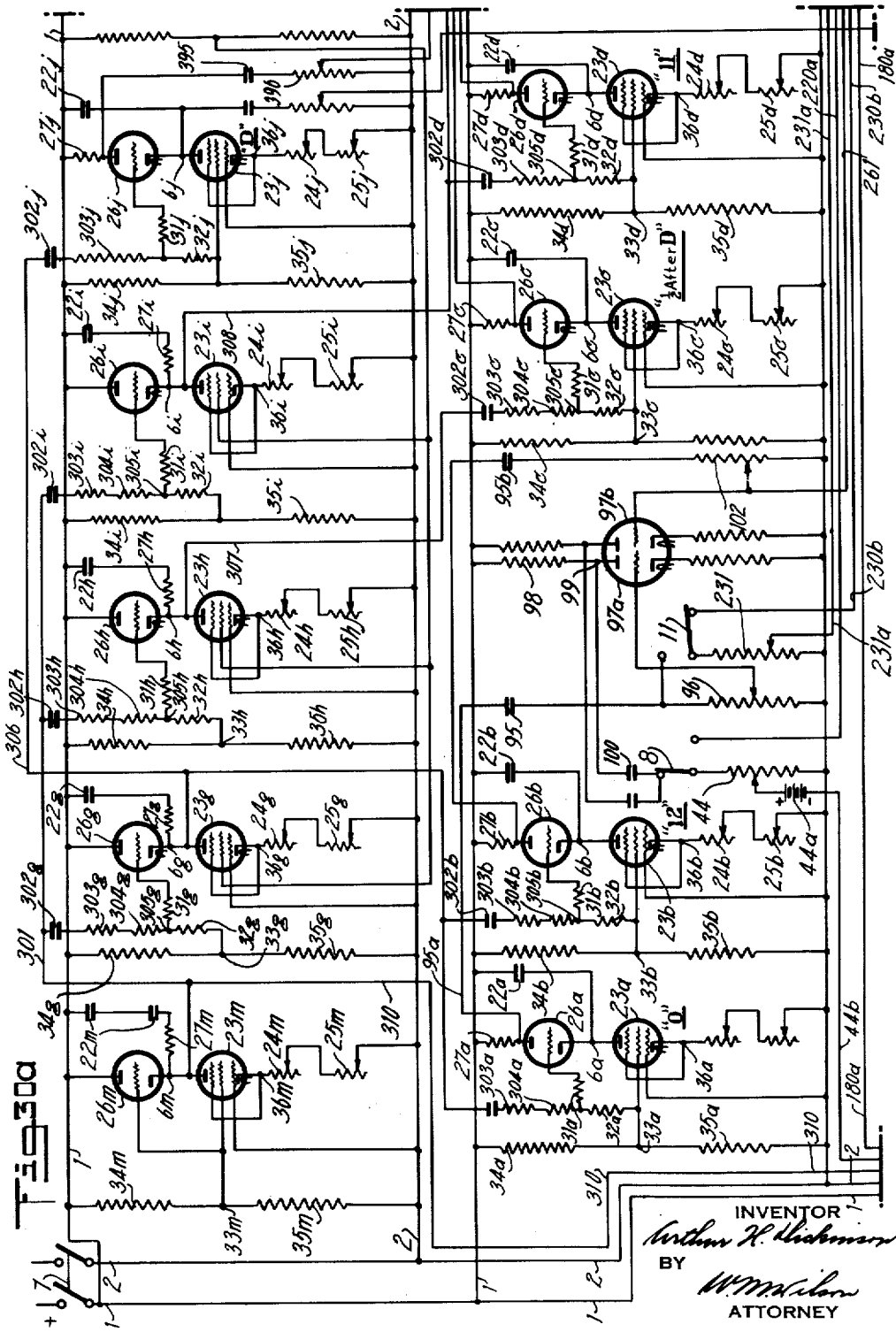

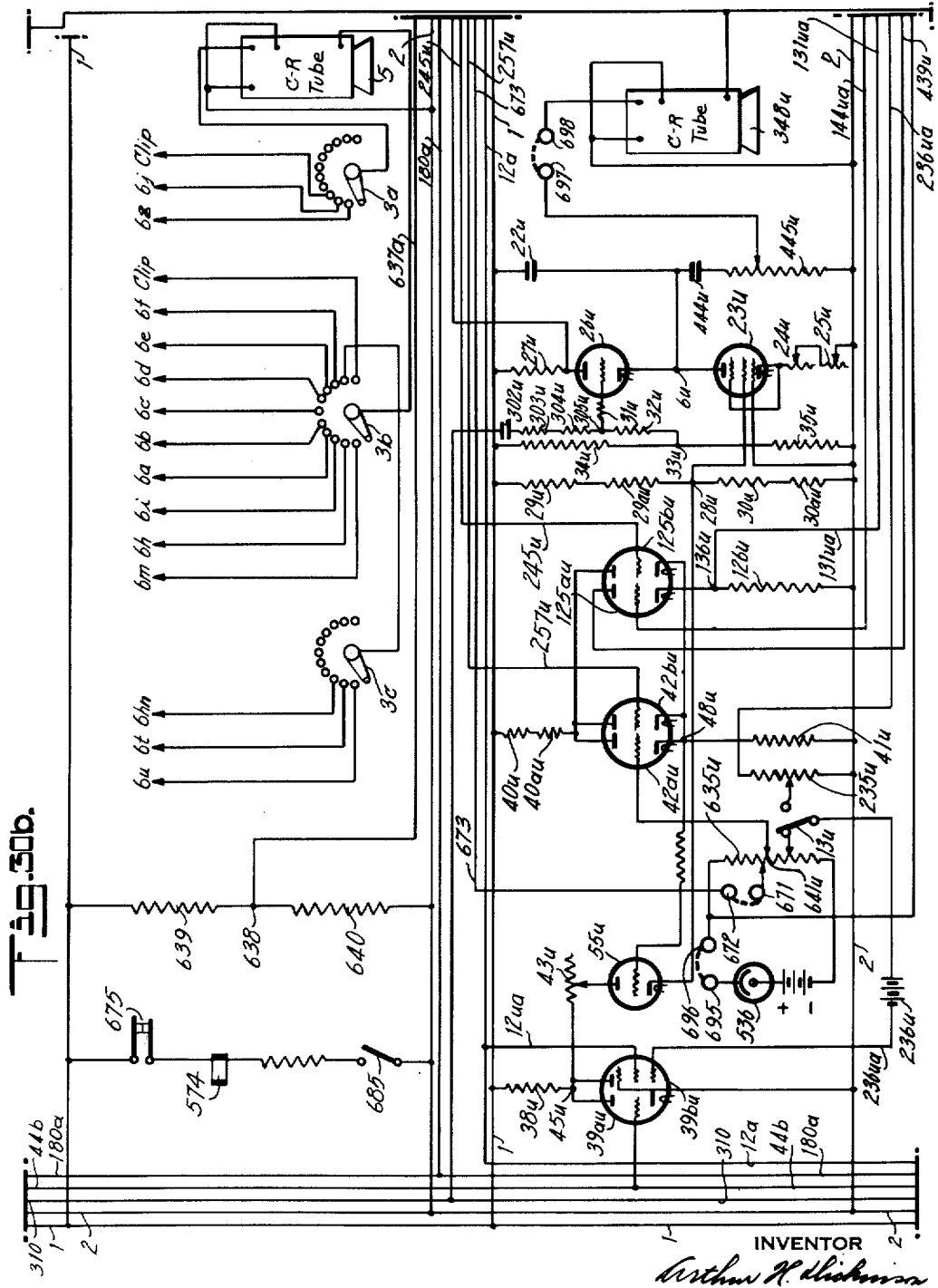

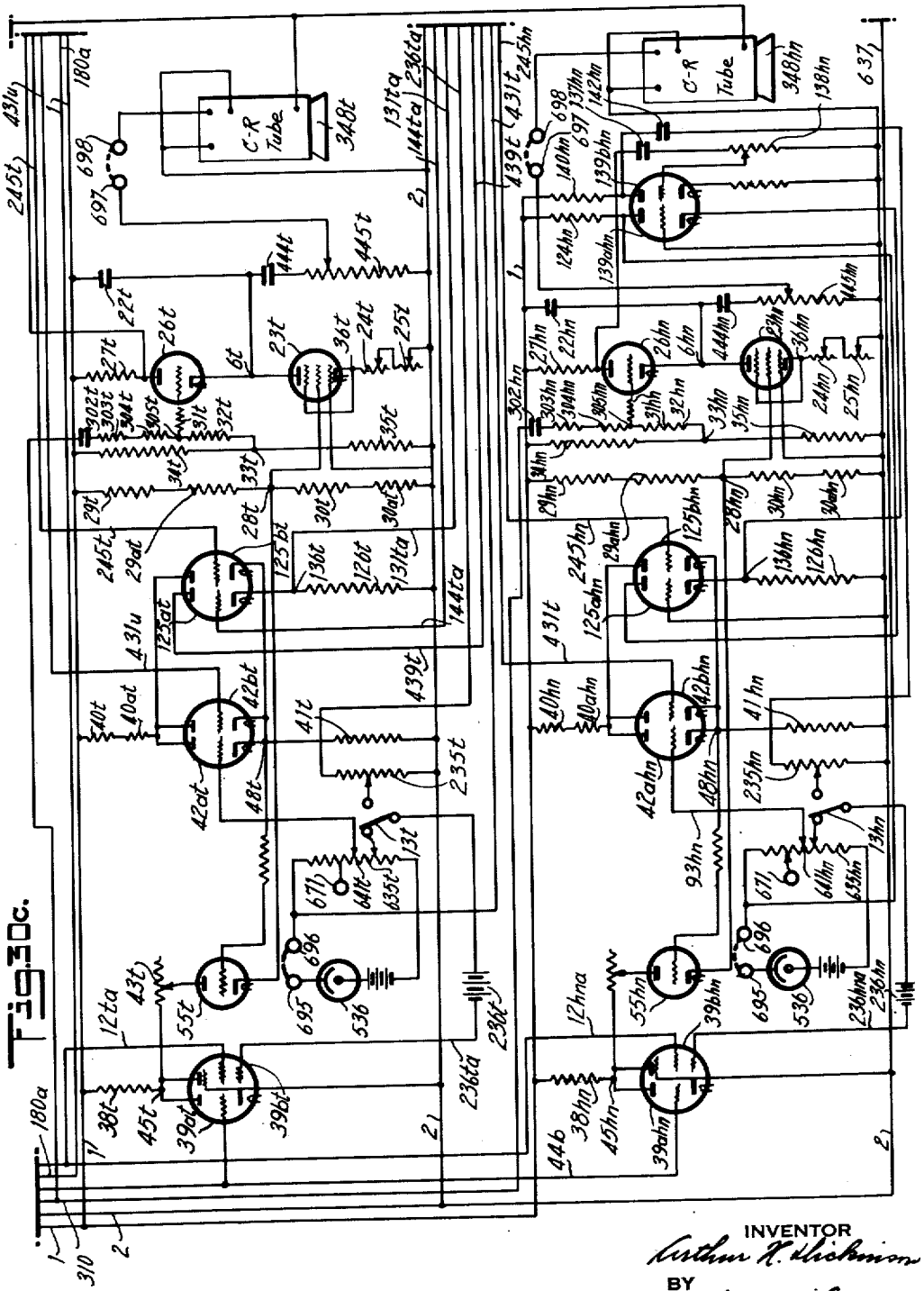

Jan. 1, 1952  A. H. DICKINSON  2,580,740
ACCOUNTING APPARATUS
Filed Jan. 20, 1940  32 Sheets-Sheet 30

Fig.30d.

INVENTOR
Arthur H. Dickinson
BY
W. M. Wilson
ATTORNEY

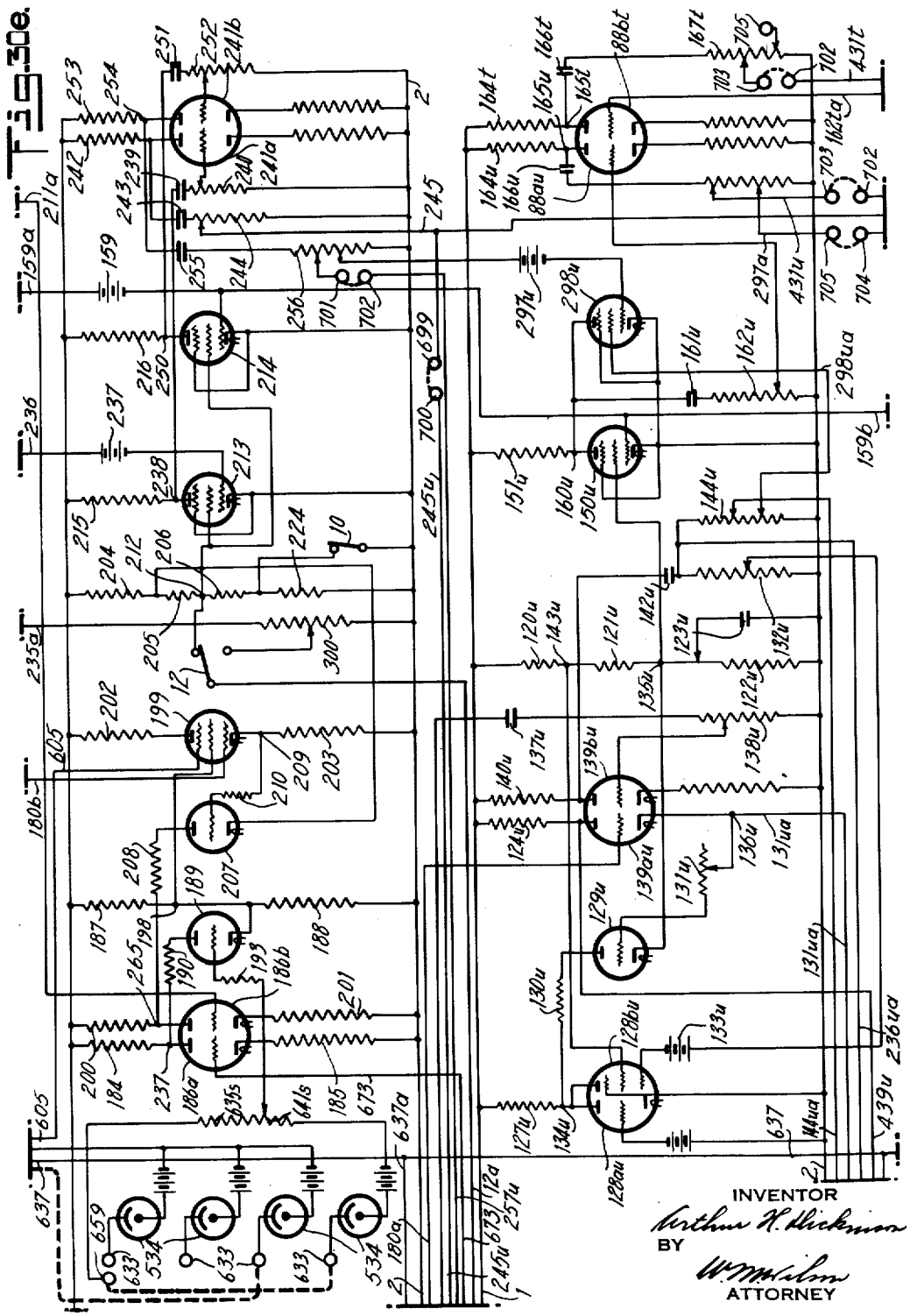

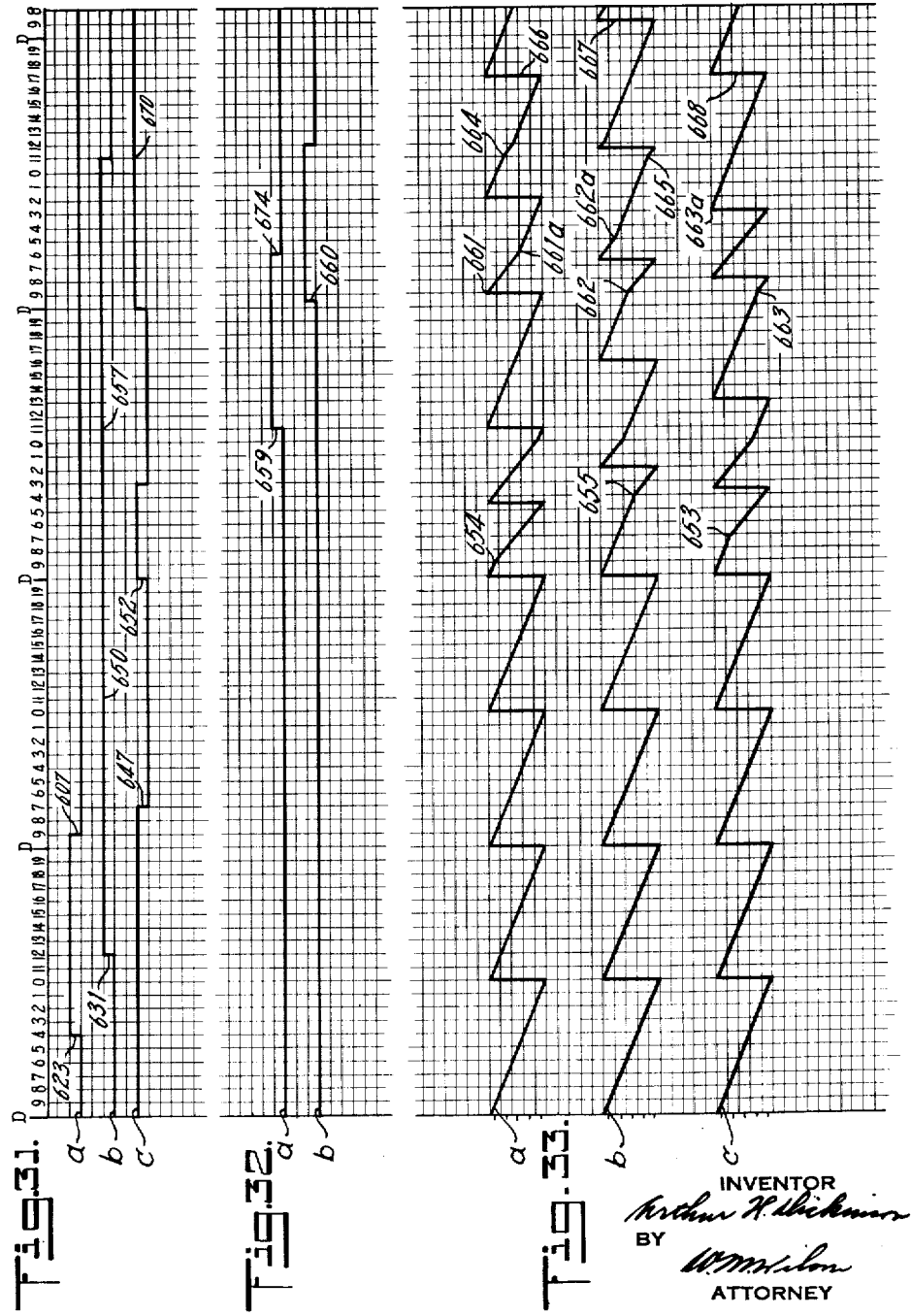

Patented Jan. 1, 1952

2,580,740

UNITED STATES PATENT OFFICE 2,580,740

ACCOUNTING APPARATUS

Arthur H. Dickinson, Scarsdale, N. Y., assignor to International Business Machines Corporation, New York, N. Y., a corporation of New York Application January 20, 1940, Serial No. 314,767

97 Claims. (Cl. 235—61)

The present invention relates to accumulators and the general object is to provide practically inertia-less accumulators embodying solely electronic, controlling and manifesting means, whereby inertia in accumulating devices is eliminated except for electron inertia which has a negligible retarding effect.

More specifically, a device embodying the invention is provided for the purpose of electronically combining manifestations of quantities whereby an indication or manifestation of the summation of these quantities may be obtained.

In devices of the prior art, there have been utilized moving or rotating means whose mass resisted the movement or rotation. The existence of such mass of necessity involved inertia effects which limited the speed of these devices. Further, because of the existence of such mass; noise, wear, and other undesirable conditions existed, which could be reduced by careful design but could not be eliminated.

In view of the above conditions prevailing in the prior art, one of the objects of the present invention is to depart completely from the fundamental limitations of the prior art by the utilization of completely novel means whereby inertia is eliminated, and high speeds and other results completely outside the ambit of the prior art may be obtained.

Another object is to provide a completely novel method of producing a manifestation of cumulately combined quantities.

Still another object is to provide a basically novel accumulator comprising solely electrical means.

Another object is to provide a novel accumulator comprising electrical means for manifesting quantities, and electral means for storing said manifestations to cumulatively combine said quantities.

Still another object is to provide cyclically operating electronic digit manifesting means for manifesting digit values, and means controlled by entry means for selectively controlling said electronic means to effect a manifestation of any chosen digit entered.

A further object is to provide electronic means producing an electronic emission pattern indicative of a first digit, and means controlled by entry means determining a digit to be entered for adjusting said emission during portions of a complete cycle representative of an entry to produce another pattern indicative of the summation of said first digit and the entered digit.

A further object is to provide substantially inertialess means for manifesting quantities, means for positioning said substantially inertialess means, and entry means regulating said positioning means in accordance with determined entries to cause said substantially inertialess means to manifest aggregate quantities.

Still another object is to provide an accumulator having no moving parts.

Another object is to provide an electrical cyclical manifesting element producing an electrical phenomenon of desired pattern and entry control means for determining a digit to be entered controlling means for varying said pattern in accordance with determined digits.

Still another object is to provide a novel accumulator comprising an electronic circuit, control means for said circuit for adjusting the electronic conditions therein to one of ten different conditions indicative, respectively, of ten different digits, entry means producing timed control effects having periods varying with a digit to be entered and means for selectively applying said control effects to said control means.

A further object is to provide means for manifesting a series of multidenominational quantities, and electronic means, per se, cumulatively combining and manifesting said quantities.

Another object is to provide in an accumulator, means for manifesting multidenominational quantities, and purely electronic means for producing differentially timed impulses each indicative of a determined entry for concurrently entering the digits of said multidenominational quantities into the accumulator.

A further object is to provide in an electronic accumulator, means for additively and subtractively receiving electronic entries of multidenominational amounts, and means responsive to electronic flow for electrically combining and dynamically manifesting the desired total of said amounts.

Another object is to provide a novel method of effecting carry.

Still another object is to provide novel electronic carry means.

A further object is to provide novel electronic means responsive to a certain sequence of operations within a predetermined time only, for determining when a carry condition exists.

Another object is to provide novel electrical carry means comprising means controlled by a pair of simultaneous, electrical timed effects, one of which is representative of an electronic status of a digit manifesting means.

Still another object is to provide novel carry determining means comprising means producing a relatively fixed timed effect, and adjustable timed means cooperating upon simultaneity with said relatively fixed time only to produce a manifestation of a carry condition.

A further object is to provide novel carry means comprising means controlled by coinciding timed effects for producing carry simultaneously in all orders.

Still another object is to provide novel electronic carry means including means for effecting carry in adjacent or non-adjacent orders at will.

Another object is to provide quantity manifesting means having a wide range of different speeds of operation.

Still another object is to provide a novel method of limiting entries, to one only.

A further object is to provide novel electronic means for limiting entries to a single entry only of the particular entry.

Another object is to provide in combination, novel electronic manifesting means and a cathode ray tube for visually indicating the particular electronic manifestation.

A further object is to provide a novel method of inertialess recording of a quantity or of a summation of a plurality of quantities.

Another object is to provide a novel key-controlled electronic entering device including a plurality of oscillators, each controlled by a respective key and adjusted to produce an electrical oscillation of a phase indicative of a certain digit to be entered.

Still another object is to provide in a novel accumulator provided with a key-board control electronic entry control means for entering quantities, and electronic means for additively combining the respective quantities entered.

Another object is to provide a novel record controlled electronic entering device.

Still another object is to provide in a novel electronic accumulator provided with a record controlled device for producing timed electric conditions indicative of different quantities to be entered, entry control means controlled by said timed conditions adjusting said accumulator to produce a characteristic electronic manifestation indicative of the summation of the different quantities and means controlled by the characteristic electronic manifestation for producing a visible representation of said characteristic manifestation.

A further object is to provide a novel record-controlled electronic accumulator including novel means for suspending subtractive operations upon suspension of record feeding operations.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 is a diagrammatic illustration of the grouping of the figures which grouped together constitute a complete wiring diagram of the manually controlled embodiment of the invention.

Figs. 1a, 1b, 1c and 1d, grouped together as illustrated in Fig. 1, comprise the complete wiring diagram of the manually controlled embodiment of the invention.

Fig. 2 is a diagrammatic illustration of the wave forms or patterns of respective phase relations assumed by a digit manifesting oscillator with the different quantities -0- to -9-, respectively, entered therein.

Fig. 3 is a diagrammatic illustration of the wave forms and phase relations of the main oscillator, intermediate oscillators, and pulsing oscillators.

Fig. 4 is an electrical timing diagram of phenomena occurring during additive and subtractive entries, single entry and carry operations.

Fig. 5 is a diagrammatic illustration of the wave forms of respective phase relations in a digit manifesting oscillator with the sequential additive entry therein of different digits.

Fig. 6 is an electrical timing diagram of phenomena occurring during the entries of Fig. 5.

Fig. 7 is a timing diagram of phenomena occurring in a carry circuit and in a single entry circuit of the manually controlled embodiment of the invention.

Figs. 8a, 8b, 8c, 8d, and 8e are partly diagrammatic illustrations of a cathode ray oscilloscope visibly indicating the quantities entered in a digit manifesting oscillator of the invention.

Fig. 9 is a diagrammatic illustration of the wave forms of respective phase relations in a digit manifesting oscillator with the subtractive entry therein of a chosen digit, assuming a digit already entered, and of timing diagrams of phenomena occurring during this entry.

Fig. 10 is a diagrammatic illustration of the wave forms of respective phase relations existing in a digit manifesting oscillator with a sequential subtractive entry therein, subsequent to the entry of Fig. 9, and of timing diagrams of the phenomena occurring during this entry.

Fig. 11 is a diagrammatic illustration of the wave forms of respective phase relations in a digit manifesting oscillator with a sequential subtractive entry subsequent to the entry of Fig. 10 and of timing diagrams of the phenomena occurring during this entry.

Fig. 12 is an additional timing diagram for the entries of Figs. 9, 10 and 11 indicating the action of the digit manifesting oscillator during subtraction and during entry of the elusive one.

Fig. 13 is an additional timing diagram for the entries of Figs. 9, 10 and 11, indicating the action of the carry mechanism during the respective subtractive entries.

Fig. 14 is a front elevation illustrating the construction of a complete key-controlled device including testing and indicating cathode ray oscilloscopes.

Fig. 15 is a plan view, with parts cut away, of the device of Fig. 14.

Fig. 16 is a view on an enlarged scale of a section taken on line 16—16 of Fig. 15.

Fig. 17 is a diagrammatic illustration of the grouping of the figures which together constitute a complete wiring diagram of the key-controlled embodiment of the invention.

Figure 17A:
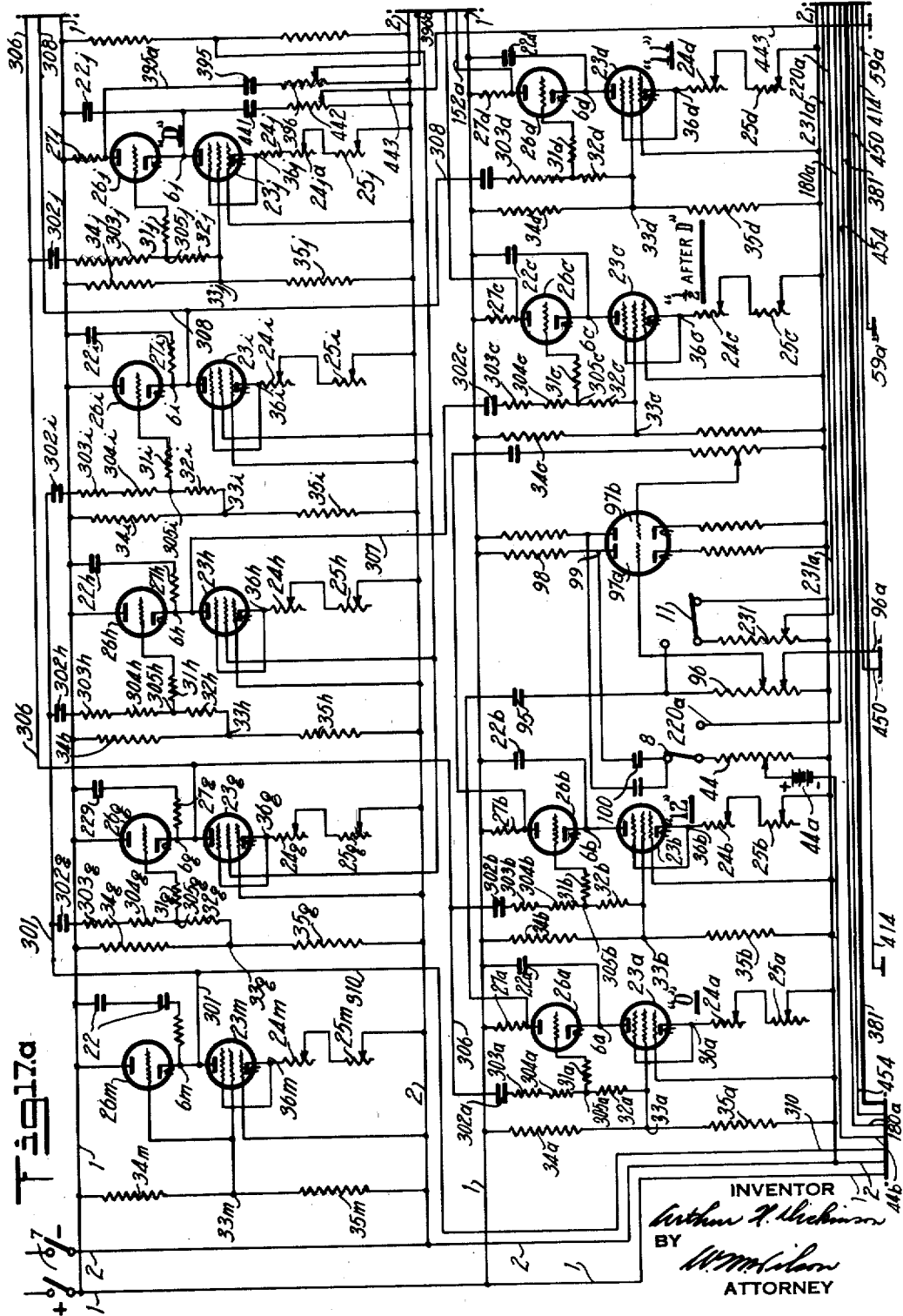
Figure 17B:
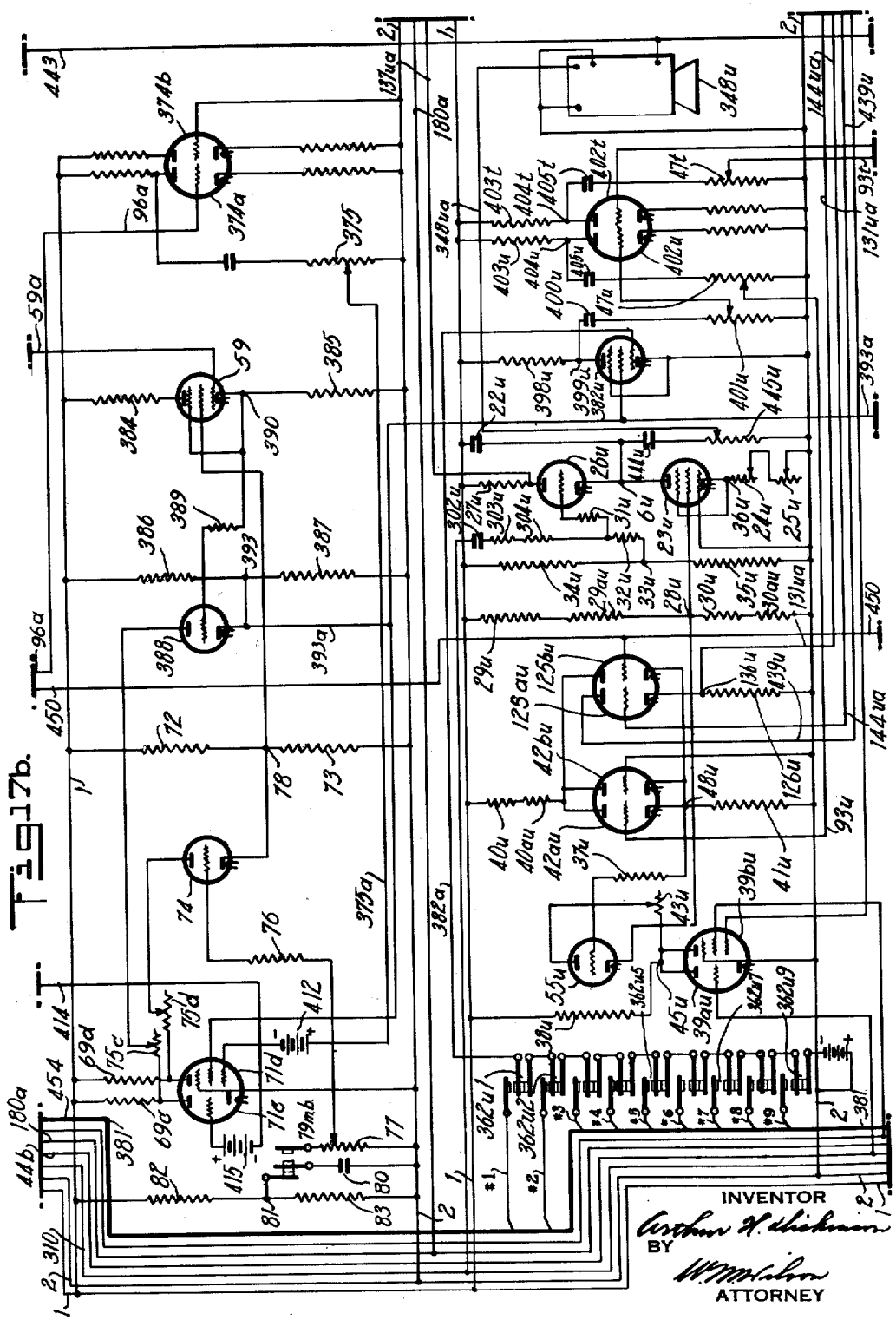
Figure 17E:
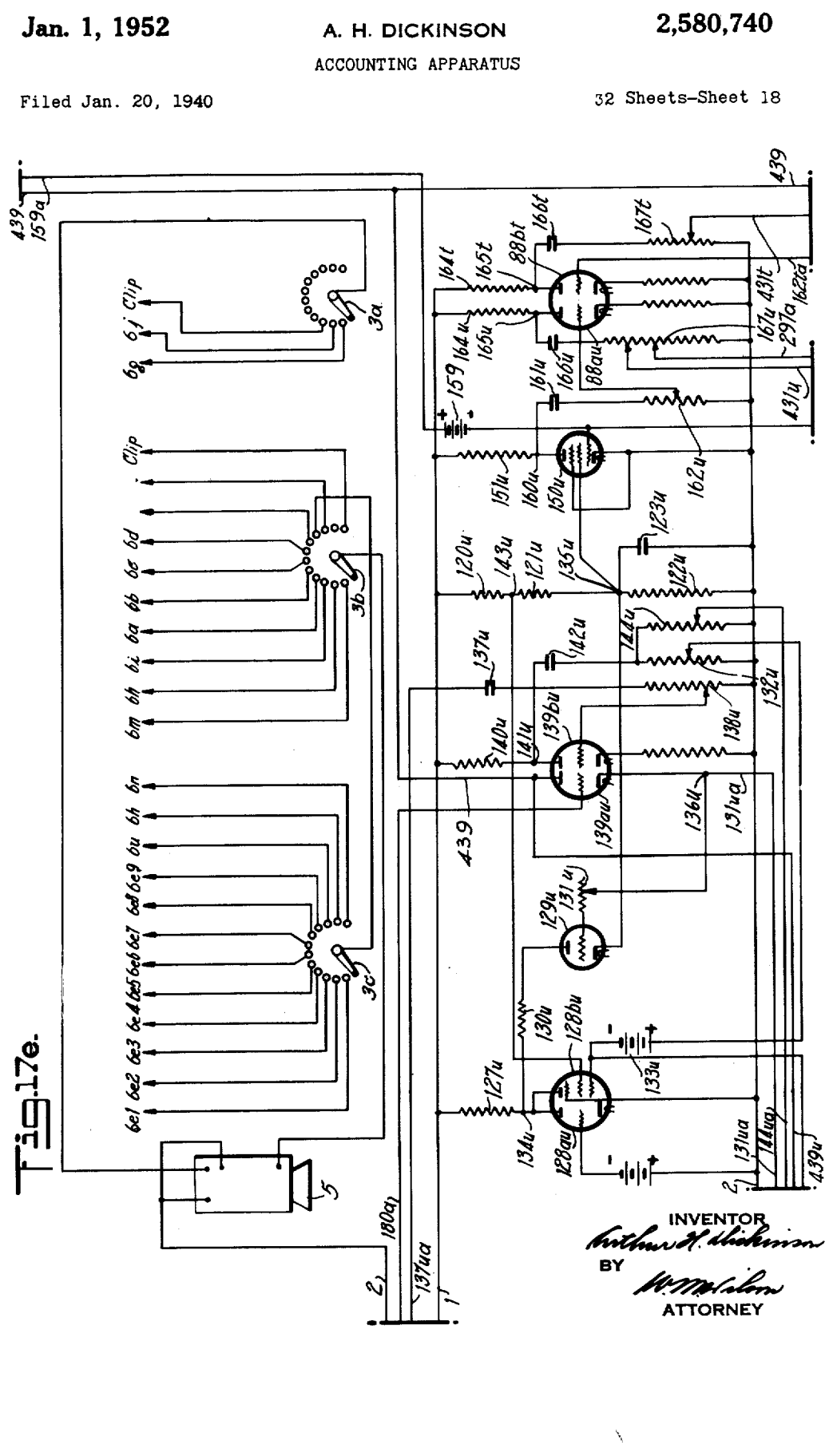

Figs. 17a, 17b, 17c, 17d, 17e, and 17f, grouped together, as illustrated in Fig. 17, comprise the complete wiring diagram of the key-controlled embodiment of the invention.

Fig. 18 is a timing diagram of phenomena occurring in the key-controlled, single entry circuit.

Fig. 19 is a diagrammatic illustration of the wave forms of respective phase relations in digit manifesting oscillators of the key-controlled device, with the sequential additive entry therein of the units, tens and hundreds orders digits, respectively, of a multidenominational entry.

Fig. 20 is a timing diagram of phenomena occurring in carry circuits of the key-controlled embodiment of the invention.

Fig. 21 is a plan view of the three units comprising the record-controlled embodiment of the invention.

Fig. 22 is a front elevation of the three units of Fig. 21.

Fig. 23 is a sectional view taken along the line 23—23 of Figs. 21 and 24.

Fig. 24 is a sectional view taken along line 24—24 of Fig. 23.

Fig. 25 is an enlarged sectional view taken along the line 25—25 of Fig. 23.

Fig. 26 is an enlarged sectional view taken along the line 26—26 of Fig. 21.

Fig. 27 is a sectional view taken along the line 27—27 of Fig. 26.

Fig. 28 is an enlarged sectional view taken along the line 28—28 of Fig. 21.

Fig. 29 is an enlarged sectional view taken along the line 29—29 of Fig. 26.

Fig. 30 is a diagrammatic illustration of the grouping of the figures which, together, constitute a complete wiring diagram of the record-controlled embodiment of the invention.

Figs. 30a, 30b, 30c, 30d, 30e and 30f, grouped together, as illustrated in Fig. 30, comprise the complete wiring diagram of the record-controlled embodiment of the invention.

Fig. 31 is a timing diagram of phenomena occurring during film feed control.

Fig. 32 is a timing diagram of phenomena occurring in a subtraction circuit in the record-controlled device.

Fig. 33 is a diagrammatic illustration of the wave forms of respective phase relations in digit manifesting oscillators of the record-controlled device with both additive and subtractive entries therein of the units, tens and hundreds orders digits, respectively, of multidenominational entries.

In order to simplify the explanation, a manually controlled embodiment of the invention capable of both addition and subtraction will be first described in which the entry of the digits is produced by manual operation of a digit entering device including an oscillator which can be adjusted to a variety of electrical waves or patterns comprising phase representations of any of the digits -1- to -9- inclusive. This oscillator, in the specific embodiment described, has a quantitatively discriminative characteristic which can be adjusted, so that one such quantitatively discriminative characteristic, namely, the peak of the wave, can be adjusted to occur at a chosen point in a cycle, representative of a digit.

There will next be described, a key operated embodiment including circuits for addition only, in which the depression of a selected one of keys located in each of several separate orders and labeled with the digit to be entered controls an oscillator producing one of ten different emission patterns, namely, differently phased electrical oscillations corresponding to that digit to additively enter, respectively, the separate digits, comprising the multidenominational quantity, into the respective orders.

Lastly, there will be described a record-controlled embodiment of the invention including means for feeding the record to the accumulator, said record having formed thereon index points representative of multidenominational amounts to be entered, means sensing the index points to produce timed electrical conditions indicative of the respective digits of the multidenominational amount to be entered, said feeding means, record and sensing means with the accompanying circuits replacing the entry oscillators of the manually operated and key-operated embodiments.

In connection with the manually controlled embodiment, a general description will first be given and the separate elements and associated circuits of the device will be described in detail and also problems in addition, including carry determining and carry effecting, will be explained in detail.

Further, problems in subtraction including entry of the elusive one, carry determining and carry effecting, in connection with the subtraction problems, will also be fully described. Also, the method of indicating the various digits forming the quantities and the method and means for producing a resetting operation will be described in detail in connection with the manually controlled embodiment. These detailed explanations, as applied to the manually controlled embodiment, will therefore serve as the basic explanation of the various operations in the detailed descriptions of the key operated and record operated embodiments, respectively, which follow that of the manually controlled embodiment.

1. *General*

Before proceeding to a detailed description of the completely novel accumulator, a more general description will be set forth. Each order of the accumulator comprises a number of electronic tubes and related circuits comprising electronic digit manifesting means. The electronic emission is varied under the control of entry means producing differentially timed impulses, each indicative of a determined entry, and means controlled by these impulses regulate the digit manifesting means to produce an emission pattern indicative of a digit, continually repeated, which comprises a succession of differentially timed impulses indicative of one entry or of the sum of successive entries. For example, when an oscillator circuit is employed for manifesting the digit which stands in a given order, there is produced a qualitative variation such as a variation of the phase of the oscillations produced by the oscillator, the particular phase assumed by this oscillator, with respect to a given time base (or one machine cycle of operation) being indicative of a digit entered or of the sum of several digits entered. Whenever amounts are entered, for example by electronic means, into any order of the accumulator, the operation of the oscillator in this order is changed for a certain fraction of one cycle or a certain period of time indicative of each of the entered amounts. The result of such change in operation is to shift the characteristic emission pattern to reposition the same or in other words to shift the phase or discharge point of the oscillator in accordance with successive entries, the phase to which the oscillator is eventually shifted and the repeated manifestations of this last phase being indicative of the sum of a previous digit standing in the given order and the successive digits entered or of the difference therebetween. When carry is effected, the operation of one or more oscillators is likewise changed, to step along the phase position an amount proportional to a unit digit entry. Carry operations are determined and performed by electronic means such as tubes and associated circuits. The digit standing in each order of the accumulator may be visibly manifested by utilizing the characteristic, repeated, electronic manifestation to control an oscilloscope such as a cathode ray tube indicator to produce a repeated visible indication of the characteristic manifestation or by making an inertialess recordation utilizing a cathode ray tube recorder and the novel digit manifesting means.

Various controlling energy changes such as current impulses are employed in this accumulator for initiating, suppressing and terminating entry, carry and other operations. The means for producing these electrical impulses may comprise electrical oscillators whose phases are adjusted so that the oscillators produce cyclic timed impulses which may be repeated and which impulses are adjusted to occur at the proper times in each machine cycle whereby a desired sequence of controlled operations may be produced. These oscillators and the digit manifesting oscillators, which also produce repeated cyclic timed impulses in all accumulator orders, are synchronized by means of main and intermediate oscillators which oscillators may thus comprise electrical escapement means to thereby provide constant phase relationships among the various phenomena.

After the entry of a series of amounts is completed and the total is determined, either by observation of cathode ray tubes or by a recording operation, the accumulator is zeroized by manually manipulating reset switches controlling electronic circuits which produce repeated entries of a unit digit, to step along, within the cycle, the point of discharge of the digit manifesting oscillators.

As set out above, the principles underlying the electronic accumulator of this invention are first explained in connection with a manually controlled embodiment whose complete wiring diagram comprises Figs. 1a, 1b, 1c, and 1d, combined as in Fig. 1, and illustrating the main, intermediate and pulsing oscillators, a units order of the complete accumulator, including carry and subtraction circuits, and a part of a tens order to indicate when carry is effected.

2. Digit manifesting oscillator

As has been previously mentioned, the digit standing in an order of the accumulator is manifested in the means embodying the invention in a novel manner by means including an electrical oscillator which functions continually to produce repeated electrical emanations which are adjusted so that they are characteristic of a certain digit or of the summation of certain digits. Two cycles of operation of the oscillator are utilized, for example, to define the time base or one complete machine cycle of the accumulator and such base is divided for example into twenty equal parts as is seen in Fig. 2, curve a, or in Fig. 2-a, as it will be hereinafter designated. Since the accumulator is shown as employed in a tens notational system, the phase assumed by a digit manifesting oscillator is dependent upon and can be utilized to manifest the digit standing in a given order. Fig. 2-a illustrates diagrammatically the wave form produced by an oscillator employed as a digit manifesting device in the novel accumulator. The oscillator as shown in Fig. 2-a discharges at "0" and hence is in a phase relationship hereinafter referred to as a "0" phase. It is to be noted that two complete cycles of a digit manifesting oscillator are chosen to equal one complete machine cycle. Figs. 2-b to 2-j, inclusive, show the same oscillator assuming patterns or phases designated as "1" to "9," inclusive, respectively. Assuming that a -0- stands in an order of the accumulator and that an amount of -1- is entered, the phase or emission pattern of the digit manifesting oscillator is changed from "0" as in Fig. 2-a to "1," and this condition is illustrated in Fig. 2-b. It will be appreciated that after nine separate amounts of -1- have been entered, starting from "0," the phase of the oscillator has been stepped along to "9" which pattern is illustrated in Fig. 2-j. Upon receiving another amount of -1- the oscillator, it will be noted, returns to "0" as illustrated in Fig. 2-a. To adjust the oscillator, for example, from "1" to "2," "2" to "8," "8" to "3," etc., its rate of operation over portions of a cycle is changed, as set forth later. The elements and circuits of a digit manifesting oscillator will now be described in detail.

As employed in the following description, it is to be remembered that an expression such as "1" may be considered to mean: the "1" phase, the "1" time, the "1" index point position of a complete machine cycle or the "1" characteristic emission or "1" wave pattern. It is further to be specifically noted that the index points "9" and "11" are corresponding points, as well as "8" and "12," "7" and "13," "6" and "14," "5" and "15," "4" and "16," "3" and "17," "2" and "18," "1" and "19" and "0" and "D," respectively.

The form of oscillator to be described in connection with each of the embodiments is known in the art as a relaxation oscillator, which comprises that type depending for its action on the charging of a condenser through a resistance. The condenser is discharged at periodic intervals by short-circuiting the same, this type of oscillator producing a peaked wave of saw-tooth form, the position of the peak being adjustable (see, for example, Figs. 2-a, 2-b, etc.). During the charging portion of a cycle there is, with respect to time, a constant increase in voltage between the condenser terminals. The condenser discharge from maximum to minimum, when it is short-circuited, is substantially instantaneous, and thereupon charging of the condenser is resumed.

In this invention an electronic device or tube such as a pentode is substituted for the resistance and there is provided as the short-circuiting element, a device known in the art as a gaseous discharge device or tube. The pentode is employed in lieu of a resistor, since with widely varying anode potentials, the current flow therethrough is substantially constant for a given control grid bias setting. Therefore, at whatever frequency the oscillator is functioning, the rise in voltage across the condenser is substantially linear. The gaseous discharge tube, which may be a gas triode, is employed as the short-circuiting device because such a tube has a grid, whose bias value may be variably adjusted, if desired, with the adjusted bias value determining the anode potential at which the tube ignites to short-circuit the condenser.

Referring to the drawings and more particularly to Fig. 1a, the closure of switch 7 supplies current of the polarity indicated to lines 1 and 2 (see also Figs. 1b, 1c, and 1d). Referring now to Fig. 1b, a units order relaxation type oscillator for electrically manifesting the digit in said order comprises condenser 22, pentode 23 and resistors 24 and 25, connected in series between lines 1 and 2. A gaseous discharge tube or triode 26 and a current limiting resistor 27 are connected in shunt with condenser 22. The screen voltage of pentode 23 is derived from a point 28 on a voltage divider formed by resistors 29, 29a, 30 and 30a in series between lines 1 and 2. The grid of tube 26 is connected through protective resistor 31 and resistor 32 to a point 33 on a voltage divider consisting of resistors 34 and 35 in series between lines 1 and 2. Point 33 determines the grid voltage of tube 26. The control grid of pentode 23 is connected directly to line 2, and the suppressor grid directly to the cathode, as shown.

Resistors 24 and 25 are self-biasing resistors for pentode 23 and permit coarse and fine adjustments, respectively, of current flow. The difference in potential between point 36 and line 2 supplies the control grid bias of pentode 23. The normal frequency of the oscillator may be changed by changing electrical characteristics thereof, namely, by varying the setting of any one or all of the following: condenser 22, resistor 24, resistor 25, the grid bias of gas filled triode 26 and the screen voltage of pentode 23.

3. Main, intermediate, and pulsing oscillators

As has been pointed out above, other oscillators are employed for producing cyclically repeated electrical impulses which are utilized for initiating and terminating various accumulator operations. These oscillators, in the device as now described, are also of the relaxation type and since their circuits are substantially similar to those of the digit manifesting oscillator 23—26 hereinafter designated simply as 23—26, it is not believed necessary to discuss them in detail. Elements of these several oscillator circuits which correspond in character and function to elements of the oscillator circuit described above are given the same reference characters but have added thereto the suffixes "a," "b," "c," "d," "e," and "f," respectively. In the 23—26 oscillator circuit, the screen grid of pentode 23 is connected to point 28 and the grid of tube 26 is connected to point 33. With regard to the impulse producing or pulsing oscillators (Fig. 1a), the screen grids of pentodes 23a, 23b, 23c, 23d, 23e (Fig. 1a) and 23f (Fig. 1c) and the grid circuits of gas discharge tubes 26a, 26b, 26c, 26d, 26e (Fig. 1a) and 26f (Fig. 1c) are both, respectively, connected to points 33a, 33b, 33c, 33d, 33e and 33f (see Figs. 1a and 1c). Thus these points on the respective voltage dividers 34a, 35a; 34b, 35b; etc.; determine the screen voltages of the associated pentodes and likewise the grid voltages of the associated gas triodes.

As previously stated, a main oscillator, producing repeated cyclic timed impulses or oscillations is provided for synchronizing purposes, i. e., to maintain the digit manifesting, the pulse producing, and the intermediate oscillators at constant frequencies and phases. This main oscillator is also of the relaxation type and therefore need not be described in detail. Elements of the main oscillator circuit which correspond in character and function to elements of the 23—26 circuit are given the same reference characters but with an "m" suffix added thereto. Attention, however, is directed to the fact that the current limiting resistor 27m (Fig. 1a), in lieu of being in the anode circuit of gas triode 26m, is in series with the condensers 22m and between line 1 and the cathode of 26m. The grid circuit of gas triode 26m extends directly to point 33m and the screen grid of pentode 23m is also connected to point 33m. Three intermediate oscillators are provided, for a purpose which will be described later, and these are also of the relaxation type and therefore need not be described in detail. Elements of the intermediate oscillator circuits which correspond in character and function to the elements of 23—26 (Fig. 1b) are given the same reference characters but with the suffixes "g," "h," and "i," respectively added thereto. The resistors 27g, 27h, and 27i (Fig. 1a) are located similarly to resistor 27m, as described above, while the screen grids of 23g, 23h, and 23i as well as the screen grid of 23e are connected to point 28 in the voltage divider 29 and 30 of Fig. 1a.

4. Frequency and phase relationships

For purposes of digit designation and for obtaining designated pulses which vary in time relationship, each accumulator cycle is divided into twenty portions. The normal frequency of all pulse producing oscillators (see Figs. 3-e to 3-j, inclusive) is such that they complete only one period of oscillation in this time interval, that is the condenser in each one of these oscillator circuits is discharged once per accumulator or machine cycle.

Referring to Fig. 3-e, it is seen that pulse producing oscillator 23a—26a discharges at "0" and in the drawings (Fig. 1a) this oscillator is designated by "0." Oscillator 23a—26a will hereinafter be referred to simply as 23a—26a. Oscillators 23b—26b, 23c—26c, 23d—26d, and 23f—26f are seen by reference to Figs. 3-f, 3-g, 3-h and 3-j, respectively, to discharge at "12," "½ after D," "11" and "9," respectively, and such oscillators are designated in the drawings as "12," "½ after D," "11" (Fig. 1a) and "9" (Fig. 1c), respectively. With respect to oscillator 23e—26e, designated in Fig. 1a by "Entry," it is seen by reference to Fig. 3-i, that this oscillator can be adjusted to "9" (dashed line wave) "5" (dash-dot line wave) or "2" (solid line wave). In fact, it is to be particularly noted, that in the manually controlled embodiment of the invention (the one at present being described) oscillator 23e—23e can be manually adjusted to produce any desired pattern of emission, namely, it can be adjusted to produce any one of ten characteristic patterns or, stated differently, to any one of ten different phase conditions or timings, although, of course, only nine are actually employed, so that any digit, as desired, may be entered and either added or subtracted, in accordance with a desired operation, to any previously entered digit.

For purposes which will be brought out later, the main oscillator 23m—26m is adjusted (see Fig. 3-a) so that its frequency is forty times that of a pulse producing oscillator (23a—26a, for example) or in other words condenser 22m discharges forty times in one machine cycle. Since the main oscillator controls the operation of all oscillators, the forty discharges determine or define the duration of a machine cycle. For purposes which will also be brought out later, the intermediate oscillators 23g—26g, 23h—26h, and 23i—26i are adjusted so that their frequency is ten times that of a pulse producing oscillator so that condensers 22g, 22h and 22i discharge ten times in one machine cycle as is shown in Figs. 3-b, 3-c, and 3-d, respectively. It will be noted in Fig. 3-b that 23g—26g discharges at each even division of one cycle. It will also be noted in Fig. 3-d that 23i—26i discharges at each odd division of a cycle, while in Fig. 3-c it is seen that 23h—26h discharges at each one-half of a division following each even division.

In contrast to the pulse oscillators, the normal frequency of a digit manifesting oscillator (for example 23—26, Fig. 1b) is such that its condenser 22 discharges twice in each machine cycle. With a digit of –0– in the units order, 23—26 has a "0" phase and in this condition, its condenser is shown as discharging at the extreme left in Fig. 5–a. It is to be particularly noted that Fig. 5–a and the other similar figures, diagrammatically illustrate the varying potential (with respect to line 2) of a point in an oscillator circuit, for example, point 6, of 23—26 in Fig. 1b, which explains why the potential rises in Fig. 5–a upon the discharge of the condenser of the oscillator circuit.

5. Entry control circuit

As stated above, whenever a digit is entered into an order of the accumulator, its digit manifesting oscillator is altered in operation by means controlled by an associated entry device for a predetermined period of time dependent upon the entry, with the result that the repeated cyclic operation of the cyclically operating oscillator is varied during a portion of a cycle representative of a digit entered or specifically the phase is shifted, the new phase designation or the differential time in repeated cycles at which a predetermined intensity of flow occurs, corresponding numerically to the new digit standing in that order as long as no further entry is made. The circuits for effecting such a proportional or representative change of oscillator operation to shift the differential time at which the predetermined intensity occurs will now be described.

In order to alter the frequency and phase of a digit manifesting oscillator to adjust the differential time of discharge and thus produce characteristic oscillations or patterns indicative of an entry, the circuit voltages of the oscillator are changed and this operation is regulated by adjusting or control means comprising an impedance network which includes vacuum tubes and a gas triode discharge tube. With this gas triode in a conducting condition, the voltage distribution about the network differs from that which exists when this discharge tube is nonconducting. Such voltage changes are employed to alter the oscillator circuit constants and thereby alter its operation. With regard to the network for the units order, a number of branches are provided as follows: one branch forming a voltage divider comprising resistor 38 (Fig. 1b) and tube 39a in series between lines 1 and 2; the second branch consisting of resistors 40, 40a and 41 and tube 42a in series between lines 1 and 2; the third branch consisting of resistors 29, 29a, 30 and 30a in series between lines 1 and 2, as previously mentioned. A gas triode 55 is interposed between the first and third branches, the anode and cathode being connected, respectively, to these branches. In series with tube 55 is the resistance 43. The grid of gas triode 55 is connected to the second of the branches above mentioned, its circuit including protective resistor 37. It will be observed that the screen grid of pentode 23 is connected to point 28 on the third branch just described.

With regard to this impedance network, when no potential is applied to resistance 44 (see later) the impedance of tube 39a (Fig. 1b) is greater than that of resistor 38, that is, current flow through the voltage divider consisting of 38 and 39a is small and the voltage of point 45 approaches that of line 1. The sum of impedances 29 and 29a is much greater in value than the sum of impedances 30 and 30a so that the voltage of point 28 approaches that of line 2. Therefore, with gas triode 55 extinguished, the voltage difference between points 45 and 28 approaches that between lines 1 and 2.

Resistance 41 is a self-biasing resistor for tube 42a and is so chosen that when no potential is applied to resistor 47 (see later) which potential would be effective on the grid of tube 42a, the current flow through the voltage divider comprising 40, 40a, tube 42a and resistor 41 is such that the point 48 is nearer the potential of line 2 than is point 28. In other words, the potential difference between points 28 and 48 supplies a negative grid bias for gas triode 55 and is of sufficient magnitude to prevent tube 55 from firing at the anode potential for this tube existing between points 45 and 28.

It will now be shown that when the gas triode 55 is ignited, the voltage distribution in the impedance network changes and thereby affects the value of circuit voltages of 23—26 to change its frequency. Suppose that at "2" for example, a positive potential is applied to resistor 47 (Fig. 1b) thereby (by way of line 93, see later) increasing in a positive direction the grid voltage of tube 42a. This produces an increased current flow in the voltage divider consisting of impedances 40, 40a, 42a, and 41, thereby increasing the potential of point 48 with respect to line 2. That is, the potential difference between points 28 and 48 or the negative grid bias of discharge tube 55 is reduced, such reduction of grid bias being sufficient to ignite tube 55. After tube 55 is ignited the potential is removed from resistor 47, as will be explained later. With gas triode 55 conducting, there is current flow between points 45 and 28, through the resistor 43 and tube 55. The current flow provided by the ignition of gas triode 55 depends upon the relative values of the impedances between which the tube is interposed and also upon the setting of resistor 43. There is also an increased current flow through the resistors 38, 30, and 30a. This increase occurs extremely rapidly so that the voltage rise in the impedance network is substantially instantaneous. Hence point 28 rises in potential very rapidly, as is shown in Fig. 6–a at 49.

The rise of point 28 (Fig. 1b) raises the screen grid voltage of pentode 23 thereby reducing its impedance and increasing current flow therethrough. Even though point 36 rises in potential, there is a net increase of the pentode screen grid potential and in accordance with the circuit voltage values of the impedance network, the oscillator frequency increases. In Fig. 5–a, the oscillator is shown changing its rate of operation at 50 which is at "2," namely, when gas triode 55 becomes ignited. Beginning at point 50, the slope of the curve indicates that 23—26 (Fig. 1b) is functioning at twice the rate at which it does when discharge tube 55 is nonconducting.

As has been explained, the change in operation of a digit manifesting oscillator to operation at an increased frequency takes place for a predetermined period of time in a cycle, dependent upon the entry, and at the end of that time it resumes operation at its normal frequency. The resumption by the oscillator of operation at its normal frequency is brought about by extinguishing the gas triode 55.

The application of a positive potential to resistor 44 (Fig. 1a) two index points later, i. e., at "0," (produced by oscillator 23a—26a, as described in Sect. 6) serves by means of battery 44a and the line 44b to control shut-off of gas triode 55 (Fig. 1b). This positive potential reduces the negative grid bias of tube 39a, increasing current flow through impedance 38 and causes point 45 to drop in potential with respect to line 2, sufficiently, so that the difference between it and point 28 is below the ionization voltage necessary to maintain discharge tube 55 in conducting status. Accordingly, gas triode 55 is extinguished and point 28 falls sharply to a potential determined solely by resistors 29, 29a, 30, and 30a. The drop in voltage of point 28 with respect to line 2 is indicated at 51 in Fig. 6–a. Hence the screen grid voltage of pentode 23 (Fig. 1b) is reduced to its normal value, this reduction increasing the tube's impedance and thereby reducing current flow therethrough and returning the frequency to normal. The current flow and frequency are now both the same in magnitude as that which existed prior to the increase in frequency of 23—26. The return of the oscillator to its normal frequency is indicated at 52 in Fig. 5–a. It will be observed that as a result of being automatically operated at an increased frequency for a predetermined period of time, the relative position of the oscillation peak or the phase of the oscillator has been changed in proportion to said period.

To clarify the above operation, it is assumed that 23—26 operates as is shown in Fig. 5–a and attention is directed to the fact that initially its condenser 22 (Fig. 1b) discharges at "D" at the beginning of a machine cycle, or at the first of two oscillator cycles. That is, the oscillator is at "0," (the order has –0– standing in it) and this condition is indicated at 53 in Fig. 5–a. For the following eight index point positions, there is no change of the voltage values of the oscillator circuit and the condenser 22 (Fig. 1b) charges up at its normal rate (see also Fig. 5–a). At "2," however, as assumed above, the oscillator current is doubled and the oscillator continues to operate at twice its normal rate for the following two index point positions at which time it is returned to its normal rate of operation. In other words the variation in operation is initiated at different cyclical times, dependent upon the digit entered, and is terminated at a fixed time. Attention is directed to the fact that by increasing the oscillator's rate of operation for two index point positions, condenser 22 (Fig. 1b) now discharges at "2" i. e. 23—26 has assumed the characteristic "2" pattern or has a "2" phase rather than the prior "0" pattern or phase. The discharge of the condenser at this new time in the cycle is indicated at 54 in Fig. 5–a. such discharge occurring in the 23—26 oscillator cycle following the cycle just described. During this second oscillator cycle, it is assumed that no positive potential is applied to resistor 47 (Fig. 1b) (i. e. no additional entry) to thereby change the oscillator's frequency.

The foregoing has described the adjusting means controlled by the entry determining means, for an order of the manually controlled embodiment of an electronic accumulator. It is seen, in summary, that the adjusting means comprises an impedance network which includes vacuum tubes and a gas discharge tube, in which the application of a positive potential to one point in the entry circuit is employed to cause the gas triode to become ignited thereby altering the voltage distribution of the network and upon application of another positive potential to a second point in the entry circuit, the gas triode is extinguished. This voltage change in the control impedance network is employed to vary the frequency of its associated oscillator. The result of such frequency change is to adjust the oscillator to a new phase so that with the oscillator previously adjusted to a "0" phase, the result of increasing its frequency for two index point positions of a cycle, is to adjust it to a "2" phase. It will now be appreciated that the foregoing is illustrative of the fundamental method of adding a digit in an order of an electronic accumulator.

6. *Adding*

Since the fundamental operating principles of a digit manifesting device and of an entry control device have been described, the manner in which the electronic accumulator functions for a succession of additive digit entries will now be set forth. Referring to Fig. 1a, as before, closure of switch 7 supplies energy to lines 1 and 2. The pulsing and intermediate oscillators (Figs. 1a and 1c) are adjusted so that their frequencies and their phases are as described in Section 4 and as illustrated in Figs. 3–b to 3–j, inclusive. With respect to the oscillators just mentioned, 23m—26m (Fig. 1a) operates at a frequency as also described in Section 4 and as illustrated diagrammatically in Fig. 3–a. It is again assumed that 23—26 (Fig. 1b) is at "0" or in other words it has assumed the emission pattern of Fig. 2–a and that relatively, it has assumed the "0" position indicated at the very beginning of the first cycle of Fig. 5–a. For purposes of illustration, it is again assumed that an entry of –2– into the units order is desired, as the first entry. Oscillator 23e—26e (Fig. 1a) is therefore adjusted so that it is at "2," as represented by the solid line in Fig. 3–i. All of the foregoing adjustments with regard to frequency and phase may be established by means of a cathode ray oscillograph, indicated generally as 5 in Fig. 1c. A twin triode amplifier tube 4a, 4b is connected between lines 1 and 2 as shown in Fig. 1c and is connected to the oscilloscope, as shown. By means of adjustable connectors 3a and 3b electrical connections are rapidly established between various points in the different circuits and the grid circuits of tube 4a, 4b. In this manner, selected voltages are supplied to the amplifier and in turn to the horizontal or vertical sweep controls or deflection plates, respectively, of oscilloscope 5, whereby the status of the desired electrical conditions, at the respective points can be visibly indicated.

For clarity in the circuit diagrams, the wiring intermediate the contacts of adjustable connectors 3a and 3b and the various circuit points does not appear. The points in the circuit, however, to which the contacts are connected, are indicated. The contacts are also wired to "Clips" which may be connected to any other desired points in the circuits whose voltages are to be observed.

With respect to entry of the quantity –2– only a single digit –2– is to be added and a circuit which permits only a single pulse, of the repeated pulses produced by the "Entry" oscillator 23e—26e (Fig. 1a), to be effective for causing entry will also be described.

At "2," condenser 22e discharges in the local circuit comprising current limiting resistor 27e and gas triode 26e, this differential timing of the timed cyclically repeated discharge being representative of a -2-. All of the voltage to which condenser 22e is charged is realized across resistor 27e with the exception of the ionizing potential necessary to maintain gas triode 26e ignited and such potential drop across 27e is in the form of an extremely sharp pulse. The voltage drop across 27e, by means of line 61a, causes condenser 61 (Fig. 1c) to discharge thereby producing a pulse on resistor 62 which is of negative polarity with respect to line 2. This negative pulse is applied to the grid of tube 63b thereby increasing its negative bias and reducing current flow therethrough. With decreased current flow, the voltage drop across resistor 64 is decreased and as a result, point 65 rises in potential charging up condenser 66. This charging action serves to produce a voltage, on resistor 67, which is of positive polarity with respect to line 2. It is seen, therefore, that tube 63b converts a pulse of negative polarity, appearing on resistor 62, into a pulse of positive polarity on resistor 67. This pulse on resistor 67 has the same steep characteristics as the pulse which appears on resistor 27e (Fig. 1a) when condenser 22e is discharged.

The increase in voltage on resistor 67 (Fig. 1c) is effective via line 68 (see also Figs. 1a and 1b) and switch 218, to oppose battery 60 thereby decreasing the negative control grid bias of a tube 59. Since the screen voltage of tube 59 is at the lower one of two possible potentials, such decrease in bias of tube 59 does not materially increase current flow therethrough. It will now be shown how the screen voltage of tube 59 is raised so that only a single "2" pulse applied to the control grid of tube 59, as just described, is entered into the accumulator.

Such screen voltage rise is brought about by a voltage change in an impedance network which is manually controlled and which functions for not more than one machine cycle. This impedance network includes a number of branches comprising voltage dividers as follows: one branch comprising resistors 69 and 70 and tube 71b in series between lines 1 and 2; and the second consisting of resistors 72, 73, and 73a likewise in series between lines 1 and 2. A gas triode 74 is interposed between the first and second branches, the anode and cathode being connected respectively to these branches. In series with tube 74 is the resistance 75. The grid circuit of gas triode 74 extends to line 2 through protective resistor 76 and resistance 77. It will be observed that the screen grid of pentode 59 is connected to point 78 on resistor 73 of the second branch just described.

With gas triode 74 extinguished, point 78, is at the lower one of two possible potentials. With a switch 79, in the position shown, a condenser 80 is charged up to the potential of point 81 which is located on a voltage divider consisting of resistors 82 and 83. By a manual operation, switch 79 is thrown from 79a to 79b and condenser 80 discharges in the local circuit including resistance 77. The potential thus produced on resistance 77 is positive with respect to line 2 and the negative grid bias of gas triode 74 is reduced sufficiently to cause its ignition. With 74 conducting, current flows through this tube and resistance 75 in series and there is therefore an increase of current flow through resistors 69, 73, and 73a. Accordingly, the potential of point 78 rises with respect to line 2 and the screen voltage of pentode 59 also rises. This rise in screen voltage allows the control grid bias reduction on tube 59, which in the present entry occurs at "2," as previously described, to be effective in increasing current flow through tube 59, thereby producing a voltage drop across resistor 84 and reducing the potential of point 85 with respect to line 2. Condenser 86 discharges and a pulse of negative polarity appears on resistor 87. This negative pulse increases the negative bias of tube 88a, decreasing current flow therethrough and through resistor 89. Point 90, therefore, rises in potential with respect to line 2, charging up condenser 91. This charging action produces a positive voltage on resistor 47 at "2" as indicated at 92 in Fig. 4-e. This positive potential is effective via line 93a, switch 94 and line 93, since switch 94 is in the position shown (see also Fig. 1a) to reduce the negative bias on tube 42a (Fig. 1b) to increase the flow therethrough and hence the voltage at 48 and reduce the negative bias on the gas triode 55 to thereby ignite this gas triode 55 of the entry control device, in a manner described in detail in Section 5. Accordingly, at "2" in the first cycle shown in Fig. 5-a, as was previously explained, 23—26 (Fig. 1b) commences operating at double its normal frequency, as is indicated at point 50 in Fig. 5-a. The foregoing has described the method by which entry of a digit -2- into a units order of an accumulator is begun.

It will be appreciated that if it had been desired to begin the entry of any of the other digits, the "Entry" oscillator 23e—26e (Fig. 1a) would have been adjusted to a phase corresponding numerically to the particular digit to be added. For example, were a -7- to be added, 23e—26e would be established at "7" and, upon throwing switch 79 (Fig. 1b) from 79a to 79b, a "7" pulse would effect ignition of gas triode 55 of the entry control circuit, in the manner described in connection with the entry of a digit -2-. Accordingly, 23—26 would commence functioning at double its normal frequency at an earlier time in a cycle, namely, at "7."

With an entry of -2- into the accumulator, gas triode 55 remains ignited for two index point positions thereby causing 23—26 to be operated at a doubled rate for this interval of time. At "0," gas discharge tube 55 is extinguished, as previously pointed out and 23—26 resumes its normal frequency.

In connection with the extinguishing of tube 55, the following detailed explanation will further explain this operation. As stated previously, 23a—26a (Fig. 1a) is adjusted to a pulse at "0," whereupon condenser 22a discharges through resistor 27a and triode 26a. The full voltage of condenser 22a, with the exception of the ionizing potential necessary to maintain gas triode 26a ignited, is effective across resistor 27a and appears in the form of an extremely sharp pulse. This voltage drop across 27a, by means of line 95a, causes condenser 95 to discharge, and a pulse of negative polarity is produced across resistor 96. This negative pulse is applied to the grid of tube 97a thereby increasing its bias and reducing current flow therethrough. With decreased current flow, the voltage drop across resistor 98 is decreased, and as a result point 99 rises in potential charging up condenser 100.

This charging action serves, by means of switch 8, to produce a voltage pulse on resistor 44 and this pulse is of positive polarity with respect to line 2. Tube 97a, therefore, converts a pulse of negative polarity, appearing on resistor 96, into a pulse of positive polarity on resistor 44. This pulse on resistor 44 has the same steep characteristics as the pulse which appears on resistor 27a when condenser 22a is discharged and such pulse is indicated at 101 in Fig. 4–a. The pulse on resistor 44 (Fig. 1a) is effective by means of line 44b to cause quenching of gas triode 55 (Fig. 1b) in the manner explained in detail in Section 5. Accordingly, after the digit manifesting oscillator has operated at doubled frequency for two index point positions, the voltages on the network with which tube 55 is associated and the frequency of 23—26 return to their normal values. This is indicated at 52, in Fig. 5–a.

The result of having operated this digit manifesting oscillator at a doubled frequency for two index point positions of one machine cycle, in the manner just described, is to cause the oscillator to assume a new phase or characteristic pattern. Prior to these operations, it was at "0" and in the first machine cycle shown in Fig. 5–a it is shifted to "18," or "2," as is indicated in the second cycle by 54, this differential timing of the timed cyclically repeated discharge thereby manifesting the entered digit –2–.

Observation of this oscillator and of the digit manifested thereby is performed by means of cathode ray oscilloscope 5 (Fig. 1c) whose horizontal sweep control frequency is obtained from the repeated cyclical timed impulses supplied by 23a—26a (Fig. 1a) so that the control frequency is equal to the machine cycle frequency, and whose vertical sweep potential is derived from 23—26 whereby the characteristic emission manifestation of the oscillator is applied to the oscilloscope. Observation of cathode ray tube 5 indicates that the "fly-back" position or peak wave occurrences of 23—26 has been moved, relatively, to the left, two-twentieths of one oscillator cycle, as viewed successively in Figs. 8a and 8b, with the former illustrating the original phase relationship and the latter illustrating its new or "2" phase to which the oscillator has been adjusted as the result of entering the digit –2–, as described above.

Figure 8A:
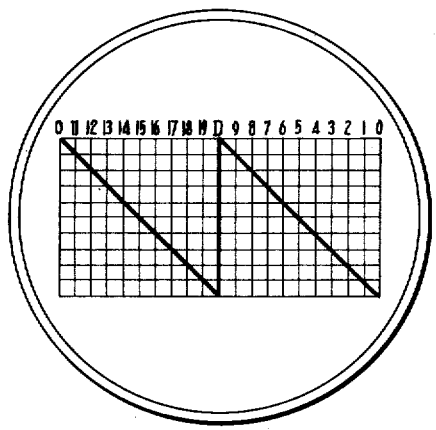
Figure 8B:
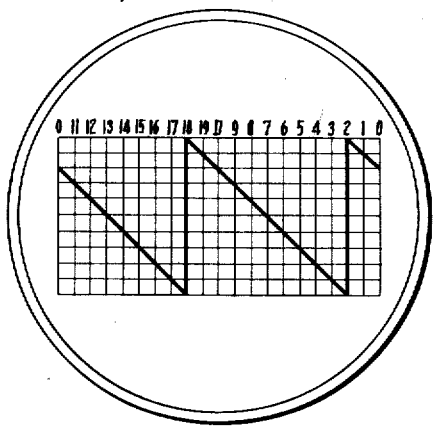
Figure 8C:
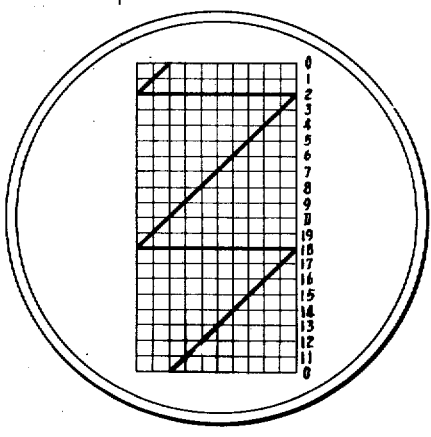

If desired, however, oscilloscope 5 may be electrically connected so that its vertical instead of its horizontal sweep frequency is obtained from 23a—26a (Fig. 1a) and is therefore equal to that of the machine cycles and the potential of 23—26 (Fig. 1b) representative of the differentially timed emission is applied to the horizontal plates, instead of to the vertical plates, to determine the horizontal sweep frequency. This arrangement, is indicated in Fig. 8c with 23—26 (Fig. 1b) again illustrated at "2."

From whatever time in a cycle switch 79 (Fig. 1b), is thrown from 19a to 79b, to effect ignition of gas triode 74 in the manner previously described, this tube 74 remains ignited, and from that time until "12." As previously stated 23b—26b (Fig. 1a) is at "12." At this time, condenser 22b discharges, and via line 95c produces a discharge of condenser 95b and thereby a pulse of negative polarity appears on resistor 102. Tube 63a (Fig. 1c) receives this pulse via line 261 and 's effective to convert it to positive polarity and it appears, as such, on resistor 211. It is not believed necessary to describe in detail the inverting action of tube 63a for this "12" pulse since it is similar to that described previously in connection with the action of tube 91a (Fig. 1a) with regard to a "0" pulse. This positive potential appearing on resistor 211 (see also 194 of Fig. 4–b) at this time is effective by means of line 261a, switch 103 (Fig. 1a) and line 227 to increase the grid voltage of tube 7 b (Fig. 1b). Due to this, there exists an increased current flow through tube 71b, the voltage at point 69a is reduced and gas triode 74 is extinguished in a manner as described in connection with a substantially similar impedance network in Section 5. The shut-off of gas triode 74 permits point 78 and hence the screen voltage of tube 59 to return to the lower of its two possible potentials. It is seen, therefore, that the application of any differentially timed entry impulses is effective to produce one single entry only, since the sustained electrical condition produced by ignition of triode 74 is terminated always at "12" and thereafter succeeding entry pulses emitted by 23e—26e which reduce the control grid bias of tube 59 are ineffective for causing entries.

Referring to Fig. 5–a it is assumed that switch 79 is thrown from 79a to 79b sometime after "12" in a previous cycle (not shown). Accordingly, in Fig. 7–d, point 78 of Fig. 1b, is indicated as by 104, for example, as being at the higher one of its two possible potentials at the beginning of the first cycle of Fig. 5–a and it remains in such status until the "12" index point position, at which time it is returned to its lower potential, as is indicated by 105 in Fig. 7–d.

The foregoing has described the manner in which a digit –2– whose characteristic entry pulse or wave "2" is produced by 23e—26e (Fig. 1a) is entered into the units order of the accumulator. Such entry, it has been seen, causes 23—26 (Fig. 1b) to operate at a doubled frequency for two index point positions to thereby change its phase condition from "0" to "2." In connection with the description of this entry, a circuit, for permitting only a single "2" pulse to be effective for causing entry, was also described in detail. It will be appreciated that if switch 79 is manipulated at a time, following that at which a positive entry pulse reduces the negative control grid bias of tube 59, but prior to "12," such pulse is ineffective to cause entry because the "12" pulse extinguishes tube 74. It will be understood, therefore, that the single entry control device which has been described is effective to bring about a single entry of a digit, only if switch 79 is manipulated prior to the reduction of the negative control grid bias of tube 59 (by entry pulse) and after "12." This single entry device is suitable for manual operation but an improved single entry control device which does not have the aforementioned operating limitation will be described later in connection with the key operated embodiment of the invention.

In order to bring about another entry of a digit into the accumulator, since triode 74 is quenched at "12," switch 79 must necessarily be returned to the position illustrated in Fig. 1b, so that condenser 80 may be charged up to the potential of point 81 on the voltage divider consisting of resistors 82 and 83, in order upon reversal of the switch to re-ignite tube 74 to again raise the screen voltage of tube 59 to produce a sustained conditioning of this tube for an entry. Accordingly, for each manipulation of switch 79, tube 59 is effective to permit the entry, once only of any digit.

As long as no further digits are entered, 23—26 remains at "2" and by its repeated electrical manifestations having the "2" characteristic, represents that digit –2– stands in the units order.

On the assumption that it is now desired to enter a –5– into this order, 23e—26e (Fig. 1a) is adjusted so that it has a "5" characteristic electrical status as is indicated by the dash-dot line in Fig. 3-*i*. Manipulation of switch 19 (Fig. 1b) allows this pulse to bring about ignition of gas triode 55 in the manner previously explained. The rise in potential of point 28, in Fig. 1b, at this differential time is indicated at 106 in Fig. 6-b and oscillator 23—26 (Fig. 1b) is shown as commencing operation at double its normal frequency at this differential time by 107 in Fig. 5-b. Gas triode 55 (Fig. 1b) remains ignited for five index point positions, or a portion of a cycle representative of the digit to be entered, so that the repeated cyclic operation of the cyclically operating means comprising the digit oscillator is varied during a portion of a cycle or a time interval representative of the digit entered. As previously stated, triode 55 is extinguished at "0" and point 28 is shown returning to its normal potential at 108 in Fig. 6-b and 23—26 (Fig. 1b) is indicated as returning to its normal frequency at 109 in Fig. 5-b. The result of this entry of –5– is to store in the digit manifesting oscillator the cumulative effects of two entries, namely, –2–, and –5–, as represented by the shift of 23—26 (Fig. 1b) from "2" to "7" as is indicated by comparison of point 54 (Fig. 5-a) and cycle point 110 in Fig. 5-b.

Assume now that it is desired to add –9– to the –7– standing in the accumulator. Accordingly, 23e—26e (Fig. 1a) is adjusted so that it has a "9" differential timing or phase position as shown by the dash line in Fig. 3-*i*. Upon manipulation of switch 19 (Fig. 1b) gas triode 74 is ignited, as before, and the screen voltage of tube 59 is raised in a manner now understood. A "9" pulse is now effective, through the action of tube 59, to ignite gas triode 55 in the manner described above, raising the potential of point 28. This potential rise is shown as occurring at "9" by 111 in Fig. 6-c. At this time 23—26 (Fig. 1b) commences to function at double its normal frequency at "9" so that its cyclic operation is varied and this action is indicated taking place at 112, in Fig. 5-c. Gas triode 55 (Fig. 1b) remains ignited, conditioning the oscillator until "0," at which time it is extinguished, as is now understood. The drop in potential of point 28 at this time is indicated at 113 in Fig. 6-c, and the return of 23—26 (Fig. 1b) to its normal frequency is indicated at 114 in Fig. 5-c. The foregoing has described the manner in which a –9– is added to a –7– thereby causing 23—26 (Fig. 1b) to shift from "7" to "6" as is shown at 115a in Fig. 5-c.

It will be understood that during this operation the digit manifesting oscillator has passed from nine through zero and that a carry increment must be added to the next higher order so that the complete sum of sixteen may be manifested. As has been previously mentioned, only a portion of the tens order is incorporated in the circuits, at present being described. A circuit, however, equivalent to the tens order, adjusting circuit device is included, such being sufficient to indicate whether or not a carry operation is effected when such is called for when the units order digit manifesting oscillator passes from "9" to "0" or when there is a "carry through 9" to be effected, when subtraction operations are to be performed. The operation of the circuits upon subtraction will be described in detail later.

7. *Carry determining device*

Whenever a digit is added to the accumulator causing a digit manifesting oscillator to be shifted from one phase to another which is numerically lower, the oscillator produces a chosen succession of wave form patterns indicative of passages from "9" to "0" during the entry of the digit and may be said to have completed a full sequential digit manifesting operation. A carry increment therefore must be added into the next higher order. The method of automatically determining the carry condition when a digit manifesting oscillator has passed from "9" to "0" upon an entry, will now be described. In the first of the preceding examples, a –2– was added to a –0– and in the second example, a –5– was added to a –2–. In neither example did the digit manifesting oscillator pass, numerically speaking, from a higher phase to a lower phase. This is visually indicated in Figs. 5-a and 5-b which are diagrammatic representations of these two adding operations. It will be observed in these instances that during the time between "9" and "0," inclusive, in the entry portion of a cycle, condenser 22 (Fig. 1b) discharges only once as indicated at 115 and 116 in Figs. 5-a and 5-b, respectively.

Referring now to Fig. 5-c which is a diagrammatic representation of the operation when –9– is added to –7–, it will be observed that condenser 22 of 23—26 (Fig. 1b) discharges twice during "9" to "0," inclusive, namely, at 117 and 118. Expressed generally, when a digit is added to the accumulator and causes a digit manifesting oscillator to shift, numerically speaking, from a lower phase to a higher phase, the condenser of the oscillator discharges only once during "9" to "0," inclusive, in a cycle. On the other hand, when a digit is added to the accumulator and the digit manifesting oscillator is caused to shift from a higher phase to a lower phase, the digit oscillator passes from "9" to "0" and the condenser of the oscillator discharges twice during "9" to "0," inclusive, in a cycle, or in other words discharges more than once within a definite predetermined portion of the operating cycle of the accumulator.

An automatic electronic carry determining device, therefore, is provided which is under the control of the digit manifesting oscillator. At an invariably timed position in the machine cycle, designated as the carry time, the carry determining device is so arranged as to have a certain electrical status if the oscillator condenser has discharged only once during "9" to "0," inclusive, but assumes another status if the condenser has discharged twice during this stated time interval. The carry determining device may comprise an impedance network including vacuum tubes and a gas triode, to two components of which, a pulse, derived from a common source, is applied. Upon the application of successive pulses, the carry determining device is alternately placed in one electrical status and the other or reverse status. More specifically, upon the application of a first pulse derived from the digit manifesting oscillator, a gas triode of the carry determining device is ignited; and upon application of a succeeding pulse, the gas triode is extinguished. It will be appreciated, therefore, that the carry determining circuits comprise an electronic "flip-flop" device. A pulse derived from a digit manifesting oscillator is applied concurrently to two circuit components or voltage dividers of the impedance network referred to above and it will be seen that such pulse is effective alternately in each component.

In the impedance network as employed in a carry determining device, a number of voltage dividers comprising components of the network are provided, some of which include vacuum tubes. Interposed between two of the voltage dividers is a gas discharge tube whose status is to be controlled. Briefly, when current through one of the impedances including a vacuum tube is increased by a controlling pulse derived from a digit manifesting oscillator, the grid bias of the discharge tube is reduced and it is fired. When the current through another impedance including a vacuum tube is increased by a succeeding controlling pulse, the anode potential of the discharge tube is reduced below the ionization potential, thus causing shut-off. When the gas tube is conducting, the voltage distribution about the entire impedance network is changed from that which exists when the tube is non-conducting. An altered potential relationship in one portion of the carry determining device is employed for controlling the carry effecting circuits of the accumulator. This alterable potential which can produce a certain electrical condition indicative of the passage from nine to zero is therefore controlled in response to the number of discharges per predetermined time or in response to a number of discharges greater than one within a definite predetermined portion of the operating cycle of the accumulator, in order to operate the carry effecting means.

Referring now to Fig. 1d, the carry determining impedance network includes three branches comprising three voltage dividers connected across lines 1 and 2 as follows: the first branch a voltage divider comprising resistors 120, 121 and resistor 122 in parallel with condenser 123, the second comprising resistor 124, line 124a to tube 125a (Fig. 1b) and tube 139a (Fig. 1d) in parallel with tube 125a by means of lines 124a and 131a, together in series with resistor 126 (Fig. 1b); and the third consisting of resistor 127 (Fig. 1d) and tube 128b. A gas discharge tube or triode 129 is interposed between the first and third branches, the cathode and anode being connected, respectively, to these branches. In series with tube 129 is the resistance 130. The grid of gas triode 129 is connected to the second of the three branches at point 136, its circuit including a protective resistor 131.

When no potential is applied to a resistance 132 (as described in detail later), the bias applied to the control grid of tube 128b by battery 133 is such that the impedance of tube 128b is greater in value than that of resistance 127; that is, current flow through the voltage divider consisting of 127 and 128b is small and the voltage of point 134 is relatively near that of line 1. The sum of resistances 120 and 121 on the other hand is much greater than the resistance of resistor 122, so that point 135 has a potential relatively near that of line 2. Therefore, with gas triode 129 extinguished, the voltage difference between points 134 and 135 approaches that which exists between lines 1 and 2.

Resistance 126 (Fig. 1b) comprises a self-biasing resistor for tube 125a and is so chosen that when no potential is applied to resistance 144 (Fig. 1d), as described in detail later, the current flow through the voltage divider including 124, 124a (Fig. 1b), 125a, and 126 is such that the point 136 (see also Fig. 1d) is nearer the potential of line 2, than is point 135. In other words, the potential difference between points 135 and 136 provides a negative grid bias for gas triode 129 and is of sufficient magnitude to prevent tube 129 from firing at the anode potential of 129 which exists between points 134 and 135.

Assuming as before that gas triode 129 is extinguished, which is the major condition for the operation now to be described, it will now be shown how a discharge of condenser 22 (Fig. 1b) is effective to cause ignition of this gas triode. Condenser 22 discharges in the local circuit comprising current limiting resistor 27 and gas triode 26. A potential drop is produced across 27 which is in the form of an extremely sharp pulse. The voltage drop across 27, by means of line 137a, causes condenser 137 (Fig. 1d) to discharge and a pulse of negative polarity is produced across resistor 138. This negative pulse is applied to the grid of tube 139b thereby increasing its bias and reducing current flow therethrough. With decreased current flow, the voltage drop across resistor 140 is decreased and as a result, point 141 rises in potential charging up condenser 142. This charging action serves to produce a voltage of positive polarity on resistor 144 and also on resistor 132. This positive potential is in the form of a sharp pulse, and that on resistor 144, by means of line 144a, raises the grid voltage of tube 125a (Fig. 1b). Current flow increases in the voltage divider consisting of 124 (Fig. 1d) line 124a, 125a (Fig. 1b) and 126, thus raising the potential of point 136 (see also Fig. 1d). That is, the potential difference between points 135 and 136 (Fig. 1d) or the negative grid bias of discharge tube 129 is reduced, such reduction of grid bias being sufficient to ignite tube 129.

As will be seen later, while gas triode 129 is still extinguished and at the initial time the positive pulse appears on resistors 144 and 132, point 143 and hence also the screen voltage of tube 128b are at the lower one of two possible potentials. The positive pulse on resistor 132 opposes battery 133 and reduces the negative control grid bias of tube 128b, concurrently with the reduction in the negative grid bias of tube 125a (Fig. 1b) produced by the increase in positive potential of resistor 144 whereupon the potential of point 136 is increased to thereby ignite gas triode 129 (Fig. 1d) as stated above. At the instant, however, of the reduction in the grid bias of 128b, in view of the lower screen potential of this tube, its control grid bias reduction causes little if any current rise through the voltage divider including 127 and 128b. Hence, at the instant of concurrent application of the positive pulse to resistors 132 and 144, the potential of point 134 remains substantially constant with respect to line 2.

On the contrary, when gas triode 129 is conducting, there is current flow between points 134 and 135, through the resistor 130 and the tube 129. The current flow provided by the ignition of gas triode 129 depends upon the relative values of the impedances between which the tube is interposed and also upon that of resistor 130. There is also increased current flow through resistors 127 and 122. The increased current flow, however, does not rise instantaneously when tube 129 is fired but rises exponentially because of the condenser 123 which shunts resistance 122. With increased current flow through resistor 122, the potential of points 135 and 143 increases slowly (exponentially) with respect to line 2.

Now, assuming that tube 129 is ignited, which is the major condition for the operation next to be described, upon a discharge of condenser 22 of 23—26 (Fig. 1b), gas triode 129 (Fig. 1d) is shut off as follows: At this time, a second positive pulse appears on resistors 132 and 144 having been converted to positive polarity by the inverting action of tube 139b, as previously described. While gas triode 129 remains conductive, point 143 is gradually raised in potential with respect to line 2 and thus the screen voltage of tube 128b is now also raised. The second positive pulse applied to resistor 132, opposes battery 133, thereby reducing the negative control grid bias of tube 128b. Since the screen voltage of tube 128b is now at the higher of two possible potentials, the reduction in grid bias causes increased current flow through the impedances 127 and 128b. This increased current flow through resistor 127 causes point 134 to drop further in potential with respect to line 2. Point 134 falls in potential sufficiently so that the difference between it and point 135 is below the ionization voltage necessary to maintain tube 129 in conducting status. Accordingly, gas discharge tube 129 is extinguished.

It should be mentioned that points 135 and 143 do not rapidly fall in potential when tube 129 is extinguished. As soon as points 135 and 134 commence to drop in potential, the condenser 123, which has been charged up to the potential existing between point 135 and line 2, commences to discharge through resistor 122 tending to hold points 135 and 143 at high potential. As time elapses, points 135 and 143 fall exponentially to the lower of two possible potentials which they may have. The time taken for points 135 and 143 to drop in potential is determined by the time constant of resistor 122 and condenser 123.

A controlling feature of the discharge of condenser 123 will now be described. The second or shut-off controlling pulse applied to resistor 132 and to resistor 144, raises, via line 144a, the grid voltage of tube 125a (Fig. 1b), thereby increasing current flow through this tube and the impedances 124 (Fig. 1d) and 126 (Fig. 1b) causing point 136 to rise to the potential that it had when tube 129 was fired and thus tending to maintain 129 conducting, despite the reduction of anode voltage, if the potential of point 135 should quickly drop as soon as 129 ceased conducting. The discharge of condenser 123, however, when tube 129 is extinguished, maintains point 135 at raised potential for at least as long as the second pulse is applied concurrently to resistors 132 and 144 and hence as long as point 136 is raised in potential, as just described. Thus, the discharge of condenser 123 serves to maintain point 135 at such a potential, that the increase in potential on the grid of 129, due to the increase in potential of point 136, is ineffective.

The foregoing has described the construction of the impedance network which is employed as the carry determining device and has described a method of firing and shutting off a gas triode by a pulse which is applied concurrently to two voltage dividers of the impedance network. Successive applications of the pulse, derived from a digit manifesting oscillator, serve to place the impedance network alternately in one status and the other, this alternation or variation in the status of the carry determining device being employed to control electronic means which effect carry.

The operation of the carry determining circuit during adding operations will now be described. Referring to Fig. 5-a in which two machine cycles are shown and during one of which a –2– is added to –0–, it will be observed that condenser 22 of 23—26 (Fig. 1b) discharges five times during these two cycles. Referring now to Fig. 7-a and assuming that gas triode 129 (Fig. 1d) is nonconducting just prior to the first cycle of Fig. 5-a, the discharge of the condenser 22 at "D" brings about an ignition of 129. The rise in potential of point 135 (Fig. 1d) is indicated at 145 in Fig. 7-a. When the condenser discharges again at "1," the gas triode 129 is extinguished and point 135 drops to its normal potential, as indicated at 146, in Fig. 7-a. The manner in which the discharge of condenser 22 (Fig. 1b) effects the alternate firing and shut-off of tube 129 (Fig. 1d) having been described above in detail, will not be repeated here. It will be observed, however, with respect to Figs. 1d and 7-a, that point 135 is at a low potential at "11" in the cycle in the example when a –2– is added to –0–. Upon such an adding operation, the digit manifesting oscillator passes from a lower phase to a higher phase, numerically speaking, and therefore a carry into the next higher order is not required. As will be understood, point 135 is always at a low potential at "11" in a cycle if no carry requirement exists.

Referring to Fig. 5-a, it will be observed that condenser 22 (Fig. 1b) discharges three additional times in the two cycles shown. The first of these three additional discharges serves to effect ignition of gas triode 129 (Fig. 1d) and the succeeding discharges serve to extinguish and ignite it, respectively. Attention is directed to the fact that at "11" in the second cycle, point 135 is again at a low potential, as is indicated at 147 in Fig. 7-a, and at the beginning of the succeeding or third cycle (not shown) such point is at a high potential as indicated at 148.

The rise and fall of potential of point 135 (Fig. 1d) in the carry determining circuit, when a –5– is added to –2– (Fig. 5-b) is illustrated in Fig. 7-b. The alternate ignition and shut-off of tube 129 (Fig. 1d) takes place when the condenser of the digit manifesting oscillator discharges for this adding operation, which is illustrated in Fig. 5-b. Again the digit manifesting oscillator is shifted from a lower phase to a higher phase and therefore the requirement of a carry does not exist. Accordingly, Fig. 7-b illustrates point 135 (Fig. 1d) at a low potential, at "11" in each of the two cycles in Fig. 7-b.

From the foregoing illustrations of the action of a carry determining device, it may be stated generally that if no entry is made into the accumulator or if an entry is made and a digit manifesting oscillator shifts from a lower phase to a higher phase, the condition of a carry determining device is such that its gas triode is conducting at the beginning of each cycle and is non-conducting at "11." It should be mentioned that it is at this "11" time, namely, a fixed time within a machine cycle, that carry operations are initiated in the electronic accumulator. Accordingly, with gas triode 129 either conducting or non-conducting under the conditions just stated, point 135 is either at a high or low potential, respectively.

Referring now to Fig. 5-c which shows the operation of the digit manifesting oscillator when a –9– is added to –7–, as was previously stated, as a result of such operation, the oscillator shifts from a higher phase to a lower phase, and a carry condition, therefore, exists. The oscillator condenser 22 discharges twice during that part of the cycle between "9" and "0," inclusive, as is indicated at 117 and 118. It is to be particularly noted that the discharge of the condenser at 117 effects shut-off of gas triode 129 (Fig. 1d) and the succeeding discharge at 118, effects ignition of the gas triode. Accordingly, at "11," point 135 (Fig. 1d) is at a high potential and such status is indicated diagrammatically at 149 in Fig. 7-c.

8. *Carry effecting device*

Referring now to Fig. 1d, it is seen that the screen grid of pentode 150 is connected to point 135 and therefore its voltage is at either one of two values, depending upon the status of point 135. At "11," if there is no carry requirement, the screen grid of pentode 150 is at a low potential but if there is the requirement of a carry, the screen grid is at a high potential. When the screen voltage of 150 is low, potentials applied to the control grid are ineffective in bringing about an increased current flow through the circuit including resistor 151 and tube 150. If, however, the screen voltage of 150 is high, a reduction of the control grid bias of this tube causes increased current flow therethrough. The manner in which pentode 150 effects the addition of a carry increment at "11" will now be described.

Referring to Fig. 1a, it is noted that 23d—26d is adjusted to "11." At this time, condenser 22d discharges in the local circuit comprising current limiting resistor 27d and gas triode 26d. A potential drop is produced across 27d which is in the form of an extremely sharp pulse. The voltage drop across 27d, by means of line 152a, causes condenser 152 (Fig. 1c) to discharge and a pulse of negative polarity is produced across resistor 153. This negative pulse is applied to the grid of tube 154b, thereby increasing its bias and reducing current flow therethrough. With decreased current flow, the voltage drop across resistor 155 is decreased and as a result point 156 rises in potential, charging up condenser 157. This charging action serves, by means of switch 9, to produce a voltage of positive polarity, at "11," on resistor 158 (see also 195 of Fig. 4-d). This positive pulse, by means of line 159a, opposes battery 159 (Fig. 1d) thereby reducing the negative control grid bias of tube 214, and by line 159b, of tube 150. Accordingly, current flow increases through resistor 151 and tube 150 since, when carry is required, the screen of 150 is at a high potential at "11," as outlined above. Increased current flow through resistor 151 causes point 160 to drop in potential with respect to line 2 thus bringing about a discharge of condenser 161 and the appearance of a negative pulse on resistor 162. This negative pulse is effective, via wire 163 (see also Fig. 1b), to increase the grid bias of tube 88b, thereby decreasing current flow therethrough and also through resistor 164. Accordingly, point 165 rises in potential charging up condenser 166 causing a pulse of positive polarity to appear on resistor 167. This positive potential, via line 167a, reduces the negative grid bias of gas triode 168 thereby bringing about its ignition. It is seen that gas triode 168 is interposed in an impedance network substantially similar in form to those previously set forth and therefore it is not deemed necessary to describe in detail, the ensuing changes in voltage which occur in the network when the gas triode is ignited and later shut off. It will be appreciated that the impedance network in which gas triode 168 is located is the full equivalent of the entry control device for the next higher or tens order of the electronic accumulator. Therefore, the foregoing indicates generally the manner in which a carry increment is added into the next higher order at "11" as a result of a -9- being added to a -7- in the units order of the accumulator. To summarize, the foregoing explanation has pointed out how an electronic carry determining circuit, which is controlled by a certain sequence of operations of a digit manifesting oscillator, is instrumental in controlling an electronic carry effecting device so that a carry increment may be added.

Assuming that gas discharge tube 168 is in the entry control device of a tens order, such tube would normally remain ignited for one index point position only, i. e., between "11" and "12" in a cycle, as will be described in detail in the explanation of the operation of the key operated embodiment. The tens order, digit manifesting oscillator would, therefore have its operation modified for a digital unit portion of a cycle or specifically it would be operated at doubled frequency for this period of time to thereby advance its phase by one, or in other words, -1- should be added to whatever digit is standing in the tens order.

In the present circuit, however, gas triode 168 remains ignited until switch 169 is thrown from 169a to 169b (Fig. 1b) and therefore triode 168 serves to indicate, as long as is desired, that a carry condition existed in the units order. With switch 169 thrown to 169b, a positive potential appearing at "12" on resistor 211 (Fig. 1c) by the action of 23b—26b, as described in Section 6, is effective, via line 261a (Figs. 1c and 1a), switch 103 (Fig. 1a) and line 169c (Figs. 1a and 1b) to increase current flow through 71a thereby reducing the potential at point 170 sufficiently to quench tube 168.

Were not some additional method provided for igniting gas triode 129 (Fig. 1d) of the carry determining device, tube 129 would be in conducting status (point 135 at a high potential) at "11" in a following cycle, as is indicated at 171 on the dashed line of Fig. 7-c. Without the additional method which is to be described and taking consideration of the fact that there are an additional three times in which condenser 22 (Fig. 1b) discharges in the two cycles shown in Fig. 5-c, point 135 (Fig. 1d) would alternately decrease, increase and decrease in voltage as indicated, respectively, in Fig. 7-c by 172, 173 on the dashed line, and 174 on the dashed line, respectively. Were the carry determining device allowed to function with this sequence of voltage decreases and increases, an unwanted carry increment would be added at "11" in the second cycle. The additional method of conditioning the carry determining device ensures ignition of gas triode 129 (Fig. 1d) and brings about ignition, if this tube is non-conducting at the beginning of any machine cycle. As a result of the operation of the carry determining device during the first of the two cycles shown in Fig. 7-c, it is seen that the gas triode 129 (Fig. 1d) is non-conducting at the beginning of the second cycle as indicated at 175. Since this gas triode is extinguished at this time and would remain so until "6" in this cycle, it must be ignited by application of an additional potential at "½ after D" to the impedance network comprising the carry determining device, in a manner to be presently described. Thusly, control of gas discharge tube 129 by the discharge of the condenser during each operation of a digit manifesting oscillator always produces a predetermined condition at "11" of each cycle and determined solely by the number of times the oscillator is operated during the cycle or in other words by the number of condenser discharges. As was described above, when an oscillator passes from a higher phase to a lower phase the gas triode is non-conducting (see point 175, Fig. 7-c) at the beginning of the succeeding cycle and the circuit which is now described causes ignition so that the carry determining device functions in proper order in this next cycle.

As was previously stated and as indicated in Fig. 1a, condenser 22c of 23c—26c discharges at "½ after D." At this time, a sharp pulse is produced across resistor 27c. The voltage drop across 27c, via line 176a, causes condenser 176 (Fig. 1c) to discharge and a pulse of negative polarity is produced across resistor 177. This negative pulse is applied to the grid of tube 154a thereby increasing its bias and reducing current flow therethrough. In a manner which is now understood, point 178 rises in potential and a pulse of positive polarity is produced on resistor 179 (see also 196 of Fig. 4-f). This positive potential is effective, via wires 180 and 180a (see also Figs. 1a, 1b, and 1d) to increase in a positive direction the grid voltage of tube 139a (Fig. 1d) thereby increasing current flow through resistor 124, tube 139a, line 131a (see also Fig. 1b) and resistor 126. Accordingly, point 133 (Fig. 1d) rises in potential, reducing the negative grid bias of gas triode 129 thereby effecting its ignition. Accordingly, point 135 rises at this time to a high potential, as indicated at 181, shortly after the beginning of the second machine cycle in Fig. 7-c. During this second cycle, the first discharge (see 115a, Fig. 5-c) of condenser 22 (Fig. 1b), causes point 135 to drop in potential as indicated at 182, Fig. 7-c, and upon a second discharge this point rises in potential as indicated at 183, Fig. 7-c.

It will be observed that point 135 is at a low potential at "11" so that the screen voltage of tube 150 (Fig. 1d) is also at a low potential. Therefore an "11" pulse applied to the control grid of tube 150 has no effect on current flow through 150 and there is no unwanted addition of a carry increment. The actual operation of the carry determining circuit under the foregoing conditions is indicated by the solid line commencing at 181 in Fig. 7-c, and the subsequent drop and rise in potential of point 135 (Fig. 1d) are indicated at 182 and 183, respectively, on this solid line.

In summary, the foregoing has described an additional method of controlling a carry determining device so that its gas triode is always, alternately first extinguished and then ignited in any cycle, under the control of the successive condenser discharges of a digit manifesting oscillator. It has been shown that such additional pulse is effective, when its gas triode is non-conducting at the beginning of a cycle, to place the triode in a conducting status at said beginning, so that it is solely the number of times a condenser discharges between "9" and "0," inclusive, that determines whether or not the gas triode is to be conducting at carry time, in order that carry will or will not be effected, respectively, at carry time, namely, "11." The operation of the carry effecting device for a "carry through 9" condition will be described in connection with the operation of the present embodiment of the electronic accumulator when digits are subtracted.

9. General substraction

The operation of a single order of an electronic accumulator for a series of additive entries has been described in detail. The method of determining when a carry condition exists and the method of effecting carry when an accumulator order passes from "9" to "0" have also been set forth.

In general, with regard to adding, the underlying principle of operation resides in producing representative electrical patterns by shifting the phase of a digit manifesting oscillator. This is brought about by varying the operation of the oscillator for periods representative of a digit entered and specifically by doubling its frequency for a predetermined portion of an oscillator cycle, the portion of a cycle during which the frequency of the oscillator is doubled being proportional to the digit entered. Thus it is seen that when a –2– is added, the frequency of the oscillator is doubled for two index point positions or two twentieths of a cycle. When a –5– is entered, the oscillator's frequency is doubled for five index point positions or for five-twentieths of a cycle. It has also been explained how the oscillator began to operate at a doubled frequency at a differential time in a cycle and how it was returned to its normal frequency at a fixed time in a cycle. As digits to be entered increase numerically in value, the oscillator begins functioning at doubled frequency at earlier times or index point positions. Briefly, in adding, the energization of an electronic circuit is varied at differential cyclic times, dependent upon the digit to be entered and this variation is terminated at a fixed cyclic time. Having summarized the principles of adding, a general description will now be given of the principles underlying the method by which digits are subtracted in this electronic accumulator.

When the accumulator is to subtract, a digit manifesting oscillator begins to operate at doubled frequency at a fixed time in the cycle. It continues to function at this increased frequency until the index point position is reached which corresponds numerically to the digit to be subtracted, at which differential time it resumes operation at its normal frequency. Specifically, the digit manifesting oscillator begins to operate at doubled frequency at the fixed time "9," as if a nines entry were to be made. If, for example, a –3– is to be subtracted, the oscillator functions at doubled frequency between "9" and "3," at which latter differential time it resumes operation at its normal rate.

It will be understood, therefore, that on the basis of the foregoing example, the oscillator operates at an increased rate for six index point positions or six-twentieths of one cycle. It is seen that in contradistinction to the operation during an adding operation, during a subtraction operation a digit manifesting oscillator functions at doubled frequency for a number of index point positions, in the present example, six, which numerically is equal to the nine's complement of the digit which is subtracted, in this example, namely, –3–. Therefore, when subtracting, a digit manifesting oscillator functions at an increased rate during a portion of the cycle, which portion is proportional to the nine's complement of the digit which is subtracted. Considered from another point of view, the method of subtraction is in effect to add the nine's complement of the digit which is to be subtracted. Provision is also made for adding an elusive one so that the true complement, of the digit to be subtracted, is added, thereby forming a true difference amount. The result of causing a digit manifesting oscillator to operate at doubled frequency, according to the principles set forth, is to shift its phase, the new phase being indicative of the difference between the previous digit standing in an order and the digit entered. It will be understood that the various electronic tubes, gas triodes and related circuits which comprise the entry control, carry determining, and carry effecting devices and the digit manifesting oscillator, etc. are also employed for subtracting. Further, a subtraction control device is also utilized for effecting subtraction operations and this will now be described in detail.

10. *Subtraction control device*

The subtraction control device comprises two impedance networks including vacuum tubes and gas triodes. The gas triode of one impedance network is ignited at a certain time in a cycle just preceding the cycle in which subtraction of a digit is to be effected. The voltage distribution around this impedance network is altered to thereby condition a second impedance network so that its associated gas triode may be ignited early in the cycle in which subtraction of a digit is to take place. The gas triode of the first mentioned impedance network is extinguished at one of a plurality of times during the subtraction cycle and the gas triode of the second impedance network is extinguished after it has performed all of its subtraction control functions. This arrangement of impedance networks for controlling subtraction, and their staggered operation, permits flexibility in performing subtraction operations as will be more clearly understood later in the description.

With regard to the first impedance network of the subtraction control device, a number of branches are provided as follows: one branch comprising resistors 184 and 185 (Fig. 1d) and tube 186a in series between lines 1 and 2; the second branch consisting of resistors 187 and 188 in series between lines 1 and 2. A gas triode 189 is interposed between the first and second branches, the anode and cathode being connected, respectively, to these branches. In series with tube 189 is the resistance 190. With switches 191 (Fig. 1d), 192 and 94 (Fig. 1b) in reverse position from that shown, the grid circuit of gas triode 189 extends through protective resistor 193 (Fig. 1d), line 193a (see along Fig. 1b), switch 192 reversed, line 192a, line 93a to resistor 47 (Fig. 1b). Since this impedance network is substantially similar to others previously described, it is not believed necessary to set forth in detail the differences in voltage distributions which occur in the network when the gas triode is alternately ignited and shut off. It is sufficient to state that a positive pulse produced on resistor 47 (Fig. 1b), as explained in detail later, brings about ignition of the gas discharge tube 189 and that a positive pulse on resistor 197 (Fig. 1c), as explained later, causes shut-off of the gas triode due to the resulting increased current flow through tube 186a (Fig. 1d).

When gas triode 189 is ignited, point 198 (Fig. 1d) is at a higher potential than when 189 is non-conducting. The screen grid of pentode 199 is connected to point 198 so that this electrode is at the higher one of two potentials when gas triode 189 is conducting. When the screen voltage of tube 199 is low, variations in the control grid voltage of 199 have no effect on current flow therethrough.

With regard to the second impedance network of the subtraction control device, again a number of branches are provided, as follows: one branch comprising resistors 200 and 201 and tube 186b in series between lines 1 and 2; the second comprising resistors 202 and 203 in series between lines 1 and 2, with a pentode 199; and the third consisting of resistors 204, 205, 206 and 224 in series between lines 1 and 2. During subtracting operations, resistor 224 is short-circuited by switch 10, as shown in Fig. 1d. A gas triode 207 is interposed between the first and third branches, the anode and cathode being connected, respectively, to these branches. In series with tube 207 is resistance 208. The grid circuit of gas triode 207 extends to point 209 in the second branch through protective resistor 210. Since this impedance network is also substantially similar to others which have been previously described, it is not believed necessary to set forth in detail the differences in voltage distributions which occur in the network when the gas triode 207 is ignited and shut off. It is sufficient to state that when the potential of point 209 is raised with respect to line 2, in a manner described later, the negative grid bias of gas triode 207 is reduced sufficiently to cause its firing, and when a positive potential is applied to resistor 211, (Fig. 1c), in a manner described later, this potential becomes effective to raise the grid voltage of tube 186b (Fig. 1d) to thereby reduce the anode potential of tube 207 sufficiently to effect its shut-off.

When gas triode 207 is ignited, the voltage of point 212 in the third branch of the impedance network, is raised. The screen grids of tubes 213 and 214 (Fig. 1d) and (via switch 12 and line 12a) of tube 39b (Fig. 1b) are connected to point 212 (Fig. 1d) so that when gas triode 207 is conducting, the voltages of these electrodes are at the higher one of two possible potentials. When they are at a low potential, however, reductions in the negative bias of the control grids of these respective tubes do not produce an increased current flow therethrough and through resistors 215, 216 (Fig. 1d) and 38 (Fig. 1b).

Having described the circuits of the subtraction control device, the sequence of operation of the two impedance networks will now be given in connection with the subtraction of chosen digits.

11. *Subtracting*

In order to adjust the circuits so that subtraction of digits entered into the accumulator may take place, switches 94, 192, and 218 (Fig. 1b), and 103 (Fig. 1a) are placed in reverse position from that shown as is also switch 191 (Fig. 1d). Closure of switch 7 (Fig. 1a) affords current supply, as previously stated, to lines 1 and 2. The pulsing and intermediate oscillators (Figs. 1a and 1c) are adjusted so that their frequencies and phases are as described in Section 4 and as illustrated in Figs. 3–b and 3–i, inclusive. The main oscillator 23m—26m (Fig. 1a) operates at a frequency, as described in Section 4, and as shown diagrammatically in Fig. 3–a. It is assumed that 23—26 (Fig. 1b) is at "6," as is illustrated in the first cycle of Fig. 9–a. For purposes of illustration, assume that it is desired to first subtract a -9- in the units order. Accordingly, the "entry" oscillator, 23e—26e ((Fig. 1a) is adjusted so that it is at "9," namely, it is adjusted to a characteristic emission or pattern indicative of "9" as represented by the dash line in Fig. 3–i. All of these adjustments, with regard to frequency and phase, may be established as described in Section 6. It will be understood that only a single digit -9- is to be subtracted and the circuit and timed impulse control means which permit a single operation only, of the subtraction control device, will also be described.

In order to initiate a subtraction operation, switch 79 (Fig. 1b) is thrown from 79a to 79b, thus causing ignition of gas triode 74, in a manner described in Section 6. As previously set forth, the result of this operation is to condition tube 59 by raising the screen voltage of the tube and such rise in potential is indicated at 219 in Fig. 9–b. This rise allows a reduction in control grid bias of this tube to be effective. At "11" in this cycle, a positive pulse is produced on resistor 220 (Fig. 1c) upon the discharge of condenser 22d (Fig. 1a) of the 23d—26d oscillator. Since resistor 220 (Fig. 1c) is in parallel with resistor 168, and since the manner in which an "11" pulse is produced on this latter resistor is set forth in detail in Section 8, it is not believed necessary to repeat such description here. This positive potential on resistor 220 is effective via wire 221 (see also Figs. 1d and 1b) and wire 222, since switches 192 and 218 are in reverse position from that shown, to increase current flow through the conditioned tube 59. By the inverting action of tube 88a, which was described in Section 6, a positive pulse appears at this time on resistor 47. Since switches 94 and 192 (Fig. 1b) and 191 (Fig. 1d) are now reversed from the positions shown, this positive potential, via lines 93a and 193a, causes a reduction of the negative grid bias of gas triode 189. Accordingly, at "11" in the first cycle shown in Fig. 9–a, gas triode 189 (Fig. 1d) is fired and point 198 rises to a high potential at this time, as indicated by 223 in Fig. 9–c. With point 198 (Fig. 1d) raised to a high potential, the screen voltage of pentode 199 is likewise raised, to condition this pentode.

It was previously stated, that the first impedance network of the subtraction control device conditions the second impedance network in order that it may be made effective for controlling subtraction. Such conditioning of the second impedance network is effected by raising the screen voltage of pentode 199 as has just been described. With the screen voltage of pentode 199 raised, a positive potential applied to its control grid causes increased current flow through resistors 202, pentode 199 and resistor 203. At "½ after D," in the second cycle shown in Fig. 9–a, positive pulse is produced on resistor 179 (Fig. 1c) upon the discharge of condenser 22c (Fig. 1a) of 23c—26c. The manner in which a positive pulse is produced on this resistor is set forth in detail in Section 8 and it is not believed necessary to repeat such description here. This positive potential is effective, via line 180b (Figs. 1c and 1d) to raise the control grid voltage of pentode 199 (Fig. 1d) and since its screen grid is at high potential, an increased current flow therethrough ensues, raising the potential of point 209, and igniting the gas triode 207. With gas triode 207 fired, point 212 rises in potential with respect to line 2, thus raising the screen voltages of tubes 213, 214 (Fig. 1d) and also of 39b (Fig. 1b), via line 12a, since switch 12 (Fig. 1d) is in the position shown.

A positive pulse also appears at "½ after D" on resistor 225 (Fig. 1c) and this potential is effective, via line 226 (see also Fig. 1a), switch 103, now in reverse position from that shown, and line 227 (see also Fig. 1b) to increase flow through tube 71b and thereby produce shut-off of gas triode 74. The attendant drop in potential of point 78 with the consequent drop in the screen voltage of tube 59 is indicated at 228 in Fig. 9–b.

It will be appreciated that this operation terminates the operation of the manually controlled impedance network, which includes gas triode 74 (Fig. 1b), for initiating subtraction operations and that another similar cycle cannot take place until switch 79 is returned to the position shown and then thrown to the reverse position. As stated in Section 6, each time gas triode 74 is ignited, only a single digit is added into the accumulator. When used for subtraction, the firing of the gas triode 74 likewise brings about a single operation of the subtraction control device. In this manner only a single digit is subtracted.

The previously described rise in potential of point 212 (Fig. 1d) due to the ignition of gas triode 207 at "½ after D," is indicated at 229 in Fig. 9–d. There is also, as stated above, an attendant rise of the screen voltages of tubes 213, 214, and 39b (Fig. 1b) to condition the same and therefore a positive potential applied to any of the control grids of these tubes is effective to increase current flow therethrough. Pulses applied to the grids of these tubes cause subtracting operations to take place.

In Section 9, mention was made that to perform a subtraction operation, a digit manifesting oscillator is started operating at doubled frequency, at a fixed time in a cycle, namely, "9." At this time, condenser 22f (Fig. 1c), discharges in the local circuit comprising current limiting resistor 27f and gas triode 26f. A voltage drop in the form of an extremely sharp pulse occurs across resistor 27f which, via line 230a, causes condenser 230 to discharge and a negative pulse is produced, via line 230b (see also Fig. 1a) and switch 11, as shown, across resistor 231 (Fig. 1a). This negative pulse is applied, via line 231a (see also Fig. 1c), to the grid of tube 232b (Fig. 1c) thereby increasing its negative bias and reducing current flow therethrough. With decreased current flow, point 233 rises in potential charging up condenser 234 thus producing a positive pulse on resistor 235 (see 249, Fig. 4–c). This positive pulse is effective, via line 236 (see also Fig. 1d), to oppose battery 237 and reduce the negative grid bias of pentode 213. Accordingly, at "9," there is an increased current flow through pentode 213 and resistor 215 whereby point 238 falls in potential with respect to line 2, condenser 239 discharges and a negative pulse appears on resistor 240. Such negative potential increases the grid bias of tube 241a, reducing current flow therethrough, thus effecting a rise in voltage of point 242, with respect to line 2. Condenser 243 charges up and a positive potential is produced on resistor 244.

Accordingly, at "9," a positive pulse on 244 is effective, via wire 245 (see also Fig. 1b), to increase the grid voltage of tube 125b thereby increasing current flow through the voltage divider consisting of resistors 40, 40a, tube 125b, and resistor 41. With such increased current flow, point 48 rises in potential with respect to line 2 reducing the negative grid bias of gas triode 55. Normally, as a result of the foregoing bias reduction, tube 55 becomes ignited permitting 23—26 to commence functioning at doubled frequency, as set forth in Sections 5 and 6. For reasons which will be understood presently, gas triode 55 does not become ignited under the conditions existing in this particular problem, since a –9– is being subtracted.

In discussing the principles of operation of the electronic accumulator for subtraction, it was mentioned that a digit manifesting oscillator operates at doubled frequency for a number of index point positions, which number equals the nine's complement of the digit to be subtracted. In the instant problem, this digit is –9– and its nine's complement is –0–. Therefore, 23—26 is not required to operate at a doubled frequency for any index point positions. The manner in which gas triode 55 of the entry control device is prevented from being fired even though point 48 is raised in potential, as just described, will now be set forth.

Since the digit being subtracted is –9–, 23e—26e (Fig. 1a) is at "9." Likewise, since the resistor 235c (Fig. 1d) is placed in parallel with resistor 67 (Fig. 1c), via line 235b, and the manner in which a characteristic digit pulse is produced on this latter resistor by 23e—26e, is set forth in detail in Section 6, and since the production of a "9" pulse is exactly similar, it is not believed necessary to repeat such description here. The positive potential on resistor 235c (Fig. 1d), via line 236a (Figs. 1d and 1b), opposes a battery 236 (Fig. 1d) thereby reducing the negative control grid bias of tube 39b. Since the screen voltage of this tube is now at a high potential (since point 212, Fig. 1d, connected thereto is at a high potential) the control grid bias reduction just mentioned increases current flow through the voltage divider comprising resistor 38 (Fig. 1b) and tube 39b. Accordingly, point 45 drops in potential and such drop is of sufficient magnitude to reduce the difference in potential between points 45 and 28 to less than the ionization voltage of gas triode 55.

From the foregoing, it will be seen that even though the negative grid bias of gas discharge tube 55 is reduced to an amount which normally effects its ignition, it does not, however, become ignited in this particular problem because its anode potential is concurrently reduced to a value below the ionization voltage. It will therefore be understood that when a –9– is to be subtracted, the gas triode in an entry control device does not become ignited and therefore there is no increase of frequency of a digit manifesting oscillator during "9" to "0" inclusive. Therefore, as a result of this operation, a digit manifesting oscillator is not shifted in phase up to and including "0" (see the second machine cycle in Fig. 9–a).

It is stated in Section 10 that the gas triode 189 of the first impedance network of the subtraction control device is extinguished at one of a plurality of times during the subtraction cycle. This gas triode is shut off by a digit representing pulse and such action may therefore occur at any of the entry index point positions. In the case of the instant problem, gas triode 189 (Fig. 1d) is extinguished at "9." Since resistor 197 (Fig. 1c) is in parallel with resistor 67 and the manner in which a "9" pulse is produced on this latter resistor is now clear, it is not believed necessary to describe how much a "9" pulse is produced on 197. This positive potential is effective, via line 197a (see also Fig. 1d) to increase the grid voltage of tube 186a (Fig. 1d) thereby increasing current flow therethrough and causing point 237 to fall in potential a sufficient amount so that the difference in voltage between it and point 198 is less than the ionization potential of gas triode 189. The shut off of gas triode 189 causes point 198 to fall in potential, as is indicated at 238 in Fig. 9–c. The foregoing has set forth how shut-off of the gas triode in the first impedance network of the subtraction control device is under the control of the digit to be subtracted. If for any reason, therefore, there is a failure of a subtractive entry of a digit into the accumulator, the gas triode of the first impedance network does not become extinguished and a subtraction operation would be attempted in the next succeeding cycle since the first impedance network would continue to condition the second impedance network.

In the foregoing subtraction operation which has been described, a –9– is subtracted from –6– and it is pointed out that the digit manifesting oscillator does not function at a double rate between "9" and "0," inclusive. Hence, the phase of the digit manifesting oscillator is not shifted and it therefore remains in its initial status or at "6." In effect, –0–, or the nine's complement of –9–, is added to –6–. In order that a true difference amount may be formed, the true complement of –9–, i. e., –1– should be added. As is well understood when employing complemental addition as a method of subtracting, it is necessary to add an elusive one into the units order of an accumulator. In the electronic accumulator of this invention, provision is made for adding the elusive one and this operation takes place at "11" or the carry time in a cycle. The manner in which an elusive one entry is effected will now be described.

In Section 8, it was set forth how a carry timing or "11" pulse of positive potential is produced on resistor 158 (Fig. 1c). At this time in the second machine cycle shown in Fig. 9–a, a positive pulse appears on 158 and it is effective via line 159a to oppose battery 159 (Fig. 1d) thereby reducing the negative control grid bias of tube 214. Since the screen voltage of this tube is at a high potential at this time (see Fig. 9–d) such control grid bias reduction causes increased current flow through resistor 216 (Fig. 1d) and tube 214. Accordingly, point 250 drops in potential with respect to line 2 bringing about a discharge of condenser 251 and the appearance of a negative pulse on resistor 252. This negative pulse increases the grid bias of tube 241b, decreasing current flow therethrough and also through resistor 253. Point 254 rises in potential charging up condenser 255 causing a pulse of positive polarity to appear on resistor 256. This pulse is effective, via wire 257 (see also Fig. 1b), to increase the grid voltage of tube 42b. Accordingly, at "11" there is increased current flow in the voltage divider comprising resistors 40, 40a, tube 42b and resistor 41. The potential of point 48 with respect to line 2 is raised, thus reducing the negative grid bias of gas triode 55 and it becomes ignited. Thereupon 23—26 commences to operate at doubled frequency and this action is indicated at 258 in Fig. 9–a. Oscillator 23—26 functions at this increased rate until "12," that is, during one index point position, at which time it is returned to its normal frequency.

At "12" as is described in Section 6, a negative potential appears on resistor 102 (Fig. 1a). This negative pulse reduces flow through 97b, charges condenser 97c to produce a positive pulse on resistor 44. This positive pulse, via line 44b, reduces the negative grid bias of tube 39a (Fig. 1b), increasing current flow through resistor 38 and tube 39a. Point 45 drops in potential with respect to line 2 sufficiently so that the difference in voltage between it and point 28 is less than the ionization potential of gas triode 55.

Accordingly, gas discharge tube 55 of the entry control device becomes extinguished at "12" and 23—26 resumes operation at its normal frequency, as indicated at 259 in Fig. 9–a. The foregoing has described a method by which an elusive one entry is made in the units order of an an electronic accumulator under the control of a subtraction control device. The result of this operation is to advance the units order a unit digital amount, namely, to add —1— in the units order thereby increasing the phase of the digit manifesting oscillator by a commensurate amount. Thus the phase of the oscillator is advanced by one and it now stands at "7" as indicated at 260 in Fig. 9–a.

Having brought about an entry of an elusive one, there is no further use for the second impedance network of the subtraction control device and its gas triode, which is conducting up to this time, may therefore be shut off. In Section 6, there is described, how a negative pulse appears on resistor 102 (Fig. 1a) at "12." This negative pulse is effective, via line 261 (see also Fig. 1c), to increase the negative grid bias of tube 63a, reducing current flow therethrough and also through resistor 262. Point 263 rises in potential and since condenser 264 is thereby charged up, a positive potential appears on resistor 211. This positive pulse, via line 211a (see also Fig. 1d) increases the grid voltage of tube 186b (Fig. 1d) increasing current flow through resistor 200, tube 186b and resistor 201. Consequently point 265 drops in potential with respect to line 2 sufficiently, so that the difference between it and point 212 is below the ionization potential of gas triode 207. Accordingly, 207 is shut off and point 212 drops to its normal voltage. This potential reduction is indicated at 266 in Fig. 9–d. The fall in potential of point 212 (Fig. 1d) reduces via line 12a the screen voltages of tube 39b (Fig. 1b) and also reduces that of tubes 213 and 214 (Fig. 1d) to a low value. Hence in subsequent cycles, even though positive pulses are applied to the grids of these tubes, such pulses are ineffective in bringing about increased current flow therethrough since the screen voltage is low. Therefore, no further subtraction cycles ensue until the subtraction control device is again manipulated.

As long as no further digits are subtracted, 23—26 (Fig. 1b) remains at "7" indicating that –7– stands in the units order. On the assumption that it is now desired to subtract a –5– from this order, "Entry" oscillator 23e—26e (Fig. 1a) is adjusted to "5" as is shown by the dash-dot lines in Fig. 3–i. Manipulation of switch 79 (Fig. 1b) brings about ignition of gas triode 74 and an attendant rise in potential of point 78, as indicated at 267 in Fig. 10–b, in a manner previously explained. The rise of point 78 (Fig. 1b) increases the screen voltage of tube 59 to condition the same and permits an "11" pulse applied to the control grid of 59 to increase the flow therethrough to thereby effect ignition of gas triode 189 (Fig. 1d), as previously set forth. With gas triode 189 ignited, point 198 as indicated at 268 in Fig. 10–c rises in potential to increase the screen voltage of 199, to condition the same thereby permitting a later pulse at "½ after D" on the control grid of 199 to increase flow therethrough, raise the voltage of point 209 and effect ignition of gas triode 207 (Fig. 1d). The ignition of this gas discharge tube brings about a rise in potential of point 212, as indicated at 269 in Fig. 10–d. The second impedance network of the subtraction control device is therefore called into operation to control subtraction operations. Also, at "½ after D" as previously described, a pulse causes shut-off of gas triode 74 (Fig. 1b) and point 78 drops to a low potential as indicated at 272 in Fig. 10–b. A "9" pulse applied to the control grid of pentode 213 (Fig. 1d) effects ignition of gas triode 55 (Fig. 1b) of the entry control device and at this time 23—26 begins to function at doubled rate, as indicated at 270 in Fig. 10–a. Gas triode 55 (Fig. 1b) remains ignited for four index point positions (four being the nine's complement of five) and at "5" it is extinguished by the "5" pulse of 23e—26e. Thereupon 23—26 resumes operation at normal frequency as indicated at 271 in Fig. 10–a. Also at this time, gas triode 189 (Fig. 1d) is extinguished by the "5" pulse and point 198 drops to a low potential as indicated at 273 in Fig. 10–c. The result of having subtracted a –5– is to shift the digit manifesting oscillator from "7" to "1" as indicated at 274 (Fig. 10–a). At "11," a pulse applied to the control grid of pentode 214 (Fig. 1d) causes gas triode 55 (Fig. 1b) to again become ignited thereby initiating an entry of an elusive one. At this time, 23—26 commences to operate at an increased frequency and this action is indicated at 275 in Fig. 10–a. This oscillator continues functioning at an increased rate for one index point position and at "12" triode 55 is extinguished and 23—26 resumes operation at normal frequency as indicated at 276, Fig. 10–a. The effect of adding the elusive one is to increase the phase of the oscillator by one, that is a –1– has been added so that 23—26 is shifted from "1" to "2" as indicated at 277, Fig. 10–a. Also at "12" gas triode 207 (Fig. 1d) is extinguished and point 212 falls to the lower of its two potentials as indicated at 278 in Fig. 10–d.

Assume now that it is desired to subtract a –2– from the –2– standing in the accumulator. Accordingly, 23e—26e (Fig. 1a) is adjusted so that it is at "2" as indicated by the solid line Fig. 3–i. Manipulation of switch 79 (Fig. 1b) brings about ignition of gas triode 74 and an attendant rise in potential of point 78, as indicated at 279 in Fig. 11–b, in a manner previously explained. The rise in potential of point 78 (Fig. 1b) permits an "11" pulse applied to the control grid of tube 59 to ignite gas triode 189 (Fig. 1d), as mentioned above. With gas triode 189 ignited, point 198 rises in potential as indicated at 280 in Fig. 11–c permitting a pulse at "½ after D" to effect ignition of gas triode 207 (Fig. 1d). The ignition of this gas discharge tube brings about a rise in potential of point 212, as indicated at 281 in Fig. 11–d. The second impedance network of the subtraction control device is therefore called into operation to control subtraction operations. At "½ after D," a pulse also causes shut-off of gas triode 74 (Fig. 1b) and point 78 drops to a low potential as indicated by 282 in Fig. 11–b. A "9" pulse applied to the control grid of pentode 213 (Fig. 1d) effects ignition of gas triode 55 (Fig. 1b) in the entry control device and at this time 23—26 begins to function at double its normal rate as indicated at 283 in Fig. 11–a. Gas triode 55 (Fig. 1b) remains ignited for seven index point positions (seven being the nine's complement of two) and at "2" it is extinguished.

Thereupon 23—26 resumes operation at normal frequency as indicated at 284 in Fig. 11–a. Also at this time, gas triode 189 (Fig. 1d) is extinguished by the "2" pulse and point 198 drops to a low potential as indicated at 285 in Fig. 11–c.

The result of having subtracted a –2– is to shift the digit manifesting oscillator from "2" to "9" as indicated at 286 (Fig. 11–a), it being recalled that index points "11" and "9" are similar, as previously set out. At "11," however, a pulse applied to the control grid of pentode 214 (Fig. 1d) causes gas triode 55 (Fig. 1b) to again become ignited thereby initiating an entry of an elusive one. At this time, 23—26 begins to operate at an increased frequency and this action is indicated at 287 in Fig. 11–a. The oscillator continues functioning at an increased rate for one index point position and thereupon, at "12" resumes operation at normal frequency as indicated at 288 in Fig. 11–a. The result of adding the elusive one is to shift the phase of the oscillator by one and it is therefore shifted to "0" as indicated at 289 in Fig. 11–a, it being recalled that points "D" and "0" are similar. Also at "12" gas triode 207 (Fig. 1d) is extinguished and point 212 falls to the lower one of its two potentials as indicated at 290 in Fig. 11–d.

Figs. 12–a, 12–b and 12–c illustrate diagrammatically the duration of portions of a cycle in which point 28 (Fig. 1b) of the entry control device assumes the higher one of two possible potentials at "9" for each of the foregoing subtraction problems, respectively, and in which point 28 assumes the higher one of two potentials during entry of the elusive one. In Fig. 12–a, however, in which a –9– is subtracted, there is no rise in potential of this point 28 at "9," since gas triode 55 (Fig. 1b) is not then ignited and therefore there is no increase of frequency of 23—26 as normally occurs at this time. At carry time or "11," however, there is a rise in potential, as shown in each of these figures.

12. *Carry determining device—subtracting*

When the method of complemental addition is employed as the basis of subtracting, as in this invention, the process of determining when there are carry requirements may be best understood by remembering that nines complements, of digits to be subtracted, are added. Therefore, when the sum of the nines complement of the digit being subtracted and the digit already standing in the accumulator equals or exceeds ten, the given order passes from "9" to "0" and the requirement of a carry into the next higher order exists.

Applying the foregoing rule to each of the subtraction problems described in Section 11, it is seen that when a –9– is subtracted from a –6– (–0– added to –6–) no carry is required; when a –5– is subtracted from a –7– (–4– is added to –7–) a carry is required; and that when a –2– is subtracted from a –2– (–7– added to –2–) no carry is required. In this last problem, however, a "carry through –9–" is required, if such order receives a carry, which is true in this case, by virtue of the elusive one entry. Attention is directed to the fact that with regard to the first and third problems, and prior to entry of the elusive one, the digit manifesting oscillator either remains unaltered phase (Fig. 9–a) or is shifted to a higher phase, numerically speaking (Fig. 11–a), and with regard to the second problem the oscillator is shifted to a lower phase (Fig. 10–a).

Whenever a digit is subtracted in the accumulator causing a digit manifesting oscillator to be shifted from one phase to another which is numerically lower, the oscillator may be said to have passed from "9" to "0" during the entry of the digit and therefore a carry increment must be added into the next higher order. In the second cycle of Figs. 9–a and 11–a and with respect to the "9" to "0" time inclusive, the oscillator does not shift to a lower phase and attention is particularly directed to the fact that the oscillator condenser discharges only once in this time interval (see 291 and 292 of these respective figures). In the second cycle of Fig. 10–a, the oscillator shifts to a lower phase and the oscillator condenser discharges twice in the "9" to "0" time inclusive (see 293 and 274). As in adding, therefore, and as described in Section 7, a "9" to "0" condition, or carry requirement into the next higher order, is indicated by a double discharge, in a certain interval of time, of an oscillator condenser. Hence, the carry determining device, described in detail in Section 7, is also employed in the electronic accumulator for determining when carry requirements exist during subtraction operations. Since the device is similar in mode of construction and in operation it need not be described in detail.

Figs. 13–a and 13–c show the rise and fall in potential of point 135 (Fig. 1d) of the carry determining device as controlled by the sequential discharges of condenser 22 (Fig. 1b) of 23—26, for the first and third problems described (see also Figs. 9–a and 11–a). As previously stated, point 135 (Fig. 1d) must be at a high potential at "11" for the carry effecting device to cause entry of a carry. Since point 135 is at a low potential at "11" in each of the cycles of Fig. 13–a and 13–c no carry operations are effected, this being in accordance with the non-carry requirements of the first and third problems. As shown at 294, however, in the second cycle of the latter figure, point 135 (Fig. 1d) does rise to a high potential commencing at "11." Due to the time required to charge condenser 123, however, upon ignition of gas triode 129, point 135 does not rise instantaneously to a high potential, so that the screen voltage of pentode 150 of the carry effecting device also does not rise instantaneously. It is necessary for the screen voltage of pentode 150 to be completely at a high potential at "11" for a carry operation to be caused by this tube, since the "11" pulse applied to its control grid, as will be recalled, has an extremely steep characteristic. Although the screen voltage is also rising, since it is not yet at a high potential upon application of the "11" pulse to the control grid of pentode 150, this "11" pulse is ineffective to increase current flow therethrough and therefore does not cause an unwanted entry of a carry increment. If desired, the circuit of the carry determining device may be arranged so that point 135 does not rise (gas triode 129 remains non-ignited) at "11," when condenser 22 (Fig. 1b) discharges, and such ignition preventing circuit will be explained in section 20 in connection with the key controlled embodiment of the invention.

Referring again to Fig. 10–a which shows the operation of the digit manifesting oscillator when a –5– is subtracted from a –7–, it is seen that the oscillator shifts to a lower phase and, therefore, that a carry condition exists. The oscillator condenser discharges twice between "9" and "0" during the second machine cycle as indicated at 293 and 274. Accordingly, at "11," point 135 (Fig. 1d) is already at a high potential and its inception is indicated at 295 in Fig. 13–b.

13. *Carry effecting device—subtracting*

At "11" therefore, pentode 150 (Fig. 1d) of the carry effecting device causes ignition of gas triode 168 (Fig. 1b), in the manner described in detail in Section 8. On the assumption that gas triode 168 is in the tens order entry control device, it would normally remain ignited for only a single index point position, to thereby cause the tens order digit manifesting oscillator to operate at doubled frequency. In this manner a -1- would be added to whatever digit is standing in the tens order. As set forth in Section 8, tube 168 remains ignited until switch 169 is manipulated, as previously described, and its ignited status, therefore, serves to indicate, for as long as desired, that a carry condition has existed in the units order. Attention is particularly directed to the fact that the "11" pulse which initiates carry operations also initiates an elusive one entry, both operations, therefore, taking place concurrently.

In Section 11, in the description of the third problem it was stated that when -2- is subtracted from -2-, the oscillator stands at "9," prior to the addition of the elusive one. This is indicated at 286 in Fig. 11-a, it being recalled that index point "11" is the equivalent of "9." Whenever a digit manifesting oscillator stands at "9" and subsequently receives an elusive one, a "carry through 9" condition exists and the next higher order must receive a carry increment. As was described, there is an addition of an elusive one in the third subtraction problem which shifts the oscillator to "0" from "9" and the manner in which a "carry through 9" is effected, will now be set forth.

When subtracting, a positive pulse is produced at "11" on resistor 256 (Fig. 1d) as described in Section 11. Since resistor 296 is in parallel with resistance 256, a positive pulse also appears on the former. This potential opposes that of battery 297 (Fig. 1d) to reduce the negative control grid bias of pentode 298 of the carry effecting device. Current flow through pentode 298 increases, with a reduction in the negative control grid bias, when there is simultaneously effective, an increased screen grid potential thereof. The manner in which a positive pulse is produced on resistor 144 (Fig. 1d) each time condenser 22 (Fig. 1b) of 23—26 discharges, is described in detail in Section 7. Since resistor 299 (Fig. 1d) is in parallel with resistance 144, a positive pulse also appears on the former each time the condenser 22 discharges. This potential, via line 299a, raises the screen voltage of tube 298. It is required, however, as stated above, that there exist simultaneously, an increased screen voltage and a reduced negative grid bias, in order to produce an increased current flow through pentode 298. Such a condition exists when there is an elusive one entry into an order and when also said order stands at "9" (or "11") (i. e. condenser 22 or digit manifesting oscillator 23—26 discharges at "11"). In the third problem these conditions exist, because at "11," an elusive one entry is made and concurrently therewith the oscillator condenser 22 discharges.

Upon increased current flow through 298, current flow also increases through resistor 151 and point 160 falls in potential with respect to line 2 and a negative pulse appears on resistor 152, eventually effecting ignition of gas triode 168 (Fig. 1b), as described in Section 8. Assuming that gas triode 168 is in the tens order entry control device, it would normally remain ignited for a single index point position only, to thereby cause the tens order digit manifesting oscillator to operate at a doubled frequency. In this manner a -1- would be added to whatever digit is standing in the tens order. As set forth in Section 8, tube 168 remains fired until switch 169 is manipulated and its ignited status, therefore serves to indicate, for as long as desired, that a "carry through 9" condition has existed in the units order. It is therefore seen from the foregoing that when an order of this accumulator receives an elusive one, its carry circuits may be conditioned so that a carry increment will be added to the next higher order, and will be so conditioned provided said lower order stands at "9." Such standing at "9," or nine characteristic emission or pattern is indicated by the timed relationship or phase of the digit manifesting device. Therefore, when carrying "through 9," in this accumulator, the carry effecting devices depend for their functioning upon the timed operation of the digit manifesting devices of the orders requiring carry.

It will now be seen from the description in this section and in Section 8, that electronic carry effecting devices are described whereby carry operations may be controlled when orders of an electronic accumulator either pass from "9" through "0" or stand at "9" and are carried into "0" by reception of an elusive one. Such carry circuits apply to an electronic accumulator adapted for both adding and subtracting; the underlying principles by which they operate are universal; and they apply to any number of orders of such an accumulator.

The similarity between "carry through 9" when an elusive one is received in the units order, and a "carry through 9" in a higher order when a carry increment is received, will be obvious from the later detailed description of carry operations of the key controlled embodiment and particularly from a comparison of the carry circuits of Figs. 30e and 30f of the record controlled embodiment wherein circuits for both "carry through 9" with an elusive one and "carry through 9" with a received carry increment are illustrated.

14. Synchronization

As previously stated, a synchronizing means is provided in this invention to furnish invariably timed impulses to maintain all oscillators operating with a fixed relationship, both as to phase and to frequency. It has been shown that some of the oscillators have their phase changed and that to effect phase shifting their frequency is varied. It is therefore necessary to synchronize these oscillators during the time that their frequency is changed and to maintain them in their new phases.

The details of 23m—26m producing forty timed electrical impulses spaced at different decimal and sub-decimal positions of a digit oscillator cycle and of 23g—26g, 23h—26h, and 23i—26i (Fig. 1a) producing impulses spaced, respectively, at different decimal portions of a machine cycle have been set forth in Section 4 and therefore need not be repeated. Attention is directed to Figs. 3-a, 3-b, 3-c and 3-d which show, respectively, the frequencies, and phases of these oscillator circuits and the timing of the impulses. Whenever condenser 22m (Fig. 1a) is short-circuited and hence discharges, point 6m rises sharply in potential with respect to line 2. The magnitude of the potential rise is equal to the difference between the critical anode potential of gas triode 26m and its ionization potential. The full magnitude of this potential rise is realized since current limiting resistor 27m is located intermediate condensers 22m and point 6m. This rise in potential of point 6m, with respect to line 2, produces a pulse of positive polarity, which is applied, via line 301 and condenser 302g, to the voltage divider consisting of resistors 303g, 304g, 32g and 35g. Likewise this pulse is applied from line 301, through condenser 302h to the voltage divider consisting of resistors 303h, 304h, 32h, and 35h. Also this same pulse is applied through condenser 302i, to the voltage divider consisting of resistors 303i, 304i, 32i, and 35i. Accordingly, the points 305g, 305h, and 305i rise in potential momentarily with respect to their normal potential determined by points 33g, 33h, and 33i. Thus the negative grid bias of gas triodes 26g, 26h, and 26i is momentarily reduced.

With regard to gas triode 26g, if the difference in potential between line 1 and point 6g is very near the critical anode potential, the decrease in negative grid bias just mentioned causes tube 26g to fire and condenser 22g to be discharged. The same also applies to gas discharge tubes 26h and 26i. It will be appreciated that a synchronizing pulse appearing on line 301 is attenuated by impedances consisting of condenser 302g and resistors 303g, 304g, 32g, and 35g and hence the amount by which point 305g rises in potential with respect to point 33g is determined by the relative magnitudes of resistor 32g and the sum of resistors 303g and 304g. As the total resistance of 303g and 304g is made smaller, relative to resistor 32g, a greater proportion of the voltage of the synchronizing pulse is applied to the grid of tube 26g. If point 305g were located intermediate resistor 303g and condenser 302g, substantially the full voltage of the synchronizing pulse would be applied to the grid of tube 26g.

With such a proportion of the synchronizing pulse applied to the grid of tube 26g, it follows that the gas triode would discharge oftener than desired and in fact would approach, if not equal, the frequency of the main oscillator. Therefore, the relative proportions of resistors 303g, 304g, and 32g must be such that the gas triode 26g discharges with the frequency desired. It has been found in practice that the sum of resistors 303g and 304g should be large with respect to resistor 32g. The foregoing description also applies to the circuit arrangements for gas triodes 26h and 26i.

It is well known that when a gas triode is ignited, there is a grid current flow. Since, in a relaxation oscillator, the time during which a gas triode is ignited is of the order of microseconds, this aforementioned grid current flow is in the nature of a steep pulse. It has been pointed out, in Section 4, that the three intermediate oscillators now being considered function at the same frequency but operate at different phases. As has been shown, and as is readily seen by comparison of Figs. 3–b, 3–c and 3–d this phase relation differs in one instance by a half index point position and in the other instance by one index point position and it follows that as one gas triode of one oscillator ignites, the anode potentials of the other oscillators are approaching their critical anode potentials.

As previously mentioned, the discharge of a gas triode produces a sharp pulse in its grid circuit. In the multiple circuit arrangement employed and particularly in view of the fact that the oscillators are out of phase, provision must be made to prevent this sharp pulse, due to grid current flow, from reacting in other portions of the circuit, either to cause the main oscillator to change in frequency or to cause the intermediate oscillators to attain a "fly-back" condition ahead of time.

It therefore follows that the pulse due to grid current flow must be attenuated. Such attenuation is partially effected by resistor 31g (Fig. 1a) in the grid circuit of gas triode 26g. This resistor is made as large as possible without affecting the stability of the gas triode. It has been found that even though resistor 31g is made large, the pulse is not completely attenuated at point 305g. Hence, whenever gas triode 26g ignites, point 305g has a rise in potential greater than that caused by a synchronizing pulse alone. This additional rise in potential may be maintained at a small magnitude provided the sum of resistors 303g and 304g is greater in magnitude than resistor 32g. Accordingly, with such proportioning of resistors 303g, 304g, and 32g, the pulse which is produced by grid current flow when gas triode 26g ignites is almost completely attenuated and therefore has negligible feed back to line 301 and thus, either to the main oscillator circuit at point 6m to cause variation in its frequency, or to points 305h, and 305i in the synchronizing circuits for the other intermediate oscillators thereby causing them to assume a "fly-back" condition ahead of the desired times in a cycle. While the foregoing description has related to the synchronizing circuit for 23g—26g it is obvious that the same principles apply to the synchronizing circuits for 23h—26h and 23i—26i.

The details of pulsing oscillators 23a—26a to 23e—26e, inclusive (Fig. 1a), and of 23f—26f (Fig. 1c), producing timing impulses at fixed points in a cycle, have been set forth in Section 4 and therefore are not repeated. The frequencies and phases of these oscillators and the timing of the impulses are shown in Figs. 3–e to 3–j, inclusive, respectively.

These pulsing oscillators are synchronized under the control of the intermediate oscillators by means of circuits similar to those just described in connection with the synchronizing of the intermediate oscillators by the main oscillator. It therefore is not believed necessary to describe these circuits in detail.

It should be mentioned, however, that the proportions of the resistances such as 303a, 304a, 32a, etc. are similar to those described previously in connection with resistors 303g, 304g, and 32g, etc., that is, they must be so proportioned as to prevent 23a—26a, 23b—26b, etc. from reacting, not only on one another to upset a desired phase relationship, but also to prevent these oscillators from reacting on an intermediate oscillator, such as 23g—26g. Referring to Fig. 1a, the potential supplied from point 6g by 23g—26g is effective, via line 306a, to synchronize 23a—26a and 23b—26b. The potential supplied from point 6h by 23h—26h is effective, via line 307, to synchronize 23c—26c. The potential supplied from point 6i by 23i—26i is effective, via line 308a, to synchronize 23d—26d (Fig 1a) and 23f—26f (Fig. 1c).

With switch 309 in the position shown (Fig. 1a), 23e—26e is synchronized under the control of 23i—26i, via line 308, and with switch 309 in reverse position, 23g—26g controls synchronization of 23e—26e, via line 306. Elements of the synchronizing circuits for the pulsing oscillators which correspond in character and function to similar elements of the synchronizing circuit for the intermediate oscillators are correspondingly numbered but have added thereto the suffixes "a," "b," "c,", etc. Switch 309 permits synchronization of the "Entry" oscillator 23e—26e, at each of the odd index point positions, if maintained in the position shown, and at each of the even index point positions if thrown to reverse position.

The provision of this synchronizing system for the pulsing oscillators makes it possible for such oscillators to function, at one of a plurality of phase relationships available in a cycle, with the assurance that a synchronizing pulse is available from intermediate oscillators for bringing about a "fly-back" condition, whenever it is necessary to discharge the condensers. That is to say, the pulsing oscillators can function, at any one of a number of possible phases related to a time base. Irrespective of the phase in which they are operating, the intermediate oscillators provide synchronizing pulses, which in number, at least equal the number of phases in which the synchronized oscillators may operate.

It will be observed that the pulsing oscillators are synchronized by the intermediate group rather than by the main oscillator. It is possible to eliminate the intermediate group and to synchronize the pulsing group directly by the main oscillator. With the arrangement shown, however, the pulsing group may be more readily adjusted, each to its proper phase relationship, since the intermediate oscillators provide synchronizing pulses which number no more than the index point positions of one cycle at which it is desired to phase any one of the pulsing oscillators.

Provision is also made for synchronizing the digit manifesting oscillator. Condenser 302 (Fig. 1b) couples resistor 303 to a line 318 which extends (see also Fig. 1a) to point 6m in the main oscillator circuit. With this arrangement, the main oscillator 23m—26m supplies synchronizing pulses to 23—26 (Fig. 1b), in a manner now understood. As previously stated, the frequency of a digit manifesting oscillator is adjusted so that it is normally one-twentieth that of the main oscillator, and also the frequency of 23—26 is at times doubled. Such doubling of frequency places this oscillator in a new phase. It is therefore desired, not only to maintain this oscillator at its functioning phase, but also to maintain it in whatever phase it is placed. Figs. 5-a, 5-b, 5-c, 9-a, 10-a and 11-a indicate the various phase positions at which condenser 22 (Fig. 1b) discharges and Fig. 3-a illustrates that synchronizing pulses, produced by 23m—26m (Fig. 1a), are available at each and every time in a cycle when the critical anode potential of gas triode 26 (Fig. 1b) is attained. Hence the discharge of condenser 22 is definitely controlled by synchronizing pulses at whatever times in a cycle a condenser discharge ensues due to the operation of the oscillator. The provision of this synchronizing means for a digit manifesting oscillator therefore makes it possible for it to function normally at any one of a plurality of phases available in a cycle, to be operated at an increased frequency for a predetermined period of time, and to thereby be shifted to a different phase than it previously had, with the assurance that a synchronizing pulse is available from the main oscillator for bringing about a "fly-back" condition whenever the condenser discharges. Thus, at whatever phase the synchronized oscillator normally functions, it is maintained in such phase by a synchronizing pulse always available at that time.

When a digit manifesting oscillator is operated at an increased frequency, to alter its phase, the main oscillator also provides synchronizing pulses which, in number, are sufficient to maintain the synchronized oscillator accurately at its increased frequency, thereby assuring that such oscillator returns to its normal frequency in proper phase. For this reason, the synchronizing pulses are provided at each half index point position (see 311 of Fig. 3-a) as well as at each of the twenty basic index points (see also 312).

15. *Indicating*

Figure 8D:
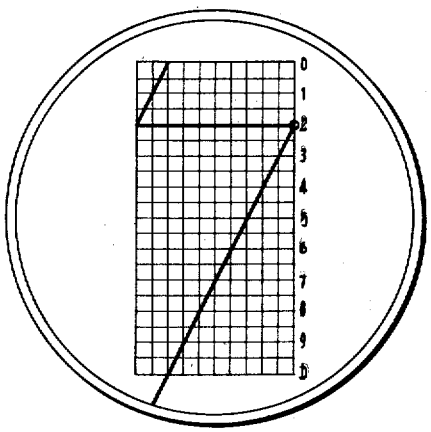

As has been previously mentioned, the indication of a digit standing in an order of the electronic accumulator is provided by a cathode ray oscilloscope, which produces a visible manifestation of the characteristic emission or particular phase phenomenon. The oscilloscope 5 (Fig. 1c) may be employed for such purposes of indication and when so utilized, 23a—26a (Fig. 1a) may be utilized to provide a vertical sweep voltage, as stated previously, and the output of 23—26 (Fig. 1b) provides the controlling potential for the horizontal deflection plates. An example of the visible indication presented by oscilloscope 5, with such connections, is illustrated in Fig. 8c, as previously stated. Since 23a—26a (Fig. 1a) supplies a timing pulse at "0" the vertical sweep frequency is equal to that of one machine cycle of the accumulator, and the cycle begins and ends at "0," instead of "D," these points, however, being corresponding points, as previously stated. Fig. 8c is illustrative of the visual repeated characteristic pattern manifestation produced when 23—26 (Fig. 1b) is at "2." By adjusting the vertical centering control (not shown) of oscilloscope 5 (Fig. 1c) only one-half of the beam trace, vertically, appears on the screen. Such an arrangement is shown in Fig. 8d.

Figure 8E:
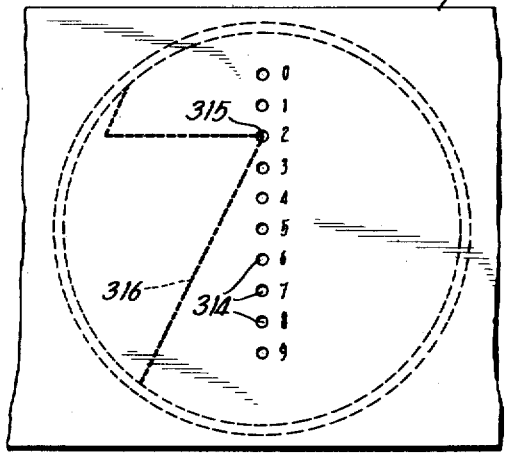

In Fig. 8e there is illustrated a preferred arrangement for indicating which digit stands in an order of the accumulator, wherein the screen of the cathode ray oscilloscope is covered with a mask 313 containing ten apertures 314, in vertical alignment and evenly spaced with regard to the field of the screen transversed by the visible portion of the beam. The apertures permit a small portion only of the beam to be visible to the observer. This portion is shown encircled in Fig. 8d and it will be noted that it is the point at which a beam approaches and starts a "fly-back" operation. Since a beam can occupy one of ten positions in accordance with the digit standing in an order being observed, that particular one of the ten apertures which is illuminated by the beam is a measure of the phase condition and hence is indicative of the digit standing in the particular order. In Fig. 8e, the beam is shown at 315 as illuminating the –2– hole. The remaining portions of the beam trace are not seen by an observer, as they are masked out, the position of the non-visible trace forming the illuminated spot 315 being indicated by dotted line 316. It will be noted that this trace is located to the left of the vertical center line of the viewing screen so that the illuminated spot is always formed somewhere along such vertical center line. The off-setting of the trace to the left of the center is brought about by adjustment of the usual horizontal centering control (not shown) provided in oscilloscope 5 (Fig. 1c).

The foregoing has described the manner in which the electronic wave manifestation of a digit oscillator in an electronic accumulator controls an oscilloscope so that, whenever it is desired, a visible indication may be obtained of the value of the digit standing in an order. Such indication is provided by arranging the oscilloscope so that the observer can measure the phase of the manifestation and hence the numerical value of an entered quantity, since the numerical position of the phase is visibly indicated and is indicative of the value of the entered digit.

Since the output of the digit manifesting oscillator consists of a repeated, timed impulse, such an output does not require the usual readout devices of the prior art. These repeated impulses, being timed, can be utilized directly to control printing or other forms of recording, as well as providing a visible indication of the accumulator manifestation, when pictured by the oscilloscope. The digit manifesting means, therefore, perform the dual functions of producing a repeated manifestation of the digit entered and of read-out of the value of the digit so entered. Such a novel means, therefore, completely eliminates one hitherto separate essential element of a recording and accumulating combination but does not eliminate the function thereof. That such novel means predicate a simple device, is deemed self evident.

16. Resetting

After ascertaining the total amount entered in the accumulator, it is desirable to reset the device before new entering operations are begun. In general, with regard to a complete accumulator, each of the digit manifesting oscillators is returned to a "0" phase from whatever phase it has at the conclusion of prior accumulating operations. If on the other hand a digit manifesting oscillator stands at "0," it remains in this phase unaffected by reset controlling pulses. To initiate zeroizing operations, the operator manipulates a number of switches. Each order of the accumulator receives successive entries of unit increments to step it along until "0" is attained. Thus, if an order stands at "2," the successive addition of eight increments is necessary to return it to "0," since each increment advances the digit manifesting oscillator one digital amount (see Figs. 2-c to 2-j, inclusive, and Fig. 2-a) and if an order stands at "6," only four increments are added in succession before it reaches "0" (see Figs. 2-g to 2-j, inclusive and Fig. 2-a). Each order of the accumulator is thus reset independently and once an order is stepped along to "0," further applications of unit increments are ineffective to change the phase, as will be pointed out. It is to be particularly noted that the operation of all carry circuits is suspended when resetting, as shall also be pointed out presently.

In order to bring about a zeroizing operation, switches 8 and 11 (Fig. 1a), 9 (Fig. 1c) and 10, 12 and 13 (Fig. 1d) are thrown to a reverse position from that shown. Referring to Fig. 1a, with switch 11 in reverse position, resistor 231 is placed in parallel with resistance 96 and therefore the former which normally receives a "9" negative pulse, now receives a "0" negative pulse. As described in Section 11, tube 232b (Fig. 1c) converts this pulse to one of positive polarity which appears as such on resistor 235.

Since switch 10 (Fig. 1d) is now open, resistor 224 is no longer short-circuited and is in series with resistances 204, 205 and 206. Accordingly, point 212 is raised to a high potential as are also the screen voltages of pentodes 213 and 214.

The "0" pulse mentioned above, via line 236, opposes battery 237 (Fig. 1d) reducing the negative control grid bias of tube 213 thereby increasing current flow therethrough. A "0" negative pulse therefore appears on resistor 240 and is inverted by tube 241a to one of positive polarity appearing on resistance 244. In Section 11, it is a "9" positive pulse appearing on resistor 244 which brings about ignition of gas triode 55 (Fig. 1b) of the entry control device. When resetting, however, a "0" pulse on this same resistor via line 245 (see also Fig. 1b) and tube 125b effects firing of 55. Thus 23—26 begins to operate at double its normal frequency at "0" in resetting cycles, and the "0" pulse, during resetting operations, becomes an entry pulse instead of a knock-off pulse.

This oscillator functions at an increased frequency for only one index point position, since at "11," gas discharge tube 55 becomes extinguished. At this time, a positive pulse appears via line 229a on resistor 44 (Fig. 1a), since switches 8 (Fig. 1a) and 9 (Fig. 1c) are in a reverse position. This resistor is thereby placed in parallel (via line 220a and switch 9 reversed) with resistance 229 which has produced on it an "11" pulse, as descirbed in Section 11. The positive pulse on resistor 44 (Fig. 1a) at "11," via line 44b, reduces the negative grid bias of tube 39a (Fig. 1b) and gas triode 55 is shut off, in a manner now well understood. In other words, the "11" pulse which serves as an entry pulse during carry and entry of an elusive one, becomes a knock-off impulse during resetting. Since switch 9 (Fig. 1c) is in a reverse position, no "11" pulse appears on resistor 158 during resetting operations and no pulses are effective to reduce the control grid bias of tube 150 (Fig. 1d) of the carry effecting device. In this manner, pentode 150 remains inoperative during resetting operations, thereby assuring that the carry circuits do not function at this time.

Assuming that 23—26 (Fig. 1b) stands at "6" at the termination of entry operations, the addition of a unit increment in the first reset cycle, as just described, causes this oscillator to shift from "6" to "7." Upon successive resetting cycles, the oscillator is stepped along or advanced from "7" to "8," "8" to "9" and finally from "9" to "0." It will be understood, that after four reset cycles (four increments have been applied) 23—26 is at "0."

The manner in which 23—26 causes a pulse of positive potential to appear on resistor 132 (Fig. 1d) is described in Section 7. Since switch 13 is in reverse position, resistor 235c is now in parallel with 132 and, accordingly, also has a positive potential produced thereon whenever the digit oscillator condenser discharges.

The manner in which resistance 235 (Fig. 1c) has a "0" pulse produced on it, has already been described in this section. In parallel with this resistor, via line 235a (Figs. 1c and 1d) is resistance 300 (Fig. 1d) and hence a positive pulse also appears on this resistance at "0." Since switch 12 is in reverse position from that shown, the positive potential on 300, via line 12a, also raises the screen voltage of tube 39b (Fig. 1b) at "0."

The above mentioned positive potential produced by 23—26 on resistor 235c (Fig. 1d) opposes battery 236 (Fig. 1b) via line 236a to reduce the negative grid bias of tube 39b but such reduction is ineffective for increasing current flow through tube 39b unless its screen voltage is simultaneously raised, and in this case, simultaneity must occur at "0," since the screen voltage of 39b has a "0" pulse impressed thereon. However, when 23—26 reaches "0," a positive pulse at this time reduces the negative grid bias on 39b, and since its screen grid potential is simultaneously raised at "0," increased flow occurs, point 45 drops in potential, and tube 55 is quenched. All succeeding resetting pulses, at "0," which increase the grid voltage of tube 55 and which normally would ignite the same, are now ineffective, since the voltage at point 45 remains low as long as 23—26 is at "0," and therefore no further reset pulses are applied to 23—26 and this digit oscillator remains at "0."

The foregoing has described a method for zeroizing an electronic accumulator wherein in effect a succession of —1's are added to an order until its digit manifesting device reaches "0," at which time the digit manifesting device prevents further attempted entries of —1's— from being effective to cause shifting of its phase. It is obvious that the above described method for resetting, as applied to a single order, is universal in principle and therefore may be applied to a plurality of orders.

Having described the principles of the electronic accumulator in connection with the manually controlled embodiment, two other embodiments will now be described, in sequence. The next embodiment to be described comprises a key controlled machine for entering multidenominational quantities into the completely novel accumulator.

17. General—key controlled machine

In the key controlled embodiment of the invention, the operation is briefly as follows: The operator sets up multidenominational amounts in succession upon a keyboard. Having set up an amount, a motor bar is depressed and an entry of each order item of the multidenominational amount is effected concurrently into the electronic accumulator. The circuits and associated devices are, in this embodiment, limited to the performance of an adding operation only. An indication of the total amount standing in the accumulator is again provided by cathode ray oscilloscopes, one of which is provided for an order of the accumulator and in addition, a test oscilloscope is provided so that the proper phases and frequencies may be established for the various pulsing and synchronizing oscillators, prior to setting the machine into operation. After a series of amounts have been entered into the machine and the total thereof ascertained, the operator manipulates a switch and controlled circuits which thereby reset all orders of the accumulator to zero. Subsequently, further amounts may be entered into the machine.

18. Structure—key controlled machine

Referring to Figs. 14 and 15, the machine comprises a base comprising a cabinet 340 in which are located the electronic devices and associated circuits of the key controlled, electronic accumulator, proper. The top 341 of cabinet 340, comprises a base for mounting three units of the complete device.

Mounted on cabinet top 341, at the left-hand side as viewed in Fig. 14 is a keyboard unit enclosed by a casing 342. Projecting through the top of the casing are key stems 343 (Fig. 14) to each of which is fastened a numbered key top 344. Three banks of ten keys each, one bank for each of three orders, are provided.

Directly to the right of the keyboard unit is located a test oscilloscope unit, generally designated as 5, enclosed by a casing 345. The test oscilloscope unit 5 comprises a cathode ray tube 346 (Fig. 15) whose screen 347 (Fig. 14) is visible through an opening 347a in the front of the casing 345, on which front are mounted the various controls for the cathode ray tube, as illustrated in detail in Fig. 14.

At the extreme right of the cabinet top 341 is located the indicating oscilloscope unit. This unit comprises three cathode ray tubes 348u, 348t and 348hn mounted in a suitable sheet metal housing including two side plates 349 and 350, fastened to the cabinet top 341. The cathode ray tubes are supported by suitable sockets 351 (Fig. 15) fastened to a frame member 352 extending between the side plates 349 and 350. The ends of the cathode ray tubes extend through openings in the front end 353 of the sheet metal housing. A funnel-shaped hood 354, provided at the front of this unit, increases the clarity of the images on the cathode ray tubes. A mask 355, having three sets of ten openings, arranged vertically on the center lines of the tubes, respectively, is located as shown, directly in front of all the cathode ray tubes. The openings of each set are numbered 0, and 1 through 9, respectively.

In Fig. 16 is illustrated the interior construction of the units order keyboard control comprising the key stems 343 guided by slots in a cover 356 and cross members 357 and 358, respectively. Springs 359, stretched between lugs 360 on the key stems and suitable spring anchors in the cross member 357, hold the keys in their undepressed portions of their paths of movement, at the extreme portion of which they are located, by ledges 343a on the key stems, abutting cover 356. The lower ends of the key stems carry insulation pieces 361. These pieces coact with the center straps of contact assemblies generally designated 362, in a manner such that when a key stem is depressed, the normally closed contact cooperating with the center strap is opened and the normally open contact is closed. The contacts are so adjusted that upon depression of the key stem, the normally open contact "makes" before the normally closed contact "breaks." Contact assemblies 362 are supported by a frame member 363, there being one contact assembly for each key stem. The contacts controlled by the "0" key stem, however, are not utilized and therefore are unwired.

Means for holding the keys depressed is provided as follows: A key latch bar 364 is provided for each bank of keys. The bar 364 is pivoted at each end to the top of links 365 whose lower ends are loosely mounted and spaced on shafts 366 extending the width of the keyboard and supported by the keyboard frame. Springs 367, fastened to each bar 364, urge each bar to the right, as viewed in Fig. 16, until bent over ears 368, forming a part of the bar, abut the cam surfaces 369 of the key stems 343. If any key, in the units order for example, is depressed, a camming surface 369 on a key stem 343 will move an ear 368 to the left, as viewed in Fig. 16, and cause its bar 364 to move likewise. Further downward movement of the key stem permits the ear 368 to return a short distance to the right and lodge on top of a ledge 370, thus holding the key depressed. It will be understood that the foregoing applies as well to the tens and hundreds order key banks and associated contacts.

A motor bar 371 is provided which is mounted on the top of a stem 372. The stem 372 is guided by slots in the cover 356 and in the cross members 357 and 358, respectively. A spring 372a holds this stem in its undepressed position. A contact assembly 79m.b., located to the left of the stem 372, has its center blade positioned by a block 373 having a camming surface made of insulating material, said block being fastened to the stem 372. As shown in Fig. 16, the right-hand contacts of contact assembly 79m.b. are closed when the motor bar is not depressed. Upon depression of the motor bar, however, the camming surface on the block 373 causes the center blade of contact assembly 79m.b. to flex to the left, thus opening the right-hand contacts and closing the left-hand contacts. Releasing the motor bar restores these contacts to their normal position, as shown in Fig. 16.

Having described the mechanical details of the manually controlled machine, the electrical circuits will now be discussed in detail. The wiring diagram of this machine is incorporated in Figs. 17a to 17f, inclusive, arranged as indicated in Fig. 17, and elements which correspond in character and function to the circuit elements shown in Figs. 1a to 1d, inclusive, are given the same reference characters. The suffixes "u," "t" and "hn" are utilized to differentiate between the units, tens and hundreds orders, respectively, of the accumulator circuit.

19. Oscillators

The digit manifesting oscillators 23u—26u (Fig. 17b), 23t—26t (Fig. 17c) and 23hn—26hn are similar to 23—26 (Fig. 1b), described in Section 2. The main oscillator 23m—26m (Fig. 17a), the intermediate oscillators 23g—26g, 23h—26h, 23i—26i and the pulsing oscillators 23a—26a to 23d—26d, inclusive, are also similar to like-numbered oscillators, described in Section 3. An additional pulsing oscillator 23j—26j (Fig. 17a) is also provided in this embodiment and since its circuit and frequency are similar to 23a—26a, it will not be described in detail. Its phase is adjusted so that condenser 22j discharges at "D." In Section 6, the "Entry" oscillator 23e—26e (Fig. 1c) was described in detail and it was stated that its phase relationship was adjusted, each time an entry was made, in accordance with the digit to be entered. In the circuit of the key-controlled machine, in lieu of a single adjustable "Entry" oscillator, nine separate oscillators are provided. Each of these is adjusted to an emission pattern representative of one of nine digits to be entered. Specifically, the phase of each oscillator is fixedly adjusted so that a different phase representation of a digit is provided by each oscillator. That is, 23e1—26e1 (Fig. 17d) has a "1" phase, 23e2—26e2 has a "2" phase, etc. With this arrangement, therefore, any of the nine digits may be entered into the electronic accumulator.

With switch 7 (Fig. 17a) closed, power of the polarity indicated is supplied to lines 1 and 2, and by means of connectors 3a, 3b, 3c (Fig. 17e) and the test oscilloscope 5, the phases and the frequencies of the intermediate, pulsing and digit manifesting oscillators are initially established, as described in Section 4. The phases in which the respective "Entry" oscillators are placed are described above. It is assumed that the digit manifesting oscillators for all of the three orders of the accumulator are initially adjusted to a "0" phase.

20. Adding—key controlled machine

Having placed the machine in operation, as set forth in the previous section, the manner in which an operator enters amounts into the machine will now be described. Let it be assumed that the first multidenominational amount to be entered is –215–. The operator depresses the –2–, –1– and –5– key tops 344, Figs. 14 and 15, in the hundreds, tens and units orders, respectively, of the keyboard. The depression of the corresponding keys causes the center strap contacts of 362hn2 (Fig. 17c), 362t1 (Fig. 17c) and 362u5 (Fig. 17b) to shift to a reverse position from that shown in these figures, as described in detail in Section 18. The shift of these contacts permits pulses at "2," "1" and "5" to initiate operations of the entry control devices in the various orders of the accumulator. The manner in which the "5" digit is entered will now be described in detail.

Referring to Fig. 17d, at "5" in each cycle, condenser 22e5 discharges in the local circuit comprising current limiting resistor 27e5 and gas triode 26e5. All of the potential to which condenser 22e5 is charged is realized across resistor 27e5 with the exception of the ionizing potential necessary to maintain gas triode 26e5 ignited and the potential drop across 27e5 is in the form of an extremely sharp pulse. This drop causes condenser 61—5 to discharge, producing a pulse on resistor 62—5 which is of negative polarity with respect to line 2. This negative pulse is applied, via cable 62a and wire 62b, to the grid of tube 63—5, thereby increasing its negative bias and reducing current flow therethrough. With decreased current flow, the voltage drop across resistor 64—5 is decreased, and as a result point 65—5 rises in potential, charging up condenser 66—5. This charging action serves to produce a voltage on resistor 67—5 which is of positive polarity with respect to line 2. It can be seen therefore that the function of tube 63—5 is to convert a pulse of negative polarity, which appears on resistor 62—5 into a pulse of positive polarity on resistor 67—5. This pulse on resistor 67—5 has the same steep characteristic as the pulse produced on resistor 27e5 by condenser 22e5.

The increase in voltage on resistor 67—5 opposes, via line 380a, the battery 380—5 and is effective (see also Figs. 17a and 17b) by the #5 wire of the group of wires generally designated 381, the shifted contact of assembly 362u5 (Fig. 17b), the unshifted contact assemblies and line 382a, to decrease the control grid bias of pentode 382u. It is, therefore, apparent from the foregoing, that a shift of the center contact of 362u5, selects a pulse of positive polarity having a "5" phase to thereby reduce the negative control grid bias of pentode 382u. Such grid bias reduction, however, is ineffective immediately to increase current flow therethrough, since the screen grid of 382u is, at this time, at a low potential. Since the center contacts of 362t1 and 362hn2 (Fig. 17c) are also in reverse position from that shown, "1" and "2" pulses generated by 23e1—26e1 and 23e2—26e2, respectively (Fig. 17d), are effective to reduce the negative bias of the respective control grids of pentodes 382t and 382hn. Having selected the digit representing pulses in the manner just described, the method by which such pulses are effective for entry, once only, into the accumulator, will now be set forth.

In Section 6, circuits are described for controlling the entry of a digit, only once. Such a single entry is brought about by manipulation of switch 79, Fig. 1b, and it will be recalled that this switch might have to be manipulated a number of times before an actual entry of a digit takes place. Improved circuits are incorporated in the key-operated machine, so that only a single depression of the motor bar is necessary to effect an entry. These improved circuits also provide for the concurrent entry of all the digits of a multi-denominational amount into the respective orders. Such entry takes place when the screen voltages of pentodes 382u (Fig. 17b) and 382t and 382hn (Fig. 17c) are raised to a high potential and this potential rise is brought about by the operation of the improved circuits now to be described.

Such screen voltage rise is produced by a voltage change in the second of two impedance networks which are controlled by the keyboard motor bar. The two impedance networks each include vacuum tubes and gas triodes.

Briefly, the gas triode of the first network is ignited whenever the motor bar is depressed and this action may take place at any time in a cycle of operation of the accumulator. The voltage distribution around this network is altered to thereby condition the second network so that its associated gas triode may be ignited early in the cycle in which the addition of the amount is to take place. The gas triode of the first-mentioned network is extinguished under control of the second network but only after the gas triode of the second network is ignited. The gas triode of the second network is extinguished following the entry portion of a cycle. The manner in which the second network brings about a rise of the screen voltages of pentodes 382u (Fig. 17b) etc., will be subsequently described.

With regard to the first impedance network, a number of impedance branches are provided as follows: one branch comprising resistor 69d (Fig. 17b) and tube 71d in series between lines 1 and 2 and the second branch consisting of resistors 72 and 73 in parallel with the first branch. A gas triode 74 is interposed between these branches, the anode and cathode being connected, respectively, to the first and second branches. In series with triode 74 is the resistance 75d. The grid circuit of the gas triode extends, through protective resistor 76, to a resistor 77, connected to line 2 and to one of the contacts of assembly 79m.b. Since this impedance network is substantially similar to ones which have been previously described, it is not believed necessary to set forth in detail the variations in voltage distributions which occur in the network when the gas triode is ignited and quenched. It is deemed sufficient to state that a positive pulse on resistor 77 brings about ignition of gas triode 74, and a positive pulse on resistor 375 (Fig. 17b) is employed to extinguish the triode. When triode 74 is ignited, point 78 is at a higher potential than when 74 is quenched. The screen grid of pentode 59 is connected to point 78 and, this electrode, therefore, is at the higher one of two potentials, when gas triode 74 is ignited. When the screen voltage of tube 59 is at a low potential, however, variations in its control grid voltage have no effect on current flow therethrough.

With regard to the second impedance network a number of branches are also provided as follows: one branch comprising resistor 69c and tube 71c in series between lines 1 and 2, the second comprising resistors 384, 385 and pentode 59, in parallel with the first branch, and the third branch comprising resistors 386 and 387, in series between lines 1 and 2. A gas triode 388 is interposed between the first and third branches, the anode and cathode being connected, respectively, to the first and to point 393 of the third branch. In series with tube 388 is a resistance 75c while its grid circuit extends to point 390 in the second branch through protective resistor 389. Since this impedance network is also substantially similar to ones which have previously been described, it is not believed necessary to set forth in detail the variations in voltage distributions which occur in the network when the gas triode is ignited and shut off. It is sufficient to state that when the potential of point 390 is raised, with respect to line 2, the negative grid bias of tube 388 is reduced sufficiently to cause its firing. A positive potential at "11," on resistor 158 (Fig. 17d), is effective, via line 414 (see also Figs. 17a and 17b), to oppose battery 415, to reduce the negative grid bias of tube 71c (Fig. 17b) increasing current flow therethrough and reducing the anode potential of tube 388 sufficiently to effect its shutoff.

When gas triode 388 is ignited, the voltage of point 393 of the second impedance network is raised. The screen grids of tubes 71d, 382u (Fig. 17b), 382t (Fig. 17c), and 382hn being connected, via line 393a, to point 393, also rise simultaneously. Having described the circuits to be used in a device whereby a single entry only, may be effected, the sequence of operation of the two impedance networks will now be set forth in connection with such an entry.

Referring to Fig. 16, the operator, having set the amount of –215– in the beyboard, depresses the motor bar 371 shifting the center contact of switch 79m.b. (see also Fig. 17b) to a reverse position from that shown. With the center contact of 79m.b. in a non-shifted position, condenser 80 (Fig. 17b) is charged up to the potential of point 81 located on a voltage divider consisting of resistors 82 and 83 in series between lines 1 and 2. With switch 79m.b. in shifted position, however, condenser 80 discharges in the local circuit including resistor 77. The potential, thus produced on resistor 77, is positive with respect to line 2, and accordingly, the negative grid bias of gas triode 74 is reduced sufficiently to cause its ignition. With 74 conducting, current flows through this tube and resistor 75d and there is an increase of current flow through resistors 69d and 73, and the potential of point 78 rises, with respect to line 2, as does also the screen voltage of pentode 59. This rise in screen voltage, allows a reduction of the negative control grid bias, when it occurs, to be effective in increasing current flow through pentode 59. The rise in potential of point 78 is indicated at 394 in Fig. 18–a.

In the brief general description of the key operated device, it was stated that the first impedance network conditions the second impedance network in order that the second may be made effective for controlling entry of an amount. Such conditioning of the second network is effected by raising the screen voltage of the pentode 59, as just described. Reductions in the negative control grid bias of this tube, will now be effective to increase current flow therethrough.

At "D," condenser 22j (Fig. 17a) discharges in the local circuit comprising current limiting resistor 27j and gas triode 26j. All of the voltage to which condenser 22j is charged is available across 27j with the exception of the ionizing potential necessary to maintain gas triode 26j ignited and such potential drop across 27j is in the form of an extremely sharp pulse. The voltage drop across 27j, via line 395a, causes condenser 395 to discharge, thereby producing a pulse on resistor 396 which pulse is of negative polarity, with respect to line 2. This negative pulse is applied, via line 396a (see also Fig. 17d), to the grid of tube 63x thereby increasing its negative bias and reducing current flow therethrough. With decreased current flow, the voltage drop across resistor 64x is decreased and as a result point 65x rises in potential charging up condenser 66x. This charging action serves to produce a voltage on resistor 67x which is of positive polarity, with respect to line 2. It is therefore seen that the function of tube 63x is to convert a pulse of negative polarity, which appears on resistor 396 (Fig. 17a), into a pulse of positive polarity on resistor 67x (Fig. 17d) having the same steep characteristic as the pulse produced on resistor 27j (Fig. 17a) by condenser 27j.

This positive potential on resistor 67x, via line 59a (Figs. 17d, 17a and 17b), reduces the negative bias of pentode 59 (Fig. 17b) and since its screen grid voltage is raised, causes increased current flow therethrough and hence a rise in potential of point 390 and a reduction in the negative bias of gas triode 388 sufficient to effect its ignition. Accordingly, gas triode 388 is fired and point 393 rises to a high potential at "D" as is indicated at 397 in Fig. 18-b. With point 393 (Fig. 17b) at a high potential, the screen grids of tubes 71d, 382u (Fig. 17b), 382t, (Fig. 17c) and 382hn are also raised to a high potential.

Considering now the units order of the accumulator in which a –5– is to be entered, as previously stated, the negative grid bias of pentode 382u (Fig. 17b) is reduced at "5." Since its screen voltage is sustained at a high value from "D" in the cycle, at "5" there is an increase in current flow therethrough. Hence, there is an increased voltage drop across resistor 390u, thereby reducing the potential of point 399u, with respect to line 2. Condenser 400u discharges and a pulse of negative polarity appears on resistor 401u. This negative pulse increases the negative grid bias of tube 402u decreasing current flow therethrough and through resistor 403u. Hence, point 404u rises in potential, with respect to line 2, charging up condenser 405u.

This charging action produces a positive potential on resistor 47u which is effective, via line 93u and tube 42au, to cause ignition of gas triode 55u of the units order entry control device, in a manner as described in detail in Sections 5 and 6. Accordingly, at "5," 23u—26u (Fig. 17b) begins to operate at doubled frequency, as is indicated at 406 in Fig. 19–a. The foregoing has described the method by which a digit –5– is introduced into the units order of the accumulator.

The manner in which pentode 382t (Fig. 17c) permits a "1" impulse to bring about ignition of gas triode 55t and also the manner in which the pentode 382hn permits a "2" impulse to effect ignition of gas triode 55hn is similar to the manner in which gas discharge tube 55u (Fig. 17b) is ignited. It is sufficient to state that at "1," 23t—26t (Fig. 17c) begins to operate at doubled frequency, as indicated at 407 in Fig. 19–b. Likewise, at "2" of the same cycle, 23hn—26hn (Fig. 17c) begins to operate at doubled frequency, as indicated at 408 in Fig. 19–c. It will now be appreciated that the foregoing has described the manner in which all the separate digits, comprising a multidenominational amount, are entered concurrently into the respective orders of the electronic accumulator.

With an entry of a –5–, a –1–, and a –2– into the units, tens and hundreds orders, respectively, gas triodes 55u (Fig. 17b), 55t and 55hn (Fig. 17c) of the entry control devices remain ignited for five, one and two index point positions, respectively, thereby causing 23u—26u (Fig. 17b), 23t—26t and 23hn—26hn (Fig. 17c) to be operated at doubled rate for these intervals of time. At "0," the gas triodes of the entry control devices are extinguished, as described in Section 6. For example, tube 55u (Fig. 17b) is extinguished, since at "0" the negative bias of tube 39au is decreased causing greater flow therethrough, thereby reducing the plate voltage of 55u, to extinguish the same. Since the grids of tubes 39at and 39ahn (Fig. 17c) are in parallel, via line 44b, with the grid of tube 39au (Fig. 17b), there is also an increased current flow through these respective tubes to thereby extinguish gas triodes 55t and 55hn (Fig. 17c) concurrently with 55u, to return the digit manifesting oscillators in the units, tens and hundreds orders to their normal frequency at "0," as indicated at points 409, 410 and 411 in Figs. 19–a, 19–b and 19–c, respectively.

Assuming that all of the digit manifesting oscillators are at "0," prior to the entry of the amount of –215– into the accumulator, the result of having operated the units, tens, and hundreds oscillators at a doubled frequency for five, one and two index point positions, respectively, in the manner just described, is to cause these oscillators to assume new phase relations. The units order oscillator is shifted to "5" the tens order oscillator is shifted to "1" and the hundreds oscillator is shifted to "2." These new phase relations are indicated at points 417, 418, and 419 in Figs. 19–a, 19–b and 19–c, respectively, it being recalled that index points "15," "19" and "18" correspond, respectively, to index points "5," "1" and "2." As long as no further amounts are entered into the accumulator, these oscillators remain at "5," "1" and "2," and repeated emission patterns indicative of these digits, are available to manifest the digits in any desired manner.

It has been previously stated in this section that the gas triode of the first impedance network, whose ignition is controlled by the motor bar switch 79m.b. (Fig. 16) is extinguished under the control of the second impedance network. This is effected in the following manner. As previously stated, the rise in voltage of point 393 (Fig. 17b) raises the screen potential of pentode 71d. Any reduction, therefore, of its negative grid bias is effective to increase current flow therethrough. At "0" in the instant cycle, the negative pulse on resistor 96 (Fig. 17a), via line 96a (see also Fig. 17b), is inverted by tube 374a, to a positive potential which appears on resistor 375 (Fig. 17b) and, via line 375a, opposes battery 412 thereby reducing the negative grid bias of pentode 71d. The resultant increased current flow therethrough produces quenching of gas triode 74, in a manner described in Section 6. The quenching of this gas triode permits point 78 and hence the screen voltage of tube 59 to be returned to a low potential. Gas triode 74 does not become ignited again until the motor bar 371 (Fig. 16) of the keyboard is again depressed. The return of point 78 to its normal potential is indicated at 413 in Fig. 18–a. It is seen, therefore, from the foregoing, that it is necessary for gas triode 388 (Fig. 17b) to be ignited and hence for point 393 to be at a high potential, in order that tube 71d can be effective to extinguish gas triode 74.

Shortly after gas triode 74 is extinguished, gas discharge tube 388 is also extinguished. Such action occurs at "11" and the manner in which a positive pulse is produced by 23d—26d (Fig. 17a) on resistor 158 (Fig. 17d) is the same as described in Section 8. This positive potential on resistor 158 (Fig. 17d) is effective, via line 414 (Figs. 17d, 17a and 17b), to oppose battery 415 thereby reducing the negative control grid bias of tube 71c increasing current flow therethrough and through resistor 69c. This increased current flow produces quenching of tube 388 of the second impedance net work, in a manner now well understood. Accordingly, point 393 returns to a low potential at "11," as indicated at 416 in Fig. 18-b. Gas triode 388 (Fig. 17b) remains quenched until its firing is again effected under control of the first impedance network. It will be observed that the gas discharge tube 388 is ignited prior to and remains in conducting status throughout the entry portion of a cycle, as may be seen by reference to Fig. 18-b and also it is always ignited at a definite time in a cycle, i. e., at "D."

It will now be apparent that the first network, being controlled by depression of the motor bar, may be placed in a conditioning status at any time in a cycle and in such status calls the second network into operation at a later and definite time. The second network remains in operative status throughout the entry portion of a cycle and therefore permits any of the digits -9- to -1-, inclusive, to be entered. The second network furthermore controls a return of the first network to a non-conditioning status and therefore it is clear that the first network will always remain in conditioning status until the second one is in operative status. The first network may have a conditioning status whose duration varies from entry operation to entry operation, but the second network always functions for a fixed duration during a cycle and therefore is utilized for controlling amount entries. The first network never is in a conditioning status for more than one and one-half machine cycles and the second network is in an operative status for only slightly more than one-half of a cycle. By virtue of this arrangement of the first and second impedance networks with their interlocking controls, each depression of a motor bar causes an entry of a multidenominational amount to be made into the accumulator, only once.

Let us assume now that another multidenominational amount, for example, -387- is to be added to the amount already in the accumulator. The operator depresses the -3-, -8- and -7- keytops 344 (Figs. 14 and 15) in the hundreds, tens and units orders, respectively, of the keyboard. The depression of such keys causes the center contacts of 362hn3, 362t8 (Fig. 17c) and 362u7 (Fig. 17b) to shift to a reverse position from that shown. The shift of these contacts permits pulses at "3," "8" and "7" to initiate operations of the respective entry control devices in the respective orders of the accumulator. These pulses are generated by 23e3—26e3, 23e8—26e8 and 23e7—26e7, respectively (Fig. 17d). The negative pulses appearing on resistors 27e3, 27e8 and 27e7, respectively, are inverted to positive polarity by tubes 63—3, 63—8, and 63—7 in the same manner as described in detail in this section in connection with the entry of -215-. These positive potentials oppose batteries 380—3, 380—8, and 380—7 and are effective, via the #3, #8 (Fig. 17c) and #7 (Fig. 17b) wires of the 381 group and the shifted center contacts of 362hn3, 362t8 (Fig. 17c), and 362u7 (Fig. 17b), to reduce the negative grid bias of pentodes 382hn, 382t (Fig. 17c) and 382u (Fig. 17b). Until the screen voltage of each of these pentodes is raised, however, the reductions in negative bias thereof, as just described, are ineffective to cause increased current flow therethrough.

Referring to Fig. 16, the operator having set the amount -387- in the keyboard, depresses the motor bar 371 thereby shifting the center blade of contact assembly 79m.b. (see also Fig. 17b) to a reverse position from that shown. As previously described, this operation brings about a successive ignition of gas triodes 74 and 388 and an accompanying sustained rise in voltage at points 78 and 393, respectively, as indicated at 420 and 421 in Figs. 18-a and 18-b, respectively. With point 393 at high potential, the screen voltages of tubes 71d, 382u (Fig. 17b), 382t and 382hn (Fig. 17c) are also raised and sustained at a high potential, via line 393a. During the entry portion of the succeeding accumulator cycle, the reductions in negative control grid bias of pentodes 382hn, 382t and 382u which occur at "3," "8" and "7," respectively, cause ignition of gas triodes 55hn (Fig. 17c), 55t and 55u (Fig. 17b) of the entry control devices of the hundreds, tens and units orders. The manner in which the gas discharge tubes of the entry control devices become ignited has been described in detail in connection with the first problem.

Accordingly, oscillators 23hn—26hn, 23t—26t (Fig. 17c) and 23u—26u (Fig. 17b) begin operating at a doubled rate at "3," "8" and "7," respectively, as indicated at 422, 433 and 424 in Figs. 19-c, 19-b and 19-a, respectively. These oscillators continue to function at their doubled rate until "0," at which time the gas discharge tubes of the entry control devices are extinguished, as described in this section, and the oscillators thereupon resume their normal frequencies. The return of the digit manifesting oscillators in the hundreds, tens and the units orders to their normal frequency at "0" is indicated at points 427, 426, and 425 in Figs. 19-c, 19-b and 19-a, respectively.

It will be recalled that as a result of the entry of -215- from the keyboard into the machine, the hundreds, tens and units digit manifesting oscillators were shifted to "2," "1" and "5," respectively. With this amount of -215- in the accumulator, the result of having subsequently operated the hundreds, tens and units oscillators at a doubled frequency for three, eight and seven index point positions, respectively, in the manner just described, is to cause them to assume new phase relations. At "0" in the cycle in which -387- is added, the hundreds order oscillator is at "5," the tens order oscillator is at "9," and the units order oscillator is at "2." As will be set forth presently, however, at the termination or at "D" of the cycle, these oscillators will have shifted to "6," "0" and "2," respectively, to designate an amount which is the sum of -215- and -387-.

To sum up from the beginning and assuming -000- originally standing in the accumulator, upon adding -215- thereto, each of the digit manifesting oscillators is shifted from a lower phase to a higher phase so that in accordance with the rules for carry, as set forth in detail in Section 7, there is no requirement of a carry from any one order to any other order. Accordingly, at "11" in the cycle in which -215- is added, points 135u (Fig. 17e) and 135t (Fig. 17f), of the units and tens order carry determining devices, respectively, are at low potential, as indicated at points 428 and 429 in Figs. 20–a and 20–b, respectively. Therefore, at this time, the units and tens order carry devices do not function. It may be mentioned, that since the electronic accumulator of the key operated machine comprises three orders only, there is no requirement of hundreds order carry determining and carry effecting devices and consequently none are shown in the circuit diagram in Fig. 17*f*.

When the amount of –387– is added to –215–, the units order oscillator passes from a higher to a lower phase, and in accordance with the rules for carry, as set forth in Section 7, a carry increment must therefore be added in the tens order. The tens order oscillator, before carry ensues, shifts from "1" to "9" and therefore since this order stands at "9" and receives a carry, or in other words since the tens order digit oscillator is emitting an electronic pattern representative of the digit nine and since a carry impulse is also received, a "carry through 9" condition exists and a carry increment must be also added to the hundreds or next higher order.

Reference to Fig. 1–9*a* indicates that during the predetermined portion "9" to "0," inclusive of the cycle, in which –7– is added to –5–, the condenser 22*u* (Fig. 17*b*) of 23*u*—26*u* discharges twice, namely, at 424*a* and 424*b* (Fig. 19–*a*). Therefore, the gas triode 129*u* (Fig. 17*e*) of the units order carry determining device, first becomes extinguished and then ignited, as described in Section 7, and at "11," point 135*u* is at a high potential, as indicated at 430 in Fig. 20–*a*. With point 135*u* at high potential, the screen voltage of pentode 150*u* is raised, so that any reduction of its negative control grid bias is effective to bring about increased current flow therethrough. The appearance of a positive pulse on resistor 158 (Fig. 17*d*) at "11" in a cycle is described in Section 8. This positive potential, via line 159*a*, opposes battery 159 (Fig. 17*e*) reducing the negative control grid bias of pentode 150*u*, increasing current flow therethrough and, causing a negative pulse to appear on resistor 162*u*. The manner in which tube 88*au*, corresponding in function to tube 88*b* (Fig. 1*b*), inverts this to a pulse of positive polarity appearing on resistor 167*u*, is also described in Section 8. The positive pulse on resistor 167*u* is effective, via wire 431*u* (see also Figs. 17*f* and 17*c*), to positively increase the grid voltage of tube 42*bt* of the tens order entry control device thereby causing increased current flow therethrough to raise the potential of point 48*t* sufficiently to ignite gas triode 55*t*. As a result of this operation, at "11," 23*t*—26*t* begins to operate at doubled rate and this is indicated at 432 in Fig. 19–*b*.

The positive carry effecting potential appearing on resistor 167*u* (Fig. 17*e*) also, via line 297*a* (see also Fig. 17*f*) opposes battery 297*t* (Fig. 17*f*) to reduce the negative bias of pentode 298*t* at "11." As has been mentioned and as a result of the addition of –8– to –1–, 23*t*—26*t* (Fig. 17*c*) is at "9," before carry, and, accordingly, its condenser 22*t* discharges at this same index point "11" ("11" and "9" being similar). The manner in which a negative pulse on resistor 27*t* (Fig. 17*c*) is converted, via line 137*ta*, by tube 139*bt* (Fig. 17*f*) into a pulse of positive polarity, which appears on resistor 144*t*, is generally as described in Section 7. This positive potential on 144*t*, via line 298*ta*, raises the screen voltage of pentode 298*t* concurrently with a reduction of its control grid bias by the carry pulse from the lower order as set forth above. Hence, at "11," there is an increase in current flow through pentode 298*t* and point 160*t* drops in potential, with respect to line 2, and a negative pulse appears on resistor 162*t*. This negative pulse, via line 162*ta* (see also Fig. 17*e*), is inverted by the action of tube 88*bt* (Fig. 17*e*) to a pulse of positive polarity appearing on resistor 167*t*. This positive potential on 167*t* is effective, via line 431*t*, (see also Figs. 17*f* and 17*c*) to raise the grid voltage of tube 42*bhn* in the next higher, or hundreds order entry control device, increasing current flow therethrough and raising the potential of point 48*hn* a sufficient amount to cause ignition of gas triode 55*hn*. As a result of this operation, 23*hn*—26*hn* also commences operating at a doubled rate at "11" and this is indicated at 433 in Fig. 19–*c*.

Both 23*t*—26*t* and 23*hn*—26*hn* (Fig. 17*c*) function at a doubled rate for one index point position, at which time the gas triodes 55*t* and 55*hn* of the respective associated entry control devices become extinguished and the oscillators resume operations at their normal frequency. The manner in which the gas triode of an entry control device is extinguished at "12" is described in Section 6 and 11. It will be recalled that a positive "12" pulse is produced on resistor 44 (Fig. 17*a*) at this time. This pulse is effective, via line 44*b*, to concurrently reduce the grid bias of tubes 39*at* and 39*ahn* (Fig. 17*c*) increasing current flow therethrough and reducing the potential of points 47*t* and 45*hn* sufficiently, with respect to line 2, so that gas triodes 55*t* and 55*hn* are quenched. The return of the tens and hundreds order digit manifesting oscillators to operation at their normal frequency is indicated at 434 and 435 in Figs. 19–*b* and 19–*c*, respectively. As a result of adding a carry increment of –1– to the tens and hundreds orders, the phase relations of the oscillators are respectively shifted from "9" to "0" and from "5" to "6" so that at the termination of the cycle, an amount of –602– stands in the accumulator, this amount being the sum of –215– and –387–.

In Section 12, it was stated that a circuit could be provided to prevent ignition of the gas triode of a carry determining device when the condenser of a digit manifesting oscillator discharges either at "9" or at "11." As a result of the entry in the cycle when –387– is added to –215–, oscillator 23*t*—26*t* (Fig. 17*c*) is shifted to "9." While this entry is taking place and before "9" is reached, condenser 22*t* discharges as indicated at 423*a* in Fig. 19–*b*, thereby quenching triode 129*t* (Fig. 17*f*) of its carry determining circuit. Point 135*t*, therefore, falls in potential as indicated at 436 in Fig. 20–*b*. Without the special circuit about to be described, the succeeding discharge of condenser 22*t* (Fig. 17*c*) at "11" would effect ignition of triode 129*t*, to raise the potential of 135*t*, as indicated by the dotted line 437 in Fig. 20–*b*. While, as explained in Section 12, the lag, due to condenser 123*t*, would prevent tube 150*t* from initiating a carry at "11," means may be provided, as now described, to insure that triode 129*t* is not ignited at "11."

As stated previously, a positive potential pulse appears on resistor 158 (Fig. 17*d*) at "11." This positive pulse raises the grid voltage of tube 232*a* (Fig. 17*d*) thereby increasing flow therethrough with consequent reduction in potential (with respect to line 2) of point 438. Line 439 (see also Figs. 17*e* and 17*f*) and branches 439*u* and 439*t* connect point 438 to the anodes of tubes 139*au* (Fig. 17*e*), 125*au* (Fig. 17*b*), 139*at* (Fig.

17f) and 125at (Fig. 17c). Therefore, the plate voltage of tube 125at falls at the same time that its grid voltage is raised, due to the discharge of condenser 22t at "11." Hence the flow through 125at is not sufficient to raise the voltage of point 136t (see also Fig. 17f) to ignition value, and the ignition of tube 129t, is therefore prevented by this circuit from taking place, at a time when its digit manifesting oscillator is at "9" (or "11"). This condition is indicated by the solid line 440 in Fig. 20–b.

In summary, the foregoing has set forth the manner in which two multidenominational amounts are successively entered from the keyboard into the electronic accumulator and it will be appreciated that any number of further such amounts may also be introduced, in the manner described. As a result of adding the second amount to the first amount, requirements for carry operations are encountered and the manner in which the carry determining and carry effecting devices operate for "9" through "0" and "carry through 9" conditions for a multidenominational accumulator has also been set forth. Assuming that no other amounts are added in the machine and that the operator wishes to ascertain the total, the use of the indicating device for this purpose will now be described.

21. *Indicating—key controlled machine*

As previously stated, an oscilloscope is provided for each order of the accumulator to indicate at any time the value of the digit being repeatedly manifested by the digit oscillator. Considering now the units order oscilloscope 348u (Fig. 17b), the horizontal trace of its beam is determined by 23u—26u and the vertical trace of its beam is governed by 23j—26j (Fig. 17a). A circuit extends from point 6j of oscillator 23j—26j through condenser 441, to resistance 442. With this circuit arrangement, the voltage appearing across resistor 442 is similar to that of point 6j and consequently is of saw-tooth character. This voltage on 442 is effective, via line 443 (see also Fig. 17b), to control the vertical deflection plates of oscilloscope 348u (Fig. 17b) and also (Fig. 17c) of oscilloscopes 348t and 348hn.

Referring to Fig. 17b, point 6u of oscillator 23u—26u is connected through condenser 444u to resistance 445u. With this circuit arrangement, the voltage appearing on resistor 445u is similar to that of point 6u and consequently has the frequency and phase of 23u—26u. This voltage appearing on 445u is effective, via line 348ua, to control the horizontal deflection plates of oscilloscope 348u only. Oscilloscope 348u, therefore, has impressed thereon the particular repeated electronic emission pattern, characteristic of the summation of the digits entered in the units order, and a visible reproduction of this characteristic pattern is produced repeatedly by 348u. By supplying the two sets of deflection plates of the 348u oscilloscope with voltages from the respective sources mentioned, the particular phase relationship of 23u—26u, i. e., the digit standing therein, is indicated by the screen height at which there is a horizontal fly-back of the beam, as in Figs. 8c, 8d and 8e. In accordance with the description given in Section 15, only a small portion of the beam is visible at any time, since a mask 355, with perforations (Figs. 14 and 15), is employed. As described in Sections 15 and 18, a set of ten holes is arranged along a vertical center line of the screen of the 348u tube.

By adjustment of the horizontal centering control, that portion of the beam, as it approaches and starts a fly-back condition, is centrally located. By adjusting the vertical centering control, only one-half of the vertical beam trace is caused to appear on the screen. With this arrangement, therefore, that particular one of the ten holes which is illuminated by the beam measures the phase position of the digit manifesting oscillator and produces a visible indication of the particular digit standing in the units order. Thus, with a –2– standing in the units order at the termination of adding operations, the –2– hole, 446 (Fig. 14), is illuminated.

From the foregoing description, it is readily seen that 23t—26t (Fig. 17c) controls the horizontal deflection plates of oscilloscope 348t (Fig. 17c) and determines which of ten holes pertaining to the tens order is illuminated. Likewise, it will be readily understood that 23hn—26hn (Fig. 17c) controls the horizontal deflection plates of oscilloscope 348hn (Fig. 17c) and, therefore, determines which of the particular one of the ten holes pertaining to the hundreds, order, is illuminated, to thereby indicate the particular hundreds order digit.

Since a digit –2– is in the tens order and a –6– is in the hundreds order, the –0– hole, 447 (Fig. 14), and the –6– hole, 448, in the tens and hundreds orders, respectively, are illuminated in the same manner as the –2– hole, in the units order, as described above. By observation of the oscilloscopes 348hn, 348t and 348u, therefore, the operator determines that a multidenominational sum of –602– stands in the accumulator.

22. *Synchronizing*

The synchronization of the intermediate, pulsing, and digit manifesting oscillators is carried out in the manner set forth in Section 14 and it is not believed necessary therefore to repeat such description in connection with similar circuit portions of the key controlled machine. It should be mentioned, however, that each of the oscillators generating "Entry" pulses at the even numbered index point positions, such as oscillators 23e2—26e2, 23e4—26e4, etc. (Fig. 17d) are synchronized, via line 306 (see also Fig. 17a), by means of 23g—26g (Fig. 17a) as is also 23j—26j, which discharges at "D." The oscillators producing "Entry" pulses at the odd index point positions, such as oscillators 23e1—26e1, 23e3—26e3, etc. (Fig. 17d), are synchronized, via line 308 (see also Fig. 17a), by 23i—26i (Fig. 17a). In Section 14 is set forth the manner in which a digit manifesting oscillator is directly synchronized by 23m—26m. Wire 310 (Figs. 17a, 17b and 17c) provides synchronizing pulses for all three of the digit manifesting oscillators employed in this embodiment. The manner in which all oscillators are synchronized with regard to frequency and phase is described in detail in Section 14.

23. *Resetting—key controlled machine*

The principles of resetting which are explained in detail in Section 16 and are there applied to a single accumulator order are applicable to the key controlled machine for zeroizing a plurality of orders, i. e., for shifting one or a plurality of digit manifesting oscillators which stand at other than a "0" phase, to "0" phase, prior to the entry of succeeding amounts. Oscillators which are at "0" when the accumulator is reset, remain in such phase unaffected by reset controlling pulses. To initiate a zeroizing operation, the operator manipulates a single button which controls a number of switches. All orders at other than "0" receive successive entries of unit increments until each digit manifesting element of the respective orders attains "0." Eight increments are required to step along an order standing at "2," to "0," while only four increments are necessary for stepping along an order standing at "6," to "0." Each order of the accumulator is reset independently of the others and only those which stand at the same digit, reach "0" concurrently. Carry operations are suspended during resetting, as explained in Section 16.

Also as described in detail in Section 16, resetting is performed, briefly as follows. A resetting increment is applied to an entry control device at the "0" time to ignite its associated gas triode thereby causing its related digit manifesting oscillator to function at double normal rate. This action continues for only one index point position, since at "11" the gas discharge tube is shut off and the oscillator thereupon operates at normal frequency. The result of adding the increment, steps along or advances the oscillator phase by one increment or -1- and these advancements occur in succeeding cycles until the oscillator is at "0." When at "0" the oscillator, itself, as explained previously, prevents further resetting increments from being effective to initiate an operation of the entry control device. The foregoing general description applies to all orders of an accumulator.

Specifically, in the key controlled machine, in order to bring about a zeroizing operation, the operator manipulates the tumble switch arm 449 (Fig. 14), which throws switches 8 and 11 (Fig. 17a), and 9 (Fig. 17d), to a reverse position from that shown. With switch 11 (Fig. 17a) shifted to its other contact, resistor 231 is placed in parallel with resistor 96 and therefore receives a "0" negative pulse, which is inverted, via line 231a (see also Fig. 17d), by tube 232b (Fig. 17d) to a pulse of positive polarity appearing on resistor 235, as described in Section 16. The positive potential on resistor 235 is effective, via wire 450 (see also Figs. 17a, 17b and 17c), to raise the grid voltages of tubes 125bu (Fig. 17b), 125bt (Fig. 17c) and 125bhn. Accordingly, gas triodes 55u (Fig. 17b), 55t (Fig. 17c) and 55hn are ignited and their related digit manifesting oscillators begin to operate at a doubled rate.

With switch 9 (Fig. 17d) in such reverse position, an "11" positive pulse now appears on resistor 44, via line 220a (see also Fig. 17a), and switch 8 reversed, as set forth in Section 16 and this pulse is effective, via line 44b (see also Figs. 17b and 17c), to extinguish each of the above mentioned gas triodes by means of the usual shutting off circuits. In connection with resetting the accumulator when it contains the total amount -602-, the foregoing operation will advance, in one cycle, the units oscillator from "2" to "3" and the hundreds oscillator from "6" to "7." Since the tens oscillator stands at "0," it remains in such status. When a total of four resetting increments have been entered in the hundreds order, there is no further phase shifting of its digit oscillator, i. e., it remains at "0," as follows: The "0" positive pulse on resistor 235 (Fig. 17d) is also effective, via line 454 (see also Figs. 17a, 17b and 17c), to increase the screen voltage of tubes 39bu (Fig. 17b), 39bt (Fig. 17c) and 39bhn but, as described in Section 16, such screen voltage rise does not increase current flow through any of these tubes unless there is a concurrent negative bias reduction. When 23hn— 26hn reaches "0," a negative pulse appears on resistor 138hn at this time, and is inverted to a positive pulse on resistor 132hn, by tube 139bhn, as is now understood. This potential opposes battery 133hn and reduces the negative bias of tube 39bhn concurrently with a screen voltage rise. The resulting increased current flow therethrough reduces the potential of point 45hn so that gas triode 55hn cannot become ignited upon further "0" pulses being applied to the grid of tube 125bhn, as set forth in detail in Section 16. Consequently, 23hn—26hn thereafter remains at "0" irrespective of how long the resetting switch arm 449 (Fig. 14) is maintained in reset position. It is now apparent why 23t—26t remained unaffected by resetting increments and it will be also understood that following the application of eight resetting increments, in the units order, its oscillator reaches "0" and remains in such status. With switch 9 (Fig. 17d) in reverse position, resistor 158 receives no pulses at "11" and thus carry operations are suspended during resetting.

24. General—record controlled machine

The third embodiment of the electronic accumulator of this invention utilizes a device comprising a record controlled machine. The record medium comprises a film upon which multidenominational amounts, which are to be either concurrently added or subtracted, are recorded by means of code designations such as spots located at differential positions.

It is to be particularly noted that in this embodiment, instead of utilizing a manually set oscillator as in the manually controlled embodiment in order to produce a "timed" impulse indicative of the digit to be entered in any order, or instead of utilizing a key controlled device, as in the key controlled embodiment, when it is desired to select a certain oscillator to in turn produce a "timed" impulse indicative of the digit to be entered in any order, the present embodiment utilizes spots located in differential positions to control photo-electric cells in an electrical circuit whereby a "timed" electrical impulse is produced, comprising a manifestation indicative of the respective digit to be entered in any desired order. After production of the "timed" impulse, the operation of all three embodiments is fundamentally the same.

The film, upon which the differential spots are located is controlled by a feeding mechanism whose operation is manually initiated but is automatically terminated. This mechanism includes two analyzing stations separated by a distance equal to the length of one film frame. At the first analyzing station past which the film is traversed, the character of the operation to be performed by the accumulator is determined; that is to say, the machine is apprised by this first analyzing station whether the data is to be added or subtracted. Groups of film data are separated by blank film frames and the first analyzing station also determines whether or not data is present. When a blank film frame is determined, feeding operations are suspended, so that a total may be taken. The second analyzing station is employed for the purpose of entering into the accumulator the data which appear on the film frames. When film feeding operations are suspended, thereby indicating the end of a group of data, the machine operator manually initiates a total recording operation. Cathode ray oscilloscopes, one of which is provided for and controlled by the digit manifesting device of each order of the accumulator, produce on their respective screens visible manifestations of the digits which may be photographed to thereby record upon photographic film the total of the amounts entered into the accumulator. In addition, the machine is provided with a test oscilloscope so that the proper phase relationships and frequencies may be established for the various pulsing and synchronizing oscillators prior to operating the machine. At the conclusion of a total recording operation, the operator manipulates a switch which resets all orders to zero. By a further manual operation, automatic feeding operations of the film are started again and successive film frames of the following group are thereupon automatically analyzed and entry operations continue until another blank film frame is determined and feeding of the film thereupon stops.

25. Structure—record controlled machine

Referring to Fig. 22, it can be seen that the machine has a base, a cabinet 470 whose top 471 supports the three separate units comprising the record controlled machine, while within the cabinet 470 are located the electronic tubes and circuits of the electronic accumulator.

Mounted on cabinet top 471, at the left hand side thereof as viewed in Fig. 22 is the film feeding and analyzing unit. In the center is mounted the test oscilloscope and to the extreme right, the total recording, photographic unit. These three units are illustrated in plan view in Fig. 21. Plug sockets are provided in plugboard P. B. (Fig. 22) located in the front of cabinet 470, so that circuits of the accumulator may be selectively coordinated, as will be described in detail later.

The record feeding and analyzing unit, as illustrated in detail in Figs. 23 and 24, is mounted on a base 472 fastened to the top 471 of cabinet 470. A casing 473 having a hinged door 474 (Figs. 21 and 22) mounted therein, encloses the record feeding unit. As shown, the entire mechanism, with the exception of motor 475 is mounted on a plate 476 (Figs. 23 and 24).

Gear 477, on the drive shaft 478 of motor 475 (Figs. 23 and 24) engages idler gear 479 meshing with gear 480 (Fig. 23) fastened to shaft 481, journaled in plate 476. A portion of shaft 481, carrying gear 482, extends through plate 476.

Gear 480, meshing with idler gear 485 (Fig. 23) drives, at a 1 to 1 ratio, a gear 483 fastened to shaft 484, journaled in plate 476 and having mounted thereon for rotation therewith, a gear 486.

Gear 483 meshing with idler gear 489 drives at a 1 to 1 ratio a gear 487 mounted on shaft 488 journaled in plate 476 and carrying gear 490. Gears 482, 486 and 490 corresponding to gear 24 of the U. S. Patent No. 2,150,227 to Lake and Pfaff are provided with an equal number of teeth and are driven clockwise, at the same speed, by means of motor 475. In contrast to the rotation of gear 24 of said patent, however, which gear 24 rotates one revolution per machine cycle, gears 482, 486 and 490 rotate at such a rate as to drive associated clutch mechanism merely one-tenth of a revolution per machine cycle, for a purpose which will be set out later. Associated with each of these gears is a clutch mechanism substantially similar to the clutch described in said patent.

Referring to Figs. 24 and 25, the elements of the uppermost clutch are shown as mounted on a stud 491 fastened to plate 476. The continually rotating parts of the clutch comprise a gear 492 and a ten tooth ratchet 493 (Figs. 24 and 25), gear 492 meshing with gear 490. Gear 492 and ratchet 493 together comprise an assembly unit supported by ball bearing 493a carried by stud 491. A ratchet 494, a lever 494a, a lever extension 494b and a detent disk 495 are constructed as disclosed in said patent. Since the operation of the clutch is described in detail in the patent, it is deemed sufficient to state here, that when magnets 496 (Fig. 23) are energized, lever 494a disengages 494b (Fig. 24) from ratchet 494 (Figs. 24 and 25) which is released so that detent disk 495 is clutched in and rotates in unison with ratchet 493. Ratchet 494 is engaged by extension 494a to declutch 495 upon deenergization of magnets 496 (Fig. 23) a spring 497, being provided in the instant device, to return the armature of the magnet to its non-attracted position.

Referring to Figs. 23, 24 and 25, a sleeve 498 is fastened to detent disk 495, ratchet 494 being loosely mounted on said sleeve. Film sprockets 500 are also fastened to the sleeve 498 and this sleeve is supported on ball bearings 501 and 502 which are mounted on the stud 491, the spring clip 503 holding the sleeve assembly on the stud. The diameter of the film sprockets 500 is such that when they move one-tenth of a revolution, the film is advanced a distance of one frame or an amount equal to twenty index point positions. It will be recalled that there are ten teeth on the clutch ratchet 493 and hence a movement of one tooth of the ratchet causes the film to be advanced one frame length or twenty index points during one machine cycle.

Referring particularly to Fig. 23, the film 521 is held on a supply reel 504 which is loosely mounted on stud 505 fastened to the plate 476. From the supply reel, the film is fed under the guide roller 506 over the sprockets 500, and under the guide roller 507. After leaving guide roller 507, the film is formed into a loop before it is fed down through the film gate comprising the two plates 508 and 509. Upon leaving the film gate, which is described in detail subsequently, the film is carried under the sprockets 510 and over a guide roller 511. A loop is now formed in the film before it is fed under guide roller 512 around sprockets 513 and over guide roller 514 to the take-up roll 515 mounted on shaft 516. This shaft 516 and roll 515 are constantly urged in a counterclockwise direction by a coil spring belt 517 stretched between pulley 518 and a pulley 519 mounted on shaft 516. Pulley 518 is fastened to a shaft 520, carrying gear 485 and journaled in plate 476.

Two additional clutch mechanisms similar to the one described above are employed for controlling rotation of sprockets 510 and 513, respectively. These three clutches operate in unison and three are utilized instead of one in order to reduce the shock on any one clutch and reduce starting retardation to thus gain greater operating speed. The uppermost clutch controls sprockets 500 which pull the film off from the supply reel 504. The center clutch controls the sprockets 510 which advance the film down through the film gate and the lowermost clutch controls the sprockets 513 which feed the film to the take-up spool 515.

Since a film is employed as the record medium, the differentially disposed spots thereon which represent amounts are analyzed or sensed by photoelectric cells. Light from a light source is conveyed to the upper and lower sensing stations and upon the traverse of the film past these stations, the light intensity is modified by the indicia spots. Such light intensity modifications affect the photoelectric cells of which there are two groups, one group being located at the upper sensing station and the second group at the lower sensing station. It will be understood that there are as many photocells in each of the two groups as there are columns to be analyzed. Referring to Figs. 23 and 24, an elongated tubular light source 522 is held in socket 523 fastened to plate 476. At the left of the light source as viewed in Fig. 23 is a block of molded material 524 which is provided with two rod-shaped projections 525 and 526 which serve to space the main portion of the block 524 away from plate 476 as is seen in Fig. 24. Screws 527 passing through the plate 476 and into the ends of the projections 525 and 526 serve to hold the block in position. A plate 508 is fastened to the left end of block 524 and has formed therein a suitable channel in which the film 521 slides. Two pieces of quartz 528 and 529 are molded into the block 524 and conduct light from the source 522 to the upper and lower film sensing stations designated as 530 and 531, respectively. The function of each piece of quartz is to conduct and form a line of light across the film at each sensing station. A U-shaped member 598 fastened to the right end of block 524 serves as a reflector and lamp guard for the light source.

Another block of molded material 532, located at the left of the sensing stations, is supported by the plate 476 in a manner similar to the support of block 524. A plurality of quartz rods 533 (Fig. 24), one for each column, conduct light, which passes through the film at the upper sensing station, to the photoelectric cells 534. Similarly arranged quartz rods 535 (Fig. 23) conduct light, which passes through the film at the lower sensing station, to the photoelectric cells 536. With this arrangement and with regard to a particular sensing station, all columns of the film are commonly supplied from the light source and thereafter the light conducting rods individual to each column transmit any light, which passes through the film in a given column, to the photoelectric cell.

Plate 509 (Fig. 23) has a rectangular opening in it, to enable it to fit around the right-hand portion of block 532. Brackets 537, one attached adjacent each edge of the plate 509, support pivot pins 538 to which are pivoted levers 539, one on each side of block 532. These levers are fastened to the shaft 540 which is journaled in block 532 and one of the levers 539 has an extension 541 which serves as a handle and to which is attached a spring 542, which acts through the elements described to urge the plate 509 against the film to hold it in the channel formed in plate 508.

As will be set forth more in detail subsequently and for purposes of effecting circuit adjustments upon starting up the machine, a self-contained test oscilloscope unit 5 is mounted in the center of the record controlled machine as shown in Figs. 21 and 22. Located at the bottom of this unit are start key contacts 451 (Fig. 22) and stop key contacts 452.

It has been previously stated that recording of totals of groups of data is effected upon a record film. If desired, however, the total of data may be visually ascertained. At the right of the machine, as viewed in Figs. 21 and 22, is located the total indicating and total recording unit. The mechanism of this unit is supported by the side frames 543 and 544 which are fastened to top 471 of cabinet 470. On cross member 545 (Fig. 21) extending between the two side frames 543 and 544 are mounted sockets 546 supporting cathode ray tubes 348u, 348t and 348hn (see also Figs. 30b and 30c), on tube for each order of the accumulator. A sheet metal housing 548 (shown as cut away in Fig. 21) encloses the cathode ray tubes except for the screen ends of the tubes which project through the funnel-shaped portion 549 of housing 548. A mask 550 covers the screens of the cathode ray tubes and this mask has groups of perforations arranged, respectively, similarly as described in Section 21, and as indicated, generally, in Fig. 14.

The total data as manifested by the cathode ray tubes is photographed by a camera which is located in a casing 551, held on a bracket 552, pivoted to each side frame. In its lowered position, extensions of the brackets 552 abut ends of adjusting screws 553 (Fig. 28). A light-proof funnel 599 extends from the camera to the funnel portion 549 of housing 548, in order to exclude external light from the screens and mask of the cathode ray tubes, and is supported by a bracket 597 extending across bracket 552. The complete assembly, mounted on the bracket may be swung to an upper position, carrying the camera and funnel 599 with it, in order to permit observation of the total data, visibly indicated by the cathode ray tubes. When in this latter position, lugs 552a on the bracket 552 abut studs 600 while this movement of 552 allows contacts 675 (see later) to open, so that the camera film feed circuit is deenergized.

With regard to the recording camera, it is seen from Fig. 21 that three lenses 554 are held in the lens housing 555 and thus there is provided one camera lens for each cathode ray tube. Each of the lenses 554 is so designed that there is a non-inversion of the position of an illuminated spot when it is photographed on the film. The lenses are so arranged that the total data, which is spaced relatively widely between columns, by virtue of the cathode ray tubes, may be photographed upon the film with normal columnar separation, that is, each lens produces its own image and the images are positioned on the film one normal column apart.

Referring now to Fig. 28, the camera mechanism is held on the plate 556 and the cover 551 fits inside of the formed edges of plate 556 and is held in proximity thereto by the thumb screws 557. The sheet metal piece 558 cooperating with cover 551 acts to form a light-proof seal between the cover 551 and plate 556.

Referring to Figs. 26, 27 and 28, a plate 559 carrying most of the camera mechanism is fastened to plate 556. The unexposed part of camera film 499 is held on a spool 560 which is slipped over the stud 561 riveted in plate 559. From the spool, the film is fed over the stud 562 and down through a film gate, a top view of which is shown in Fig. 29. This gate comprises an apertured plate 563 (see also Figs. 26 and 28) fastened to plate 559 and having a channel in it to receive the film 499. Another plate 564, which is urged by a flat spring 565 towards plate 563, holds the film in the channel of plate 563. An opening in the end of spring 565 permits it to be slipped over pin 566 (Fig. 29) which is riveted in the plate 564 and thereby locates the plate vertically (see also Fig. 29). A formed member 567 (see also Fig. 28) serves as a handle to pull the plate 564 away from plate 563 to permit threading of film. Upon emerging from the film gate, the film passes over stud 568 to a wind-up spool 569 fastened to shaft 570. A pivoted lever 571 (Fig. 28) has one end thereof spring urged against the film on the spool 560. When the supply of film is nearly exhausted, bracket 572 is arranged to drop off the curved portion of pivoted lever 571 thus allowing contacts 573 to close, which closure serves to stop the machine so that the supply of unexposed film may be replenished.

All columns of a total amount are concurrently photographed on an unexposed camera film frame located in the film gate. At the conclusion of a total photographing operation, the film is advanced through the gate an amount equal to one frame, by mechanism now described.

Referring to Figs. 26 and 27, a solenoid 574 becomes energized when the operator manipulates the total toggle 453 (Fig. 22). Upon its energization, solenoid 574 causes plunger 575 to move upwardly thus carrying rack 576 along with it, against the action of spring 577. Pinion 578 meshes with teeth on rack 576 and upward movement of this rack will cause an 180 degree counterclockwise rotation of shaft 579 (as viewed in Fig. 27) to which shaft pinion 578 is fastened. Shaft 579 (see also Fig. 26) is journaled in the plate 559 and carries at its left end a downwardly extending arm 580 (Figs. 26 and 28) in which is riveted pin 581. A slide 582 (Fig. 28) is mounted for vertical reciprocation on the left side of plate 559, as viewed in Fig. 26. A spring 583 (Fig. 28) normally holds slide 582 against a stop 584 and a foot-like portion 585 of slide 582 extends over the pin 581. It can be seen, therefore, that an 180 degree counterclockwise rotation of shaft 579 causes pin 581 to carry the foot 585 and hence slide 582 upwardly. Upon its upward travel, foot 585 (Fig. 28) abuts arm 585a to raise the same. The elevation of arm 585a releases the camera shutter thus permitting the camera to record the total data appearing on the oscilloscopes. A hub 586 (see also Fig. 26) fastened to slide 582 extends through a slot in plate 559 and serves as a bearing for a shaft 587 which (as viewed in Fig. 26) carries on its left end the claw 588 (Fig. 28) and on its right end the arm 589 (Fig. 27).

Shaft 579 also has fastened thereto, a pulley 590 (Fig. 26) to the side of which is fastened a friction disk 591. Loosely mounted on shaft 579 is a friction disk 592 and a plate 593 which is spring urged against the disk 592. A pivot link 594 (Fig. 27) connects the plate 593 with the arm 589, fastened to shaft 587. By reference to Figs. 27 and 28, it is apparent that a counterclockwise rotation of shaft 579 causes plate 593 to rotate in a similar direction in view of the frictional force exerted on plate 593 through the friction disks 591 and 592. This rotation, through link 594 and arm 589 causes shaft 587 to be rotated in a counterclockwise direction and thus to swing the claw 588 (Fig. 28) away from the film. Claw 588 is limited in its travel between studs 595 and 596 on slide 582. Hence, on the upstroke of the rack 576, the claw is rotated and held against stud 596 thus clearing the sprocket holes in the film. After the total data has been photographed onto the camera film, the film is advanced one frame length through the gate. Such film feeding is effected upon the downstroke of rack 576 when solenoid 574 is deenergized. Shaft 579 thereupon turns in a clockwise direction and returns to its starting position, thus allowing slide 582 to descend under the action of spring 583. Upon the downstroke, claw 588 is urged into engagement with a sprocket hole in the film and thus advances the film a distance equal to the claw travel, namely, one frame length.

A coil spring belt 601 (Figs. 26 and 27) is stretched between pulley 590, which as stated, is fastened to shaft 579, and pulley 602 fastened to the wind-up shaft 570. The periphery of pulley 602 is provided with very fine ratchet teeth which are engaged by the spring urged and pivoted detent 603. This detent allows counterclockwise rotation of pulley 602 but prevents clockwise rotation and thus upon the upstroke of rack 576, belt 601 slips. On the downstroke of rack 576, however, belt 601 is effective to rotate shaft 570 in a counterclockwise direction, thus rotating the wind-up spool 569 to wind up the film.

Having described the mechanical details of the record controlled machine, the electrical circuits may now be discussed in detail for a series of entries. The wiring diagram of this machine is incorporated in Figs. 30a to 30f, inclusive, grouped as indicated in Fig. 30 and elements which correspond in character and function to the circuit elements shown in Figs. 1a to 1d, inclusive, and Figs. 17a to 17f, inclusive, are given the same reference characters. As in the last mentioned group of figures, the suffixes "u," "t," and "hn" differentiate between the units, tens, and hundreds orders of the accumulator.

26. Operation—record controlled machine

With switch 7 (Figs. 22 and 30a) closed, power of the polarity indicated is supplied to lines 1 and 2, and by means of connectors or switches 3a, 3b, 3c and test oscilloscope 5 (Fig. 30b), the phases and the frequencies of the intermediate, pulsing and digit manifesting oscillators are initially established, as described in Sections 4 and 19. It is assumed that the digit manifesting oscillators for each of the three orders of the accumulator are initially adjusted to "0" and also, that the sockets of plugboard P. B. (Fig. 22) are connected as shown. Having made the foregoing adjustments, switch 610 (see also Fig. 30d) is closed providing power supply from amplifier 611 to the driving motor 475 by means of circuits described subsequently. With the motor 475 in operation, the various continually operated mechanisms of the record handling and sensing device function as described in Section 25. The operator then threads the data index bearing film into operative position in the feeding and sensing unit, as is also described in Section 25 and preferably the leading edge of the first data bearing frame is located so that it is about to pass the upper sensing station 530 (Fig. 23). It has been previously mentioned that film feeding is manually initiated and it should be understood that thereafter it is fed automatically past the sensing stations, frame by frame, at a uniform rate until a blank frame is detected at the upper sensing station. This indicates the end of a group of data and causes suspension of further feeding operations, as will be later described in detail.

Referring to Figs. 22 and 30d, the operator actuates the start key 451 to thereby shift its contacts to a reverse position from that shown. A condenser 612, which is previously charged to the potential of point 613, as determined by a voltage divider consisting of resistors 614 and

615, now discharges in the local circuit comprising condenser 612 and resistor 616. The potential along resistor 616 is positive with respect to line 2 and therefore reduces the negative grid bias of gas triode 617 sufficiently so that it is ignited. Gas triode 617 is interposed in an impedance network which has two branches; the first branch comprises resistor 618 and pentode 619 in series between lines 1 and 2, and the second comprises resistors 620 and 621 in series between lines 1 and 2. This impedance network is similar to those which have been previously described and, as is now understood, with gas triode 617 ignited, point 622 of the second impedance branch rises to a high potential and such rise is indicated at 623 in Fig. 31–a. Point 622 is connected, via line 622a, to the screen grid of pentode 624 and accordingly, with point 622 at a high potential, the screen voltage of tube 624 is raised. Further, as described in Section 11, resistor 211 (Fig. 30d) has a positive pulse appearing on it at "12." This positive potential is effective, via line 211b, to raise the control grid voltage of pentode 624 and in view of its raised screen voltage, as described above, the resultant increase of current flow therethrough raises point 625 sufficiently to effect ignition of gas triode 626. Gas discharge tube 626 is also interposed in an impedance network which has two branches: the first branch comprises resistor 627 and tube 628b in series between lines 1 and 2 and the second comprises resistors 629 and 630 in series between lines 1 and 2.

With gas discharge tube 626 ignited, the film feed clutch magnets 496, in series therewith, become energized (Figs. 23 and 24) raising levers 494a and releasing lever extensions 494b from ratchets 494, to release 494, whereby detent disks 495 are clutched in and rotate in unison with ratchets 493. Since detent disks 495 are fastened respectively to sleeve 498, sprockets 500, 510 and 513 begin to rotate at "D" of the succeeding cycle, it being recalled that the clutch driving elements 492 rotate only one-tenth of a revolution per machine cycle. The energization of clutch magnet 496 at "12" is indicated at 631 in Fig. 31–b. Upon rotation of the sprockets, the first data bearing film frame starts to pass the upper sensing station (Fig. 23) at "D."

Since the clutch magnets 496 (Figs. 23 and 24) are energized and film feeding is taking place, the gas triode 617 (Fig. 30d) may now be extinguished. This shutoff is controlled by the impedance network in which the clutch magnets are located. Since gas triode 626 is conducting, point 609 is at high potential. The screen grid of pentode 619 being connected to point 609 is therefore at a raised potential so that any negative control grid bias reduction of 619 increases current flow therethrough. As explained in Section 11, a "9" pulse is produced on resistor 235, and early in the cycle in which film feeding starts, this pulse, via line 235b, opposes battery 608, reduces the negative control grid bias of 619 and produces a resultant increased current flow therethrough and a voltage drop across resistor 618, which is sufficient to extinguish gas triode 617. The accompanying return of point 622 to its normal voltage is indicated at 607 in Fig. 31–a. By the foregoing arrangement of two impedance networks, the second of which includes the film feed clutch magnets, it is seen that the first network may be called into action by the operator's depression of the start key at any time in a cycle. When in action, it conditions the second network so that it may function commencing at a definite time in a cycle, thus assuring that film feeding operations start at a definite cyclic time. It is not until the second network is functioning, however, that the first network is returned to a non-conditioning status, such return being controlled by the second network.

For the purposes of illustration, assume that the first frame contains an amount of –749– and that this amount is to be added into the accumulator. Such first frame appears in Fig. 24 on film 521, at a point removed from the upper sensing station, to indicate clearly the manner in which recorded data appears on the film, this data being generally designated by 632.

Referring to Figs. 30e and 30d, a plug connection, as indicated by the dashed line, is made between the hundreds order socket of the sockets 633 (Fig. 30e) and socket 634 (Fig. 30d) which places resistance 635 (Fig. 30d) in circuit with the hundreds order photocell of photocells 534 (Fig. 30e), at the upper sensing station, and its associated battery. With the first frame advancing past the upper sensing station, a maximum light intensity is permitted by the film to fall upon the photoelectric cell 534 until "7." Up to this time and in fact at any time when no indicia spot is present, there is an increased current flow through cell 534 and a higher of two voltage drops exists across resistor 635. Point 636 of this resistor is connected via line 637, (Figs. 30d and 30e) and line 637a (Figs. 30e and 30b) to point 638 (Fig. 30b) in the voltage divider consisting of resistors 639 and 640 in series between lines 1 and 2. Point 638 is selected with respect to line 2 so that the flow produced by the battery in series with photocell 534 (Fig. 30e) produces a potential at point 641 on resistor 635 (Fig. 30d) equal to the potential of line 2. It is therefore apparent that whenever there is a decrease in the intensity of the light falling upon the photocell 534, there is an accompanying decrease in current flow through resistor 635 and consequently point 641 will rise in potential with respect to line 2.

Since the hundreds order of the first frame bears the digit –7– the aforementioned rise in potential of point 641 occurs at "7." This voltage rise reduces the negative grid bias of gas triode 642 (Fig. 30d) sufficiently to cause its ignition. This gas triode is interposed in an impedance network which has two branches: the first branch comprises resistor 643 and tube 628a in series between lines 1 and 2 and the second comprises resistors 644 and 645 likewise in series between lines 1 and 2. This impedance network is also similar to those which have been previously described and, as is now understood, with gas triode 642 ignited, point 646 of the first impedance branch drops to the lower of two possible potentials. The screen grid of tube 628b is connected, as shown, to point 646 and accordingly, with tube 642 fired, the screen voltage of 628b is low and therefore any negative grid bias reduction is ineffective to produce increased current flow therethrough. The fall in potential of point 646 is indicated at 647, in the second accumulator cycle, in Fig. 31–c.

As described in Section 11, a positive pulse appears on resistor 220 (Fig. 30d) at "11" and this pulse via line 648a opposes battery 648 reducing the negative grid bias of tube 628b. Since the screen voltage of this tube is at a low value, there is no increase of current flow therethrough and point 649 does not drop in potential with respect to line 2. Accordingly, when this "11" pulse occurs, gas triode 626 is not extinguished and therefore the feed clutch magnets 496 remain energized. This can be seen by reference to point 650 in the second cycle of Fig. 31–b which indicates by its increased potential that the clutch magnets are not deenergized. The foregoing indicates how each film frame is analyzed to ascertain the presence or absence of significant data therein and illustrates just how the presence of data in the form of a spot on the film serves to prevent the film feed clutches from being deenergized. While the index marks representing an amount recorded on the film have been described as cooperating with the sensing means at the upper station to maintain film feed and means for testing the hundreds order of each frame have been specifically described, it is deemed obvious that any order of a field may be tested by any sensing means controlled by light intensity variations or that special index marks may be provided to control the film feed. The circuits above described maintain clutches 496 energized, as long as film frames bearing data are presented to the upper sensing station. The manner in which these circuits effect deenergization of the clutch magnets will be subsequently described.

As described in Section 20, a positive pulse is produced on resistor 67x at "D." In this embodiment this potential, via line 651a, opposes battery 651 (Fig. 30d) reducing the negative grid bias of tube 628a, increasing current flow therethrough and causing point 646 to drop in potential sufficiently to extinguish gas triode 642. Substantially instantaneously with removal of the "D" pulse, point 646 rises to its normal potential, and this is indicated at 652 in Fig. 31–c. During the cycle just described, the first film frame is completely advanced through the upper sensing station to a position where its leading edge is about to traverse the lower sensing station 531 (Fig. 23). As a result of passing the upper sensing station, the presence of some significant data is ascertained, the feed clutches are maintained energized and film feeding continues.

At "7" in the succeeding cycle, the –7– spot in the hundreds order interrupts the light falling upon the hundreds order, lower sensing station photocell 536 (Figs. 23 and 30c) and point 641hn along resistor 635hn rises in potential, with respect to line 2, effecting an increase in grid voltage of tube 42ahn, thus causing ignition of the gas triode 55hn of the hundreds order entry control device in a manner now well understood. Thereupon, 23hn—26hn commences to operate at double its normal rate as indicated at 653 in the third cycle of Fig. 33–c. In a similar manner, the units order photocell 536 (Fig. 30b) and the tens order photocell 536 (Fig. 30c) effect a rise in potential of points 641u (Fig. 30b) and 641t (Fig. 30c) thereby causing ignition of gas triodes 55u (Fig. 30b) and 55t (Fig. 30c) at "9" and "4," respectively. Accordingly, 23u–26u and 23t–26t begin to function at a doubled rate at these times and this is indicated at points 654 and 655 in Figs. 33–a and 33–b, respectively. As described in Section 20, all of these digit manifesting oscillators resume operation at their normal frequency at "0" and the entry of the amount of –749– is accomplished.

During this cycle in which –749– is entered into the accumulator, the second film frame, generally designated as 656 in Fig. 24, passes the upper sensing station. This frame contains the amount of –356– which amount in this case is to be subtracted. Since the digit –3– is in the hundreds order, the light falling on the hundreds order photocell 534 (Fig. 30e) is decreased at this time and point 641 (Fig. 30d) rises in potential, again effecting ignition of gas triode 642, in the manner described previously in this section. Consequently, when there is a grid bias reduction of tube 628b at "11" in this cycle, its previously lowered screen voltage renders this bias reduction ineffective so that point 649 is not reduced in potential and the feed clutch magnets 496 remain energized, as indicated by point 657 in the third cycle in Fig. 31–b.

One column of each film frame is allocated for a possible control spot whose presence therein indicates that subtraction of data in the frame is to be effected. Such control spot did not appear in the first film frame and therefore the data was added. Referring to Fig. 24, the second film frame 656 does bear this special control spot which is located at the "11" index position as indicated at 658. The photocell 534 at the bottom (Fig. 30e) which in the instant illustration analyzes the column designated as the control column of each frame, is plug connected between socket 633 and socket 659, as indicated by the dashed line in Fig. 30e. As the second film frame traverses the upper sensing station, the light intensity falling on the bottom photocell 534 is reduced by this special control spot, at "11," and point 641s, on resistor 655s, rises in potential with respect to line 2, and increases the bias of and effects ignition of gas triode 189. This discharge tube is in the first impedance network of the subtraction control device, as described in detail in Sections 10 and 11.

The ignition of tube 189 raises the potential of point 198, which is indicated at 659 in Fig. 32–a, and such sustained potential rise, subsequently, at "½ after D," when the negative grid potential of pentode 199 is reduced, brings about ignition of gas triode 207, in the second impedance network of the subtraction control device. The attendant rise in voltage of point 212 of voltage dividers 204, 205, 206, 224 is indicated at 660 in Fig. 32–b. The operation of and the circuits controlled by the subtraction control device, with the resultant subtractive entry of –356– into the accumulator, is as described in detail in Section 11. It is sufficient to state that in the following cycle when the second film frame traverses the lower sensing station, all of the digit manifesting oscillators commence to operate at "9," at a doubled rate, and this action is indicated at points 661, 662 and 663 in Figs. 33–a, 33–b, and 33–c, respectively. In a manner which is now understood, at "6," "5," and "3," respectively, the units, tens and hundreds oscillators, respectively, resume operation at their normal frequencies, as indicated at 661a, 662a and 663a in Figs. 33–a, 33–b, and 33–c, respectively. Entry of the elusive one, also under control of the subtraction control device, into the units order is indicated as beginning at 664 in Fig. 33–a. Since the carry determining device of the units order, functions in accordance with the rules for carry, as explained in Sections 12 and 20, a carry increment in the present problem must necessarily be added, via line 431u (Figs. 30e, 30f and 30c) into the tens order at "11," and this action is indicated at point 665 in Fig. 33–b.

From the foregoing, it is seen that at the upper sensing station the character of the data in a film frame is ascertained. If the data is to be added, the subtraction control device is not affected but if data is to be subtracted, the first impedance network of the subtracting device is placed in a conditioning status. Early in the succeeding cycle, the second network is called into action by the first network and the second network controls subtraction of the amount being sensed at the lower sensing station and also controls entry of the elusive one, as is now understood. As explained in Section 11, the first network is returned to a non-conditioning status by a subtracted digit. Referring to Fig. 30b, the units order socket 671 is connected to socket 672, as indicated by the short dashed line, which socket 672, via line 673 (see also Fig. 30e), connects to the grid of tube 186a. Thus, at whatever time in a subtraction cycle the units order digit appears at the lower sensing station, the potential drop occurring on resistor 635u (Fig. 30b) is effective, via the circuit and plug connection just described, to raise the grid voltage of tube 186a (Fig. 30e), increasing current flow therethrough sufficiently to extinguish gas triode 189. The attendant drop in potential of point 198 at "6" corresponding to the units entry –6– is indicated at 674 in Fig. 32–a. In this manner, the first impedance network is returned to a non-conditioning status under control of a digit of the amount being subtracted. In this illustration, the units order of a field is used to control quenching of tube 189 in the first impedance network of the subtraction controlling circuit but it is deemed obvious that any order of a field may be so utilized.

As a result of adding an amount of –749– into the accumulator from the first film frame and subtracting –356– which appeared in the second film frame, the hundreds, tens and units oscillators are now at "3," "9," and "3," respectively, or in other words have these characteristic phases, indicating that a total amount of –393– stands in the accumulator. These phase relationships are indicated at 668, 667, and 666 in Figs. 33–c, 33–b, and 33–a, respectively, it being recalled that index position "17" corresponds to index position "3."

The foregoing has described the entry of two amounts from a record film, one additively and one subtractively into an electronic accumulator. Attention is particularly directed to the fact that entry of all digits of a multidenominational amount occur concurrently in an accumulator cycle. In the circuits of the embodiments previously described, digits are represented by pulses generated either by an oscillator, manually set to the "Entry" digit, or by one oscillator chosen by depression of a digit numbered key from a group of oscillators, and such pulses are employed to control the digit manifesting oscillators (by setting switches in the manually controlled device) in accordance with whether addition or subtraction is to be effected. In the instant embodiment, the amounts to be entered are represented by differentially disposed spots on the record medium and accordingly, their timed characteristic is employed (instead of a manually adjustable oscillator or a chosen key-controlled oscillator) to directly control the digit manifesting oscillators. That is to say, in the instant embodiment, in lieu of employing the phase of an oscillator to in turn control an oscillator to represent a digit, the first oscillator may be dispensed with since the time element may now be derived directly from a digit representing index on the record.

Referring now to Fig. 24, the third film frame, generally designated 669, is a blank film frame in this example and, as has been mentioned designates a group termination. As the second film frame 656 traverses the lower sensing station in the cycle just described, the third blank film frame 669 passes the upper sensing station. Since there is no indicia spot in the hundreds order, the light sensing the record is not diminished and the related order photocell 534 (Fig. 30e), does not have its energization interrupted. Consequently, point 641 (Fig. 30d) remains at the potential of line 2 and gas triode 642 does not become ignited. Accordingly, point 646 does not drop in potential between "9" and "0," inclusive, and at "11" when the negative control grid bias of tube 628b is reduced, its screen voltage is at a high value, as indicated at 679 in Fig. 31–c. This negative grid bias reduction is therefore effective to increase current flow through tube 628b, and point 649 drops in potential sufficiently to extinguish gas triode 626, thus interrupting current flow therethrough. Feed clutch magnets 496 are therefore deenergized, and at "D" at the termination of the cycle, the detent disks 495 (Figs. 24 and 25) are declutched and film feeding is suspended. The foregoing has described the manner in which a blank film frame, which is indicative of a group termination, is effective to automatically cause suspension of film feeding operations. Having come to the end of a group, the operator may now manually initiate a total recording operation, as described in detail presently, and thereafter manually initiate a zeroizing of the accumulator.

Mention is made in Section 25 that, when the supply of camera film upon which totals are recorded is nearly exhausted, contacts 573 (Figs. 28 and 30d) close, and film feeding operations are suspended so that the operator may insert a new reel of unexposed total recording film. The closure of contacts 573 short-circuits a portion of resistor 635 and point 641 becomes negative with respect to line 2. When contacts 573 close, a data index bearing film frame passing the upper sensing station is now ineffective to increase the potential at point 641 to cause ignition of gas triode 642 and therefore maintain the clutch magnets 496 energized. While an indicia spot in the frame does cause a reduction of current flow through resistor 635, the consequent rise in potential of point 641 with respect to line 2 is insufficient to ignite gas triode 642 since point 641 has been made initally negative with respect to line 2 by virtue of the closure of contacts 573. Therefore, clutch magnets 496 deenergize and film feed is suspended. In a like manner, when the operator depresses the stop key thereby closing contacts 452 (Figs. 22 and 30d) point 641 is similarly prevented from attaining a potential high enough with respect to line 2, which is sufficient to ignite discharge tube 642 and consequently the film feed is stopped. Feed of the film is resumed when the operator again depresses the start key and contacts 451 are thereby shifted to a reverse position from that shown in Figs. 22 and 30d.

Whenever either of the two conditions mentioned in the preceding paragraph occur, it may happen that the film frame, which is passing the upper station and reaches the lower station without being farther advanced because of feed termination, has apprised the machine its data is to be subtracted. Accordingly, gas triode 189 (Fig. 30e) of the subtraction control device would be ignited and early in the succeeding cycle, even though film feed is suspended, gas triode 207 would become ignited, were not the conditioning effect of the first impedance network suppressed as long as film feed is suspended. A method of accomplishing such suppression is now described.

Referring to Fig. 30d, whenever gas triode 626 is conducting (clutch magnets 496 energized) there is increased current flow through resistor 630, as is now understood. Under this condition, point 606 on resistor 630, which is connected, via line 605, (see also Fig. 30e) to the suppressor grid of pentode 199, is so chosen that its potential is equal to that of point 209 (Fig. 30e). If, however, gas triode 626 (Fig. 30d) becomes extinguished (clutch magnets 496 deenergized) point 606 on resistor 630 drops in potential with respect to point 209 (Fig. 30e) with consequent reduction in the suppressor grid voltage of tube 199 so that an increase in the effective value of the control grid voltage of tube 199 does not cause an increased current flow therethrough sufficient to raise the potential of point 209 enough to ignite gas triode 207. Hence, gas triode 207 in the second impedance network of the subtraction control device remains non-ignited as long as film feed is suspended. When the clutch magnets 496 (Fig. 30d) are again energized, point 606 rises to the potential of point 209 (Fig. 30e), gas triode 207 is ignited early in the cycle when feeding is resumed and subtraction of the data takes place in the usual manner.

The foregoing has described a supplementary control for the subtraction control device, which automatically suppresses functioning of the second impedance network of the subtraction device when film feed is stopped and a frame bearing data index, the value of which is to be subtracted is about to be analyzed by the lower sensing station. It is deemed obvious that such means may be utilized to suppress the action of any part of the accumulator upon cessation of film feed.

27. Recording and resetting—record controlled machine

In order to bring about a recording of the total amount of –393– on the total recording film in the camera unit 551 (Figs. 21 and 22), the camera unit is swung into position, thereby closing contacts 675 (Fig. 30b) and upon manipulation of toggle 453 (Fig. 22) the switch 685 (Fig. 30b) is closed. The closure of switch 685 supplies current from line 1, contacts 675, now closed, to and through the solenoid 574 (see also Figs. 26 and 27) of the film feeding mechanism of the camera, to line 2. The mechanisms which are actuated when solenoid 574 is energized and the operation thereof, have been described in detail in Section 25. Since the cathode ray tubes 348u, (Fig. 30b), 348t and 348hn (Fig. 30c) continually function, their beams produce illuminated points on the screens positioned in accordance with the digits standing in their related orders, as described in detail in Section 21 and illustrated in Fig. 14.

Accordingly, the –3–, –9– and –3– holes of mask 550 (Fig. 21) are illuminated in the same general manner as mask 355 of Fig. 14, and exposure of the camera film occurs when the shutter is tripped as described in Section 25. The result of this operation is, of course, to photographically record an amount of –393– on the total recording film, the total amount appearing as differentially disposed spots upon the film when it is subsequently developed. After a short interval of time, the operator restores toggle 453 (Fig. 22) and this opens the switch 685 (Fig. 30b) to deenergize solenoid 574. As is described in Section 25, the deenergization of solenoid 574 serves to advance the total recording film one frame length and thus positions an unexposed frame in the film gate so that the succeeding total amount may be recorded, in the manner just described. The amounts may, if desired, be visually observed, as described in Section 25. Having recorded or observed the total, the operator initiates a zeroizing operation of the accumulator.

To effect this, toggle 449 (Fig. 22) is manipulated and such operation places switches 8, 11 (Fig. 30a), 9 (Fig. 30d), 10, 12 (Fig. 30e), 13u (Fig. 30b), 13t (Fig. 30c) and 13hn, in reverse position from that shown. Thereupon, resetting increments are applied to each order of the accumulator and eventually all digit manifesting oscillators return to "0," the operations being carried out, as described in detail in Sections 16 and 23. Carry operations are suspended, as also explained in these sections. After allowing a sufficient interval of time, the operator restores toggle 449 (Fig. 22) and again manipulates start key 451 whereupon the machine resumes film feeding and data entering operations, as set forth in Section 26.

28. Synchronizing—record controlled machine

The synchronization of the intermediate, pulsing and digit manifesting oscillators is carried out in the manner described in Sections 14 and 22 and it is not believed necessary to repeat such description in connection with similar circuit portions of the record controlled machine.

Attention is directed to the fact that whenever film feeding operations occur, a film frame completely traverses a sensing station in one accumulator cycle. Since differentially disposed spots are employed for representing the data, it follows that a given differential position on the film must be positioned at a sensing station at the corresponding time in an accumulator cycle. That is to say, the –9– position of a film frame must be at a sensing station at "9" in a cycle and the –8– position in a film frame must be at the sensing station at "8," etc. Accordingly, the film feeding mechanism when it is operating must be synchronized in operation with regard to an accumulator cycle.

It has already been pointed out that a movement equal to one tooth movement of ratchet 493 (Figs. 24 and 25) advances the film 521, one frame length. It is therefore apparent that the time during which the ratchet 493 is advanced one tooth must equal that of an accumulator cycle. Accordingly, the motor 475 (Fig. 23) is driven at a speed which takes into account the gearing intermediate the motor and gears of each clutch ratchet, such as 492 (Figs. 24 and 25) in order that ratchet 493 which is mounted on and driven by 492, advances one tooth each accumulator cycle. This synchronization between the film feeding mechanism and an accumulator cycle is accomplished by supplying motor 475 (Figs. 23 and 30d) from a power source which is controlled from one of the oscillators.

In Section 26, it is explained that a pulse of positive polarity appears on resistor 67x at "D." A branch circuit from this resistor (Fig. 30d) extends to a battery 690 and to the grid of a triode 691. With no potential on resistor 67x, battery 690 maintains the grid of tube 691 at cut-off. A positive pulse, however, opposes battery 690 thereby reducing the negative grid bias of tube 691 permitting current to flow therethrough momentarily. A resonant circuit comprising inductance 692 and condenser 693 in series with tube 691 between lines 1 and 2 is momentarily excited and oscillations are initiated. Inductance 692 and condenser 693 are adjusted, so that the period of oscillation is equal to the frequency with which the tube 691 momentarily passes current, i. e., at "D" once each accumulator cycle. The output of this externally controlled oscillator circuit is coupled by means of a condenser 694 and resistor 695 to an amplifier 611. The output from amplifier 611 is of sinusoidal characteristic and is of sufficient power to drive motor 475, when switch 610 is closed. This arrangement provides a power supply for motor 475 having the same frequency as the number of cycles of operation of the accumulator. It will be appreciated that the frequency of the power supply for motor 475 can be any multiple of or sub-multiple of the basic accumulator cycle depending upon from what point in the circuit the exciting voltage is derived, for pulsing tube 691. In this manner, the speed of the motor is maintained synchronized with the operation of the accumulator circuits and therefore the proper timed relation always exists between the record feeding and the steps of an accumulator cycle.

29. *Plugging*

In order to provide for flexibility of operation in the record controlled machine, numerous circuits of the electronic accumulator are plug connected. A plugboard P. B. located on the front of the base cabinet 470 (Fig. 22) is utilized to facilitate an operator's plugging up the machine in accordance with the data to be handled.

The manner in which a connection, made between socket 634 (Fig. 30d) and one of the sockets 633 (Fig. 30e) is employed for detecting blank film frames was explained in Section 26. The manner in which a connection, made between socket 659 (Fig. 30e) and one of the sockets 633, is used for determining the additive or subtractive character of data to be entered, was also described in Section 26. In the same section, there was also explained the manner in which a connection made between socket 672 (Fig. 30b) and one of the sockets 671 controls a circuit for shutting off one of the gas triodes in the circuit of the subtraction control device.

Plug connections between sockets 695 (Fig. 30b) and 696 (see also Fig. 30c) afford circuits between the photocells at the lower sensing station and the entry control devices of the accumulator. By means of such connections, data appearing in any column of the record may be entered into any desired accumulator order. Plug connections between sockets 697 and 698 (Figs. 22, 30b and 30c) provide circuits between the digit manifesting oscillators and the horizontal deflection plates of the cathode ray oscilloscopes of the recorder unit whereby the digit standing in any order of the accumulator may be recorded in any desired column on the total film.

Plug connections between sockets 699 and 700 (Figs. 22, 30e and 30f) afford circuits between the subtraction control device and the entry control devices of the accumulator by which 9's are entered into the accumulator orders at the beginning of a subtraction cycle, as described in Sections 11 and 26. These plug connections make it possible for a subtraction control device to control subtraction operations in any number of desired accumulator orders. A plug connection between socket 701 (Fig. 30e) and one of the sockets 702 provides a circuit between the subtraction control device and one of the accumulator orders whereby the elusive one may be entered into any desired column upon subtracting.

Connections made between sockets 703 and 702 and sockets 705 and 704 (Figs. 22 and 30e) usually provide circuits between the carry effecting devices and the entry control devices of adjacent accumulator orders. In some cases, however, the operator may desire to use chosen accumulator orders only. In this event and with properly made connections, the sockets just mentioned provide circuits between the carry effecting devices and the entry control devices of chosen non-adjacent accumulator orders.

It will now be appreciated that each order of the accumulator of the record controlled machine, in view of the above described plug connections, may be considered a separate entity. That is to say, an electronic accumulator may consist of any number of desired orders in which multidenominational amounts may be added and subtracted. These orders may receive entries from any desired columns of the record film frames and can control total recording in any desired columns on the total film. Also, upon subtracting, the elusive one may be entered into any selected accumulator order and upon both adding and subtracting a carry operation may be effected in both an adjacent and a non-adjacent order either forwardly or backwardly if it is so desired.

Novel means are therefore provided whereby a characteristic impulse indicative of a digit or of a multidenominational quantity to be entered into an accumulator is produced by variation of an electrical quantity, in proportion to the digits of the quantities to be entered, or by the timing of an impulse, in proportion to said digits, and electronic means controlled by said impulses produced variations in an electrical quantity, additively or subtractively, in accordance with the desired manner of entry, to produce a characteristic electrical quantity indicative of the entry or of the sum or difference of a plurality of entries.

While there has been shown and described and pointed out the fundamental novel features of the invention as applied to a plurality of modifications, it will be understood that various omissions and substitutions and changes in the form, circuits and details of the devices illustrated and in the methods of operation may be made by those skilled in the art without departing from the spirit of the invention. It is the intention therefore to be limited only as indicated by the scope of the following claims.

What is claimed is:

1. An electronic device comprising means for generating electrical timed impulses defining the duration of a cycle, electrical oscillator means, controlled by said impulses, producing repeated oscillations, digit entry control means for adjusting the occurrence of said oscillations to any one of a plurality of differentially located positions within said cycle, said entry control means differentially locating the position of an oscillation occurrence in accordance with the value of a digit entered.

2. A device comprising a digit manifesting electronic device cyclically producing electronic discharges, means delimiting a cycle of operation of said device and entry control means for altering the discharge time, selectively, from one point to another within said delimited cycle, whereby a discharge is produced at a time in a cycle indicative of the entered digit.

3. A device comprising an electrical oscillator producing cyclic oscillations having a quantitatively discriminative characteristic at a predetermined point within a cycle, means delimiting said cycle, and entry control means for determining a digit to be entered, comprising means for shifting, selectively, the point within the cycle at which said characteristic is manifested in accordance with a chosen entry into said oscillator.

4. A device comprising a digit manifesting oscillator producing electrical oscillations of a desired time phase relationship, entry control means for determining a digit to be entered, means rendering said entry control means operative during periods proportional to digits to be entered and for producing a variation in the frequency of said oscillations during said respective periods whereby the time phase relationship of the oscillator is shifted to thereby produce a particular phase indicative of the value of the entered digit.

5. An adding device comprising electronic means for electronically manifesting different digits, circuit means controlling said electronic means, means altering the operation of said circuit means for different, selective time periods, each characteristic of a different digit, to produce an entry into said electronic means of a chosen predetermined digit to be entered, said circuit means controlling said electronic means to store therein a manifestation of said entered digit, and said altering means further altering the operation of said circuit means to produce entry of an additional digit to be entered whereby said stored manifestation is changed to another representative of the algebraic summation of the first entered digit and the additional digit.

6. An electronic device comprising in each denominational order, entry control means for determining a digit to be entered therein, an electronic wave emitter comprising solely electronic means, controlled and adjusted by said entry control means, to produce a wave of chosen time phase relationship indicative of a digit entered. and a cathode ray tube, visibly manifesting the phase indicative of the entered digit.

7. An electronic device including indicating means for indicating quantities comprising a cathode ray tube having a horizontal sweep input and a vertical sweep input, means producing repeated cyclical timed impulses, electrical impulse means controlling said timed impulse producing means to produce repeated timed impulses having a desired constantly maintained time separation, means applying said separated timed impulses to one sweep input of said cathode ray tube, electronic digit manifesting emission means producing an emission having a timed phase relationship indicative of a digit entered therein, and means applying said emission of timed phase relationship to the other sweep input of said cathode ray tube to thereby produce a visual indication representative of the value of the digit entered in said digit manifesting device.

8. In a device of the character described, digit manifesting means comprising electronic means producing a cyclical electrical peaked wave, means delimiting the cycles of said digit means, means for adjusting the position of the peak of said wave within the cycle to thereby adjust said peak in accordance with a digit entered, and said adjusting means shifting said peak from one position to other positions, in accordance with the summation of a plurality of digits entered.

9. In a device of the character described, the combination of digit manifesting means, means comprising a position of said digit manifesting means for regulating the cyclical operation of said first means, entry control means, controlling said regulating means for modifying the operation of said digit manifesting means through variable portions of a complete cycle thereof upon entry of one digit to produce a manifestation of said digit and producing a cyclical repetition of said manifestation, said regulating means being again controlled by said entry means for modifying the operation of said digit means through another variable portion of a complete cycle thereof upon entry of a different digit, to thereby produce a manifestation of the summation of said entered digits, and producing a cyclical repetition of said summation manifestation.

10. An electronic device of the character described comprising in each demoninational order, electron emitting digit manifesting means, means for selectively producing differentially timed impulses, each impulse representative of a different integer, means controlled by said differentially timed impulses, each indicative of a determined entry, controlling said electron emitting means, to produce a succession of differentially timed impulses in said electron emitting means, the last being indicative of the summation of the preceding plurality of entries in the respective order.

11. An electronic device of the character described comprising in each denominational order, entry control means controlled by electrical manifestations respectively indicative of different amounts for determining successive amounts to be entered, circuits, including electronic devices for manifesting the true sum of the successive amounts entered and including means for producing a chosen timed operation of said electronic devices, means for varying the timed operation thereof, said entry means controlling the operation of said varying means in response to successive amount entries for varying the timed operation of said electronic devices, each variation being in accordance with the respective determined amount, to adjust said electronic devices to a timed operation representative of the summation of the respective amounts.

12. In a device of the character described controlled by records comprising record bearing material having designations of amounts to be entered, means for sensing said designations, means controlled by said sensing means for producing an electrical impulse timed so as to be representative of an amount sensed, an electronic accumulator, means for adjusting the electronic condition of said accumulator to different conditions and controlled by said impulse to adjust the electronic condition of said accumulator in accordance with the timing of said produced impulse.

13. An electronic device comprising in each denominational order, means producing an electrical cyclical phenomenon of desired pattern, entry control means controlled by electrical manifestations respectively indicative of different digits for determining digits to be entered and controlling said cyclical phenomenon producing means to produce a pattern indicative of a first determined digit additively entered, subtraction means initiating a variation in the electrical pattern of said pattern producing means at a relatively fixed cyclical time, means controlled by a manifestation representative of a second digit entry cooperating with said entry control means to terminate said variation to thereby produce another pattern, means rendered effective by means under control of said subtraction means initiating a variation in the pattern of the lowest order pattern producing means at a fixed cyclical time, and means limiting said last variation to a unit digit amount whereby an elusive one is entered into said lowest order.

14. In a device of the character described, an electronic emission device, impulse producing means producing timed impulses regulating the electronic emission of said device to cyclical repetitions of a characteristic wave form emission pattern, entry means for determining amounts to be entered and for determining the nature of said entry, means for controlling the rate of operation of said device and controlled by said entry means to adjust said pattern to one of a plurality of distinctive patterns indicative of a first amount entered therein, means producing a chosen timed impulse to initiate a subtraction operation, means rendered effective upon determination of a subtraction entry cooperating with said timed impulse to control said controlling means, for initiating, at a fixed point in a cycle, a change in the rate of operation of said device to vary the adjustment of said pattern, means controlled by said entry means and controlling said rate controlling means when an entry of subtractive nature is determined, to terminate said variation in adjustment upon determination of a second amount whereby said emission device assumes a different pattern, and means producing a pair of spaced timed impulses, means rendered operative by one of said pair controlling said rate controlling means to initiate another change in the rate of operation of said device and means rendered operative by the other pulse controlling said rate controlling means to terminate said change to thereby introduce an elusive one into said device whereby said electronic emission device assumes a pattern indicative of the difference between the first amount entered and the second amount subtractively entered therein.

15. A record controlled device comprising means for sensing records, said records comprising record bearing material having formed thereon code designations of amounts to be entered and a code designation indicating the nature of the entry, an electronic emission device, impulse producing means producing repeated timed impulses and regulating the electronic emission of said device to cyclical repetitions of a characteristic emission pattern, means for adjusting said emission device to change said pattern to one of a plurality of distinctive patterns indicative of a particular quantity, means controlled by said sensing means for controlling said adjusting means to produce a particular distinctive pattern indicative of a first sensed quantity, means effective upon sensing of a code designation indicative of a subtractive entry, initiating, at a fixed point in a cycle, a change in said adjusting means to thereby change the adjustment of said pattern, said means controlled by said sensing means upon sensing of the code designations indicating the amount to be subtractively entered terminating said change in said adjusting means whereby said emission device assumes a fixed different pattern.

16. A device of the character described comprising an oscillator producing electrical oscillations, entry control means controlled by an electrical manifestation representative of a digit for determining a digit to be entered, said entry means varying the time phase relationship of said oscillations in proportion to the value of a digit entered.

17. A cyclically operating electronic device comprising means for producing a series of electronic discharges, selectively, relatively positioned within a cycle of said device, means for adjusting said discharges to one of ten decimal positions within the cycle including a zero position, selectively in accordance with respective entries, and resetting means comprising means producing a succession of reset impulses controlling said adjusting means to produce a succession of unit value entries, and means controlled by the discharge effective, only at the zero position within a cycle, for rendering said impulses ineffective.

18. A cyclically operating electronic device comprising means for producing successive electrical cyclical impulses, means adjusting said impulses to positions within a cycle of said device indicative of respective entries, resetting means producing a series of reset impulses controlling said adjusting means to thereby produce a succession of unit value entries to reset, by steps, the impulse positions within a cycle of said electronic device, and means controlled by a chosen status of said electronic device existing at a certain step position for terminating the effect of said series of reset impulses.

19. A multidenominational accumulator comprising a plurality of electronic devices arranged in different denominational orders, respectively, control devices for effecting concurrent changes in the operation of said electronic devices in the several orders in accordance with the respective digits comprising a multidenominational amount to be entered, and electronic means controlled by a predetermined electrical phenomenon occurring in an associated device for effecting carry from each of said orders to another higher order.

20. A machine of the character described comprising electronic emission devices in each order of said machine, respectively, for manifesting the digits entered therein, a source of power for constantly producing energization of said devices, means for producing a variation in the degree of energization, control means determining the value of digits to be entered, respectively, in each order and controlling the respective periods of said variation to produce a variety of patterns of wave forms in said respective order devices, each pattern indicative of a digit and respectively dependent upon the period of said variation, said control means determining the value of successive digits to be entered respectively, in each order, and controlling said production means for respective periods of time corresponding to respective determined digits to thereby produce wave form patterns in succession, the last indicative of the cumulative value of said determined digits, and electronic means, controlled only by a predetermined succession of said wave form patterns in one order, producing an electrical condition to apply a carry to a device of a higher order.

21. In a machine of the character described including a digit manifesting electronic emission device in a first order, entry control means for adjusting said device upon energization thereof to produce one of ten characteristically timed emissions, each emission representing a different digit, said entry control means determining the value of a digit to be entered in said order and producing the particular characteristically timed emission representative of the entered digit, an electronic emission device in a second order, entry control means for adjusting said device to produce one of ten characteristically timed emissions, each of said emissions representing a different digit, said entry control means determining the value of a digit to be entered in said order and producing the particular characteristically timed emission, representative of that digit, said same entry control means, respectively, controlling the entry of succeeding digits whereby said devices are adjusted to assume different characteristically timed emissions, an electronic emission device in a third order, means controlled by the first order emission device upon production by said device of a predetermined electrical condition representative of passage from digit nine to zero for producing a carry impulse, means for introducing impulses to said third order and means responsive to said carry impulse and to an emission representive of the digit nine produced by the second order emission device upon the occurrence of a characterically timed emission representative of nine for rendering said introducing means operative to introduce a carry impulse into said third order.

22. In a device of the character described comprising a digit manifesting electronic emission device in a first order, entry control means for adjusting said device upon energization thereof to produce one of ten characteristically timed emissions, each emission representing a different digit, said entry control means determining a digit to be entered in said order and producing the particular characteristically timed emission, representative of the entered digit, an electronic emission device in a second order, entry control means for adjusting said device to produce one of ten characteristically timed emissions, each emission representing a different digit, said entry control means determining the digit to be entered in said order and producing the particular characteristically timed emission, representative of that digit, subtraction controlling means, said entry control means, respectively, cooperating with said subtractive means to control the subtractive entry of a succeeding digit whereby said devices are adjusted to different characteristically timed emissions, means controlling said entry means for producing a change in the energization of the device in said first order to enter therein an elusive one, and means simultaneously controlled by said last named controlling means and by the emission representative of the digit nine, produced by the first order emission device upon the occurrence of a characteristically timed emission representative of nine, to introduce a carry impulse in said second order.

23. In a device of the character described having a plurality of successive orders, the combination of an electrical manifesting element for each order for manifesting the digits entered therein by producing an electrical oscillation of a desired time phase, entry controlling means for determining the digits to be entered in each order, means controlled by said entry means to vary the time phase of the oscillation produced by the element in each order and varying the time phase of the oscillation upon the entry of different digits to produce a time phase representative of the sum of digits entered therein, means producing an electrical phenomenon indicative of carry in a lower order, and means controlled concurrently by said electrical phenomenon and by an oscillation having a time phase manifestation of nine in a higher order, to produce a carry in a still higher order.

24. An electronic apparatus comprising a plurality of denominational order elements, each order element comprising an electronic device having a normal cyclic operation consisting of the periodic establishment of a chosen one of different patterns of an electrical phenomenon representative, respectively, of each of the several digits, a chosen number of said device normal cycles comprising the operating cycle of said apparatus, and entry control means for controlling said electronic elements to selectively establish periodically the electrical pattern representative of an entered digit, said entry control means effecting the entry of a plurality of digits successively into said apparatus by selectively changing the electrical pattern representative of a digit priorly entered to one corresponding to the summation of the priorly entered digit and the digit presently entered, and carry means electrically connected to the electronic device in a lower denominational order and rendered effective to produce tens carry to a higher order only when the entry of a digit in said lower order results in the occurrence within a definite predetermined portion of the operating cycle of said apparatus, of a phenomenon indicative of a carry condition.

25. In an apparatus of the character described including a plurality of denominational order elements, each order element comprising an electronic digit manifesting device having a normal cyclical operation which consists of establishing periodically a chosen one of different patterns of an electrical phenomenon to represent each of the several digits, a chosen number of said device normal cycles comprising the operating cycle of said apparatus, and entry control means for controlling said electronic elements to selectively establish periodically the electrical pattern representative of an entered digit, said entry control means effecting the entry of a plurality of digits successively into said apparatus by selectively changing the electrical pattern representative of a digit priorly entered to one corresponding to the summation of a priorly entered digit and the digit presently entered, means producing a timed impulse testing for a carry condition at a chosen point in said operating cycle and tens carry means controlled jointly by said timed impulse and by a unique phenomenon occurring in the electronic device of a lower denominational order to effect tens carry to a higher order when the entry of a digit in said lower order results in the occurrence therein, within a definite, predetermined portion of the operating cycle of said apparatus, of said unique phenomenon indicative of a carry condition.

26. In a device for producing in a numerical notation of a chosen base, a manifestation representative of the summation value of a plurality of quantities, cyclically operating electronic means for supplying an energy change to produce a quantitatively discriminating manifestation at a chosen differential time in one cycle of operation of the electronic means, said means repeating said manifestation at the same differential time in repeated cycles, entry means for determining the value of a quantity to be entered, means controlled by said entry means for producing an electrical energy change for adjusting said electronic means to position the differential timing of said discriminating manifestation, in accordance with the cumulative value of sequential entries, a second electronic means for producing a similar manifestation of the next higher power of the chosen base multiples of the manifestation of said first means, entry determining means therefor, and means controlled conjointly by an electrical energy change representative of a unit value entry in said first means and by a chosen one of the differentially timed manifestation energy changes in said first means to render operative the entry determining means of said second electronic means.

27. In combination, a digit manifesting electronic device producing differentially timed electronic discharges for representing digits entered therein, entry control means for determining digits to be entered controlling said device to vary the differential timing of said discharges in accordance with entered digits, carry determining means comprising electronic means responsive to said discharges for determining a condition of carry in the associated order of said accumulator, and electronic means controlled by said determining means for introducing a carry impulse into the next higher order of said accumulator upon the production of a predetermined number of discharges in a certain predetermined period.

28. In combination in a cyclically operating accumulator, a first and a second digit manifesting oscillator producing cyclic electrical discharges differentially timed within an accumulator cycle so as to be representative of digits entered, a first and a second entry control means for said oscillators, respectively, for varying the differential timing of said cyclic discharges within said cycle and selectively in accordance with the entry, carry determining means controlled by said first oscillator and including an electronic circuit alternately adjustable to different energized statuses in accordance with alternate discharges of said first oscillator controlling the energization of said second entry control means, and means effective at a predetermined status of said circuit at a predetermined time for varying the energization of said second entry control means to thereby effect carry entry.

29. An electronic device comprising entry control means controlled by a manifestation representative of a digit and producing, under control of said manifestation, electrical timed control effects of varying periods proportional to said digit, an energized electronic circuit for manifesting a previously entered digit, and means for applying said timed control effects to said circuit for varying the energization of said circuit, for a period representative of the entry to thereby adjust the manifestation of said circuit to one representative of the algebraic sum of said previously entered and said presently entered digit.

30. An electronic apparatus comprising an electronic digit manifesting device, entry control means, controllable by any of a plurality of different electrical oscillation patterns, continuously repeated, each pattern, representative of a different digit, for applying one of said patterns to said device, and means controlling the application of said respective patterns to said entry control means, for limiting the number of applications of said chosen electrical pattern to said means, to thereby control the operation of said manifesting device to adjust the same to represent the digit represented by said applied pattern.

31. Timing means for an electronic accumulator including cyclic electronic emission means producing repeated emissions, said timing means comprising means for producing control impulses at predetermined times, means for impressing said control impulses upon the electronic emission means for regulating the timing of the repeated cyclic emissions, the period of each cycle of the emission being determined by said predetermined times, impulse producing means for producing impulses at different respective points in said cycle, and means controllable by said impulses for varying the rate of operation of said electronic means to produce repeated emissions of a selected time phase.

32. A device of the character described comprising entry control means for determining a digit to be entered, means for producing timed phenomena, means controlled by said entry means for adjusting, the timing of said phenomena in proportion to a digit to be entered, and oscillator means whose output is applied to said phenomena producing means comprising an escapement for maintaining the time relationship of said phenomena.

33. A device of the character described comprising an electronic digit manifesting element cyclically repeating an emission pattern, entry controlling means for sequentially determining digits to be entered, means controlled by said entry control means upon determination of one digit to vary the emission pattern of said element to produce and cyclically repeat an emission pattern indicative of the digit entered, said means being controlled by said entry means upon determination of a second digit to again vary the emission pattern of said element to produce and cyclically repeat an emission pattern indicative of the digit representing the summation of the first and second digits, the repeated patterns serving as a manifestation of the digit.

34. A cyclically operable apparatus comprising in each denominational order, a device to represent the several digits, and means for causing said device to produce current impulses recurring periodically and differentially timed within a cycle of said apparatus, means controlling said device to vary its operation for a period of time proportional to the value of the digit to be entered to select a time of production of said periodically recurring impulses in accordance with the summation of the digit already represented in said device and the one to be entered, and means responsive to said recurring impulses to indicate said summation.

35. An electronic device comprising in each denominational order, means for defining the duration of a cycle, cyclically operating electronic means controlled by said defining means and having a predetermined recurring phenomenon, whose time of occurrence, within said cycle, can be adjusted to definite differential times to thereby manifest digits in the order, means controlling said electronic means for shifting the differential times of said occurrence to manifest the algebraic summation of a digit presently manifested by said electronic means and a digit subsequently entered therein, and means for producing digit entry into said device by controlling, in accordance with the value of successive digits, the operation of the shifting means to effect the entry of said successive digits.

36. A device of the character described comprising an oscillator producing electrical oscillations of a desired time phase, entry control means controlled by a manifestation representative of a digit to be entered for adjusting the phase of said oscillator to one of a plurality of phase conditions, in accordance with the value of said digit, said means adjusting said phase condition in accordance with a second digit entered, to produce a phase indicative of the algebraic sum of said first and said second digits, and means controlled by passage of said oscillator from a phase condition representative of the highest digit to a phase condition representative of zero, to produce a carry effect.

37. An electronic device comprising means producing timed electrical manifestations, representative of different digits, means adjusting the timing of said manifestations in accordance with desired digit entries, and means automatically producing carry upon occurrence of a particular succession, in a preselected time, of differentially timed manifestations indicative of a particular digit sequence.

38. An electronic manifesting device comprising an electrical oscillator, entry control means for adjusting the cyclic rate of operation of said oscillator for chosen times, respectively, in accordance with digits entered, to produce a manifestation indicative of the cumulative values of entered digits, and carry producing means controlled by the number of cycles completed by said oscillator in a fixed predetermined period of time.

39. An electronic device comprising electronic means producing manifestations, respectively representative of entered digits, entry control means for adjusting the operation of said electronic means to produce different electronic manifestations, indicative, respectively, of zero to nine, inclusive, means controlling said entry control means, for resetting said electronic means to a manifestation representative of zero, carry producing means, and means rendering said reset means effective and simultaneously rendering said carry means ineffective.

40. An electronic device comprising electronic digit manifesting means of variable operation characteristically manifesting by an electrical phenomenon a first digit entered and means for altering the operation of said manifesting means for a period proportional to a digit to be presently entered, to thereby produce a characteristic electronic phenomenon representative of the cumulative value of said first entered digit and said presently entered digit.

41. An electronic device comprising cyclically and variably operable electronic digit manifesting means, means determining the cycle of operation of said digit means, and entry control means for altering the operation of said electronic digit manifesting means, at differential cyclic points, indicative of the value of the digit to be entered, and including means electronically terminating said altering at a fixed cyclic point.

42. A single entry control apparatus for an accumulator comprising an electronic device, means producing repeated electrical effects having a particular characteristic representative of a digit to be entered into said accumulator, means applying said effects of particularly characteristic to said device, means for rendering said device responsive to a first one of said repeated effects, means for rendering said rendering means initially operative, means producing a timed impulse succeeding the first of said repeated effects to render said rendering means inoperative.

43. An electronic device comprising electronic wave producing means, means for determining digits to be entered, means controlled by said determining means, upon determination of a first digit, for adjusting the energization of said first means to produce a wave having a characteristic, indicative of said first digit, and controlled upon determination of a second digit for again adjusting said first means to produce a wave having a characteristic, which is indicative of the algebraic summation of said first entered digit and said second entered digit.

44. A cyclically operable electronic device comprising means for producing electronic discharges, selectively relatively positioned within a cycle of said device and the discharge initially positioned at a specific time within said cycle, and entry control means, controlled by a manifestation representative of a digit, for adjusting said discharges to one of a plurality of different positions within the cycle, in accordance with the value of said digit.

45. A device of the character described comprising means producing a recurrent electrical emanation having a timed characteristic, entry control means first adjustable in accordance with the value of a first digit to be entered to control said emanation to adjust its timing to represent the value of said first digit entered, and said entry control means secondly adjustable in accordance with the value of a second digit to adjust the timing of said recurrent emanation to a chronological order corresponding to the cumulative value of said entry control means first and second adjustments.

46. A device of the character described comprising electronic means for producing and maintaining cyclic electronic manifestations of a chosen base cycle, entry control means adjustable in accordance with the value of a first digit to be entered to vary said cyclic manifestation within the basic cycle to produce a particular manifestation indicative of said first digit and means for adjusting the operation of said electronic means by said entry control means in proportion to the value of a second digit, whereby said particular manifestation is changed to another particular manifestation, within said basic cycle and representative of the cumulative value of said first and said second digit.

47. An electronic device comprising means producing a continuous electrical manifestation having a chosen time of peak intensity, and entry control means adjustable to shift the time of said peak intensity in accordance with the value of a digit entered, said entry control means being further adjustable in accordance with the value of a second digit entered to shift the time of said peak intensity an additional amount in proportion to the value of said second digit to thereby represent the cumulative value of said successively entered digits.

48. An electronic device comprising means normally producing a timed electronic phenomenon of chosen invariable duration, and means modifying said phenomenon during a portion of said normal duration, said portion varying in accordance with the value of a digit entered into said device.

49. A quantity accumulating and indicating device comprising electronic means producing an electronic manifestation, means for altering said manifestation incrementally in accordance with successive digits entered to adjust said electronic manifestation to one indicative of the cumulative value of all digits entered in said device, a cathode ray tube, means associated with said tube to establish a cathode ray, deflecting means associated with said cathode ray tube, and connections between said electronic means and said deflecting means whereby said electronic manifestations are applied to said deflecting means for operating said cathode ray to indicate the cumulative value of quantities entered into said accumulator.

50. In a device of the character described, electronic digit manifesting means, means for controlling the operation of said manifesting means to change the manifestations to represent a first entry or the accumulation of several entries, means producing a cyclic operation of said manifesting means, said changing means respectively controlling said manifesting means to produce a timed electronic manifestation representative of a first digit entered or of the cumulative values of digits entered, said timed manifestation serving as both a manifestation of value and as a readout manifestation.

51. An accumulator comprising a plurality of electronic devices arranged in different denominational orders, respectively, control devices, for effecting concurrent changes in the operation of said electronic devices in the several orders in accordance with the respective digits comprising a multidenominational amount to be entered, and adjusting said electronic devices selectively to one of a plurality of conditions, in accordance with selective entries, and means controlled by a certain electrical manifestation presented by an associated device representative of passage through a predetermined one of said plurality of conditions in one order to produce a carry in another order.

52. A device such as described, comprising electronic digit manifesting means for each order of the device, entry control means for adjusting the operation of each of said digit manifesting means in accordance with successive different digits entered respectively into each order, to produce a manifestation indicative of the values of said digits in each order respectively, and electronic carry means for effecting carry from one order to a different order and including carry preparatory means controlled by a predetermined status of the electrical manifestations of said digit means in said one order for producing a carry preparatory effect during operation of the entry receiving means of said different order.

53. In an apparatus of the character described including a plurality of denominational order elements, each order element comprising an electronic digit manifesting device effective to establish any chosen one of different patterns of an electrical phenomenon to represent each of a plurality of digits, and entry control means for controlling said electronic elements to selectively establish the electrical pattern representative of an entered digit, said entry control means effecting the entry of a plurality of digits successively into said apparatus by selectively changing the electrical pattern representative of a digit priorly entered to one corresponding to the summation of a priorly entered digit and the digit presently entered, means producing an electrical pulse testing for a carry condition and carry means controlled jointly by said electrical pulse and by a unique phenomenon occurring in the electronic device of a lower denominational order, to effect carry to a higher order when the entry of a digit in said lower order results in the occurrence of said unique phenomenon indicative of a carry condition.

54. In a device for producing in a numerical notation of a chosen base, a manifestation representative of the summation value of a plurality of quantities, electronic means for supplying an energy change to produce a quantitatively discriminating electronic manifestation, entry means for determining the value of a quantity to be entered, means controlled by said entry means for producing an electrical energy change for adjusting said discriminating manifestation produced by said electronic means, in accordance with the cumulative value of sequential entries, a second electronic means for producing a similar manifestation of the next higher power of the chosen base multiples of the manifestation of said first means, entry determining means therefor, and means controlled conjointly by an electrical energy change representative of a unit value entry in said first means and by a chosen one of the manifestation energy changes in said first means to render operative the entry determining means of said second electronic means.

55. An electronic device comprising electronic value receiving and manifesting means, means establishing an entry cycle during which a value may be entered in the manifesting means, electronic discharge entry control means for bringing about entry receiving operation of the manifesting means for a period of the cycle proportional to the value to be entered, means producing an electrical digit signal timed in accordance with the digit value, subtraction control means for determining that the complemental value entry of the digit is to be effected, means controlled by the subtraction control means for rendering the entry control means effective to initiate entry receiving operation of the manifesting means at a predetermined time of said cycle, and means controlled by the subtraction control means and the digit signal for terminating the entry receiving operation of the manifesting means at a time of said cycle dependent upon the magnitude of the digit and separated from said predetermined time by a period of the cycle proportional to the complemental value of the digit.

56. In a machine of the class described having an electronic totalizer for selectively producing electronic manifestations of different values, the combination of resetting means for resetting said totalizer to produce an electronic manifestation of a chosen norm, means to initiate resetting operation, and means under control of the electronic manifestation of the chosen norm produced by the totalizer for terminating resetting operation.

57. Apparatus comprising a circuit network, of electronic discharge tube means, having potentials applied thereto and variable to produce digit entries and selectively produce electrical manifestations of different digits, electronic discharge entry control means controllable by electrical signals, each indicative of a different digit and electrically connected to said network to vary said potentials upon said tube means to bring about entry of a selected digit, corresponding to the signal applied to the entry control means, so as to alter the electrical manifestation produced by the network in accordance with the magnitude of the selected digit, whereby a plurality of such digit entries made in succession result in the production of an electrical manifestation by the network of the cumulative value of the entered digits, and means for selecting each such digit to be entered by selectively applying the corresponding electrical signal to said entry control means.

58. Apparatus comprising a denominational order circuit network of electron emitting tubes to produce electronic manifestations of different digits and capable of progressive digit entry receiving operation, grid-controlled electronic discharge entry control means electrically connected to the network and effective for differential periods of entry cycles, each period proportional to the magnitude of a different digit, to act through said emitting tubes to bring about progressive digit entry receiving operation in each said cycle for the period proportional to the digit being entered during the cycle, said network at the end of a succession of such cycles electronically manifesting the cumulative value of the entered digits, and digit selecting means to select the digit to be entered and producing a digit-corresponding electrical signal to effect grid-controlled operation of the electronic discharge entry control means so as to render the entry control means effective for the period of the cycle proportional to the magnitude of the digit.

59. Apparatus comprising a digit entry receiving and manifesting circuit network of electronic discharge tube means, electronic discharge entry control means outside said network but electrically connected thereto and responsive to electrical manifestations, respectively indicative of different digits, for affecting the electronic discharge tube means of the network to control the network to manifest any first digit entered and subsequently to manifest the cumulative value of the first digit entered and the digits subsequently entered, means continuously supplying and rendering available for selection said electrical manifestations, and means for selecting the digits to be entered by applying those of the continuously supplied, available electrical manifestations indicative of the digits to be entered to said electronic discharge entry control means.

60. Apparatus comprising a circuit network of grid-controlled electron emitting means operable to receive digit entries and register their cumulative value, an entry control network electrically connected to said circuit network and comprising electron tube means responsive to signals of differential time magnitudes indicative of different digits for selectively grid-controlling the electron emitting means of the circuit network to bring about operations thereof to receive entry of a first digit and subsequently to receive entries of other digits and register the cumulative value of all said entered digits, each signal including a start pulse applied to the tube means of the entry control network to render it effective to bring about the entry receiving operation of the circuit network and also including a stop pulse differentially time-separated from the start pulse and applied to the tube means of the entry control network to render it ineffective, so as to terminate the entry receiving operation of the circuit network.

61. Apparatus comprising value manifesting means dynamically operating at a given rate to exclusively manifest any one value of a plurality of values, means to control said manifesting means to depart from said given rate of operation so as to shift from exclusive manifestation of one said value to exclusive manifestation of a different one of said values, and means rendering said control means effective to bring about said departure from the given rate for differential times, relating to different values to be entered.

62. Apparatus comprising value manifesting means operating at a given rate of dynamic action to effect exclusive manifestation of any one of a plurality of values and capable of departing from said rate of operation to shift to exclusive manifestation of a different one of the values, means acting on said manifesting means to effect departure thereof temporarily from said given rate of operation, said value manifesting means upon resuming dynamic operation at the given rate exclusively manifesting said different one of the values, and value entry selecting means for operating through said departure effecting means to cause a different predetermined extent of shift in manifestation for each selected value entry.

63. The combination with a denominational order of value registering means to receive entries of digits and register their total, and entry means to control the registering means to receive entry of and retentively register a first digit and subsequently to receive entries of additional digits and algebraically add each digit entered to the algebraic sum of all previously entered digits and to retentively register each current total digit, of a cathode ray tube for said order having an electron trace displaying screen and means for selectively tracing on the screen any one digit manifestation at a time, and controlled by the registering means to display on the screen an electron trace manifestation of the first entered digit and thereafter to change the display on said screen to electron trace manifestations of the current total digits, one such total digit at a time as it is registered.

64. An electronic apparatus comprising a plurality of denominational orders of electronic devices, each such order of devices effective to establish any chosen one of different patterns of an electrical phenomenon representative, respectively, of each of a plurality of digits, means for entering digits of multidenominational amounts independently in the appropriate orders of devices and comprising entry control means for each order for controlling the said electronic devices of each order to selectively establish the electrical pattern representative of an entered digit in said order, said entry control means for each order effecting the entry of a plurality of digits successively into the related order by selectively changing the electrical pattern therein representative of a digit priorly entered to one corresponding to the summation of the priorly entered digit and the digit presently entered, and carry means electrically connected to the electronic devices in a lower denominational order and rendered effective to produce carry to a higher order only when the entry of a digit in said lower order results in the occurrence of a phenomenon indicative of a carry condition.

65. In a device of the character described, an electronic accumulator producing discriminative, electronic manifestations of different values, means adjusting the accumulator so as to enter a value therein at the termination of which entry the accumulator electronically manifests the algebraic total of the value entered and of the value previously manifested, value selecting means, control means made effective when a negative value is to be entered and means for rendering the control means effective with the value selecting means to control said adjusting means to effect entry of the complement of the selected negative value in the accumulator.

66. In a system of the class described, potential source means, a first circuit network comprising electric space discharge tube means including electrode means to which potentials are applied for selectively producing space discharge manifestations indicative of different digits of a notation, means for selecting different digits to be entered, a second circuit network comprising electric space discharge tube means including electrode means varied in potential under control of said selecting means to produce space discharge changes of said latter tube means according to the selected digits, a circuit coupling the output of said second circuit network to the input of said first circuit network to apply potential changes to the electrode means of the first mentioned tube means, in response to the space discharge changes of the second mentioned tube means, for advancing the space discharge manifestations of the first mentioned tube means proportionally to the selected digits, a work circuit including a space discharge tube altered in space discharge status to cause the work circuit to manifest advance of the manifestations of said first network beyond the manifestation indicative of the last digit of the notation, and a circuit controlled by said first mentioned tube means, upon the last mentioned advance in its manifestations, for producing a controlling change in potential upon an electrode of the tube in said work circuit.

67. In an apparatus of the class described, electric potential source means, means for selecting different digits to be entered, a network of electronic discharge tube means and connected circuits energized by potentials derived from the source means to produce electric manifestations selectively of different digits and responsive to digit entry-effecting changes of potential for progression of its manifestations proportionally to the cumulative value of successive digits entered, an electronic discharge tube circuit electrically coupled to said network and operable to produce digit entry-effecting changes of potential in the network according to the selected digit, and circuits operatively connecting the digit selecting means to said discharge tube circuit for applying potentials, derived from said source means, to said tube circuit to operate the latter for producing only the selected digit entry-effecting changes of potential in said network whereby said network is controlled so that a plurality of such digit entries made in succession result in the production of an electrical manifestation by the network of the cumulative value of the entered digits.

68. In combination, an electronic accumulator comprising electron emitting means for producing electronic representations indicative of any of the values one to nine and zero as a result of an entry or an accumulation of entries; a bank of keys selectively operable to control the entry of any of the digit values one to nine into said accumulator; electronic entry means for producing electrical digit manifestations corresponding to the several digit values and including circuits controlled by said keys, according to the digit desired to be entered, for controlling the operation of the entry means to produce a corresponding electrical digit manifestation; and connections between the entry means and the accumulator to transmit the electrical digit manifestation to the accumulator to cause an entry of the corresponding digit value into the accumulator.

69. In combination, an electronic accumulator comprising electron emitting means for producing electronic representations indicative of any of the values one to nine and zero as a result of an entry or an accumulation of entries; a bank of keys selectively operable to control the entry of any of the digit values one to nine into said accumulator; electronic entry means for producing electrical digit manifestations corresponding to the several digit values and including circuits controlled by said keys, according to the digit desired to be entered, for controlling the operation of the entry means to produce a corresponding electrical digit manifestation; and connections between the entry means and the electron emitting means to transmit the electrical digit manifestation to said means to cause an entry of the corresponding digit value into the accumulator.

70. In a device of the character described, an electronic accumulator producing discriminative, electronic manifestations of different values, means adjusting the accumulator so as to enter a value therein at the termination of which entry the accumulator electronically manifests the algebraic total of the value entered and of the value previously manifested, value selecting means, control means made effective when a negative value is to be entered, means for rendering the control means effective with the value selecting means to control said adjusting means to effect entry of the complement of the selected negative value in the accumulator and means for adding an increment of value in the lowest digit position.

71. In a device of the character described, an electronic accumulator producing discriminative, electronic manifestations of different values, means adjusting the accumulator so as to enter a value therein at the termination of which entry the accumulator electronically manifests the total of the value entered and of the value previously manifested, value selecting means, electronic entry means including an electron valve circuit controlled by said value selecting means and effective when a value is to be entered for producing a digit manifestation corresponding to a selected digit value and means to apply the selected digit manifestation to said adjusting means to effect entry of a selected value in the accumulator.

72. In a device of the class described, an electron valve circuit for producing representations indicative of the different values of a chosen notation as a result of an entry, means for determining a desired value of said notation for entry into said circuit, electronic entry means including electron valve circuits controlled by said determining means according to the value desired for entry for controlling the operation of the entry means to produce a corresponding value manifestation; and means coupling said entry means and said circuit to transmit the corresponding value manifestation to said circuit to cause an entry of this value therein.

73. In a device of the class described, an electron valve circuit for producing representations indicative of the different values of a chosen notation as a result of an entry, means for determining a desired value of said notation for entry into said circuit, electronic entry means including electron valve circuits controlled by said determining means according to the value desired for entry for controlling the operation of the entry means to produce a corresponding value manifestation and means coupling said entry means and said circuit to operate the circuit in accordance with selected value manifestations whereby said circuit is controlled so that a plurality of digit entries made in succession result in the production of an electrical manifestation indicative of the cumulative value of the entered digits.

74. In a device of the class described, an electron valve circuit for producing representations indicative of the different values of a chosen notation as a result of an entry, means for determining a desired value of said notation for entry into said circuit, electronic entry means including electron valve circuits controlled by said determining means according to the value desired for entry for controlling the operation of the entry means to produce a corresponding value manifestation, means coupling said entry means and said circuit to operate the circuit in accordance with selected value manifestations whereby said circuit is controlled so that a plurality of digit entries made in succession result in the production of an electrical manifestation indicative of the cumulative value of the entered digits, and electronic carry means to control carry out of said electron valve circuit.

75. In a device of the class described, an electron valve circuit for producing representations indicative of the different values of a chosen notation as a result of an entry, means for determining a desired value of said notation for entry into said circuit, electronic entry means including electron valve circuits controlled by said determining means according to the value desired for entry for controlling the operation of the entry means to produce a corresponding value manifestation, means coupling said entry means and said circuit to operate the circuit in accordance with selected value manifestations whereby said circuit is controlled so that a plurality of digit entries made in succession result in the production of an electrical manifestation indicative of the cumulative value of the entered digits, electron carry means, and electronic means for producing a carry on carry through one electron valve circuit to still another electron valve circuit.

76. In combination, ordered organizations of electronic means each including an electron valve circuit for producing representations indicative of the different values of a chosen notation as a result of an entry or a plurality of entries, multi-amount determining means, electronic entry means including electron valve circuits controlled by said determining means for producing distinctive entry digit changes of potential, and means operatively connecting the entry means to said electron valve circuits for applying thereto said distinctive entry digit changes of potential each indicative of a correspondingly ordered digit for controlling its organization, whereby entry of the digits of said determined amount into the respective organizations is effected, and electronic carry means interrelating the ordered organizations to control carry from one order to another.

77. In combination, ordered organizations of electronic means each including an electron valve circuit for producing representations indicative of the different values of a chosen notation as a result of an entry or a plurality of entries, multi-amount determining means, electronic entry means including electron valve circuits controlled by said determining means for producing distinctive entry digit changes of potential, and means operatively connecting the entry means to said electron valve circuits for applying thereto said distinctive entry digit changes of potential each indicative of a correspondingly ordered digit for controlling its organization, whereby entry of the digits of said determined amount into the respective organizations is effected, electronic carry means interrelating the ordered organizations to control carry from one order to another, and electronic means for producing a carry on carry from one order to another.

78. In an apparatus of the class described, electric potential source means, a network of electronic discharge tube means and connected circuits energized by potentials derived from the source means to produce electric manifestations selectively of different digits and responsive to digit entry-effecting changes of potential for progression of its manifestations proportionally to the cumulative value of successive digits entered, means for selecting different digits to be entered, electronic entry means including an electron valve circuit controlled by said selecting means according to the digit selected to be entered to produce a corresponding digit entry-effecting change of potential, and means electrically coupling said entry means and said network to transmit the selected digit entry-effecting change of potential to the network to cause an entry of the corresponding digit value into said network.

79. In a system of the class described, potential source means, a network of electronic discharge tube means and connected circuits energized by potentials derived from the source means to produce electric manifestations selectively of different digits and responsive to digit entry-effecting changes of potential for progression of its manifestations proportionally to the cumulative value of successive digits entered, means for selecting different digits to be entered, electronic entry means including an electron valve circuit controlled by said selecting means according to the digit selected to be entered to produce a corresponding digit entry-effecting change of potential and means electrically coupling said entry means to said discharge tube network for applying the selected digit entry-effecting change of potential to said tube network to operate the latter whereby said network is controlled so that a plurality of such digit entries made in succession result in the production of an electrical manifestation by the network of the cumulative value of the entered digits.

80. In combination, electric potential source means, an electronic accumulator having ordered organizations of electron valve elements each organization including a network of electron valve elements and connected circuits energized by potentials derived from the source means to produce manifestations selectively of each different digit of a notation and responsive to digit entry-effecting changes of potential for progression of its manifestations proportionally to successive digits entered, multi-order amount determining means, electronic entry means including electron valve circuits controlled by said determining means for producing digit entry-effecting changes of potential, means operatively connecting the entry means to the electron valve circuits for applying said digit entry-effecting changes of potential to the circuits for variably effecting such progression of manifestations in each of the organizations each such operation in accordance with the variable magnitude of the correspondingly ordered digit of a determined amount whereby entry of the digits of said determined amount into the respectively ordered organizations of the accumulator is effected.

81. In combination, electric potential source means, an electronic accumulator having ordered organizations of electron valve elements, each organization including a network of electron valve elements and connected circuits energized by potentials derived from the source means to produce manifestations selectively of each different digit of a notation and responsive to digit entry-effecting changes of potential for progression of its manifestations proportionally to successive digits entered, multi-order amount determining means, electronic entry means including electron valve circuits controlled by said determining means for producing digit entry-effecting changes of potential, means operatively connecting the entry means to the electron valve circuits for applying said digit entry-effecting changes of potential to the circuits for variably effecting such progression of manifestations in each of the organizations each such operation in accordance with the variable magnitude of the correspondingly ordered digit of a determined amount whereby an entry results in the progression of the manifestations of the network proportionally to the value of the entry, and electronic carry control means interrelating the ordered organizations to control carry from one order into another.

82. In combination, an electronic accumulator having ordered organizations of electronic elements, each organization including a network of electron valve means and connected circuits for progression of its manifestations proportionally to an amount entered, multi-order amount determining means, and electronic entry means including electron valve means controlled by said determining means for variably effecting such progression of manifestations of the organizations, each such operation in accordance with the variable magnitude of the correspondingly ordered digit of a determined amount, whereby entry of the digits of said determined amount into the respectively ordered organizations of the accumulator is effected and electron valve carry control means interrelating the ordered organizations to control carry from one order into another.

83. In combination, an electronic accumulator having ordered organizations of electronic elements, each organization including a network of electron valve means and connected circuits for progression of its manifestations proportionally to an amount entered, multi-order amount determining means, and electronic entry means including electron valve means controlled by said determining means for variably effecting such progression of manifestations of the organizations, each such operation in accordance with the variable magnitude of the correspondingly ordered digit of a determined amount, whereby entry of the digit of said determined amount into the respectively ordered organizations of the accumulator is effected, electron valve carry control means interrelating the ordered organizations to control carry from one order to another and electron valve means for producing a carry on carry from one order to the still next higher order.

84. In a system of the class described, potential source means, a first electron valve circuit network to which potential changes are applied for selectively producing manifestations indicative of the different digits of a notation, means for selecting a digit, a second electron valve circuit network to which potentials derived from said source are selectively applied by said selecting means to produce selective electron discharge changes indicative of a selected digit, and means coupling said second circuit network to the first circuit network to apply potential changes thereto in response to said selective electron discharge changes for altering the manifestations of said first network in accordance with the selected digit.

85. In combination, energy source means, a network of electron valve means and connected circuits activated by said source to produce electric manifestations selectively of different digits, means for selecting different digits to be entered, electronic entry means including an electron valve circuit controlled by said selecting means for producing digit entry-effecting changes of energy, and means operatively connecting the entry means to said network for applying thereto, said digit entry-effecting changes of energy to operate the network whereby said network is controlled so that a plurality of such digit entries made in succession result in the production of an electrical manifestation indicative of the cumulative value of the entered digits.

86. In combination, energy source means, a network of electron valve means and connected circuits activated by said source to produce electric manifestations selectively of different digits, means for selecting different digits to be entered, electronic entry means including an electron valve circuit controlled by said selecting means for producing digit entry-effecting changes of energy, means operatively connecting the entry means to said network for applying thereto said digit entry-effecting changes of energy to operate the network whereby said network is controlled so that a plurality of such digit entries made in succession result in the production of an electrical manifestation indicative of the cumulative value of the entered digits, and electronic carry means to control carry out of said network.

87. In combination, energy source means, ordered organizations of electronic means each including a network of electron valve means and connected circuits activated by said source to produce electrical manifestations selectively of different digits, multi-order amount determining means, electronic entry means including an electron valve circuit controlled by said determining means for producing distinctive digit entry-effecting changes of energy, and means operatively connecting the entry means to said networks for applying thereto said distinctive digit entry-effecting changes of energy, each indicative of a correspondingly ordered digit for controlling its organization, whereby entry of the digits of said determined amount into the respectively ordered organizations is effected.

88. In combination, energy source means, ordered organizations of electronic means each including a network of electron valve means and connected circuits activated by said source to produce electrical manifestations selectively of different digits, multi-order amount determining means, electronic entry means including an electron valve circuit controlled by said determining means for producing distinctive digit entry-effecting changes of energy, and means operatively connecting the entry means to said networks for applying thereto said distinctive digit entry-effecting changes of energy, each indicative of a correspondingly ordered digit for controlling its organization, whereby entry of the digits of said determined amount into the respectively ordered organizations is effected, and electronic carry means interrelating the ordered organizations to control carry from one order to another.

89. In combination, energy source means, ordered organizations of electronic means each including a network of electron valve means and connected circuits activated by said source to produce electrical manifestations selectively of different digits, multi-order amount determining means, electronic entry means including an electron valve circuit controlled by said determining means for producing distinctive digit entry-effecting changes of energy and means operatively connecting the entry means to said networks for applying thereto said distinctive digit entry-effecting changes of energy, each indicative of a correspondingly ordered digit for controlling its organization, whereby entry of the digits of said determined amount into the respectively ordered organizations is effected, electronic carry means interrelating the ordered organizations to control carry from one order to another and electronic means for producing a carry on carry from one order to another.

90. In combination, energy source means, a network of electron valve means and connected circuits energized by said source to produce electric manifestations selectively of different digits and responsive to digit entry-effecting changes of energy for alteration of its manifestations in accordance with a selected digit entered, means for selecting different digits to be entered, electronic entry means including an electron valve circuit controlled by said selecting means to produce a selected digit entry-effecting change of energy and means coupling said entry means and said network to transmit the selected digit entry-effecting change to the network to cause an entry of the corresponding digit value into said network.

91. In combination, energy source means, a network of electron valve means and connected circuits activated by said source to produce electrical manifestations selectively of different digits, means for selecting different digits to be entered, electronic entry means including an electron valve circuit controlled by said selecting means to produce a selected digit entry-effecting change of energy, and means operatively connecting the entry means to said network for applying thereto said selected digit entry-effecting change of energy to operate the network whereby said network is controlled to produce an electrical manifestation of the value of the selected digit.

92. In combination, energy source means, a network of electron valve means and connected circuits activated by said source to produce electrical manifestations selectively of different digits, means for selecting different digits to be entered, electronic entry means including an electron valve circuit controlled by said selecting means to produce a selected digit entry-effecting change of energy, means operatively connecting the entry means to said network for applying thereto said selected digit entry-effecting change of energy to operate the network whereby said network is controlled to produce an electrical manifestation of the value of the selected digit, and electronic carry means to control carry out of said network.

93. In combination, energy source means, a network of connected circuits activated by said source to produce electric manifestations selectively of different digits, electron valve means controlling said network, means for selecting different digits to be entered, electronic entry means including an electron valve circuit controlled by said selecting means to produce a selected digit entry-effecting change of energy, means operatively connecting the entry means to said electron valve means for controlling application of said selected digit entry-effecting change of energy to operate the network whereby said network is controlled so that a plurality of individual digit entries results in the production of an electrical manifestation indicative of the algebraic sum of the values of the digit entries.

94. In combination, energy source means, a network of electron valve means and connected circuits activated by said source to produce electric manifestations selectively of different digits, means for selecting different digits to be entered, electronic entry means including an electron valve circuit controlled by said selecting means to produce a selected digit entry-effecting change of energy, means for controlling performance of a chosen arithmetical process, means operatively connecting the entry means to said network for applying thereto the selected digit entry-effecting change of energy to operate the network and controlled in accordance with said performance controlling means whereby said network is controlled so that a plurality of such digit entries result in the production of an electrical manifestation indicative of the end value of the arithmetical process performed on said selected digits.

95. In a device of the character described, a source of different digits of a chosen base notation, a network of electron valve means and connected circuits to produce electrical manifestations selectively of different digits, a circuit including electron valve means for producing electrical digit manifestations corresponding to any selected digit in said source, and means operatively connecting said producing means and said network whereby said corresponding manifestations are applied to said network to produce a manifestation therein of the corresponding digit values.

96. In combination, energy source means, a network of connected circuits activated by said source to produce electric manifestations selectively of different digits, electron valve means controlling said network, means for selecting different digits to be entered, means operatively connecting the digit selecting means to said electron valve means for controlling application of digit entry-effecting changes of energy derived by said selecting means from said source to operate the network whereby said network is controlled so that entries of separate identity digits results in the production of an electrical manifestation indicative of the algebraic sum of the value of the entries, carry means, and means operatively connected to said carry means and controlled by said network and operative during operation thereof to anticipate a carry requirement.

97. In combination, ordered organizations of accumulating means each order including a network of connected circuits activated by said source to produce electric manifestations selectively of different digits, electron valve means controlling said network, multi-amount determining means, and carry means for each order each of said carry means including means for producing simultaneously all required operations of said carry means upon carry from one order to another and upon a carry upon carry requirement.

ARTHUR H. DICKINSON.

(References on following page)

REFERENCES CITED

The following references are of record in the file of this patent:

UNITED STATES PATENTS

| Number | Name | Date |
|---|---|---|
| 1,244,634 | Neff et al. | Oct. 30, 1917 |
| 1,927,702 | Foss | Sept. 19, 1933 |
| 1,933,650 | Bascom | Nov. 7, 1933 |
| 1,976,617 | Lake et al. | Oct. 9, 1934 |
| 2,061,745 | Wadel | Nov. 24, 1936 |
| 2,093,529 | Tauschek | Sept. 21, 1937 |
| 2,093,573 | Page | Sept. 21, 1937 |
| 2,099,065 | Holden | Nov. 16, 1937 |
| 2,120,369 | Mills | June 14, 1938 |
| 2,158,285 | Koch | May 16, 1939 |
| 2,178,314 | Saxe | Oct. 31, 1939 |
| 2,199,246 | Pieplow | Apr. 30, 1940 |
| 2,210,574 | Fitch | Aug. 6, 1940 |
| 2,254,932 | Bryce | Sept. 2, 1941 |
| 2,254,933 | Bryce | Sept. 2, 1941 |
| 2,288,519 | Geller | June 30, 1942 |

OTHER REFERENCES

Lifschutz and Lawson: "Triode Vacuum Tube Scale-of-Two Circuit," R. S. I., March 1938, vol. 9, pages 83–89.

Stevenson and Getting: "A Vacuum Tube Circuit for Scaling Down Counting Rates," R. S. I., November 1937, vol. 8, pages 414–416.

Van Der Bijl: Thermionic Vacuum Tubes (1920), TK5865, .V3, page 13.

The Cathode Ray Tube at Work, J. F. Rider, 1440 Broadway, N. Y. C. Copyright 1935, 4th printing of April, 1937.

Lord and Livingstone: An Electronic Multiplier for High Speed Counting, January 1934, Electronics, pp. 7-9.

Certificate of Correction

Patent No. 2,580,740 January 1, 1952

ARTHUR H. DICKINSON

It is hereby certified that error appears in the printed specification of the above numbered patent requiring correction as follows:

Column 80, line 6, for "position" read *portion*; column 82, line 56, after "entered" insert a comma; line 57, after "order" strike out the comma; column 84, line 52, after "order" insert a comma; column 85, line 53, after "circuit" strike out the comma; column 87, line 33, after "means" insert a comma; column 97, line 58, for "the digit" read *the digits*;

and that the said Letters Patent should be read as corrected above, so that the same may conform to the record of the case in the Patent Office.

Signed and sealed this 8th day of April, A. D. 1952.

[SEAL]

THOMAS F. MURPHY,
*Assistant Commissioner of Patents.*